US012775150B2

(12) United States Patent
Ke et al.

(10) Patent No.: US 12,775,150 B2
(45) Date of Patent: Oct. 27, 2026

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung City (TW)

(72) Inventors: Yu-Chun Ke, Taichung City (TW); Hsin-Hsuan Huang, Taichung City (TW); Guan-Jr Liao, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 216 days.

(21) Appl. No.: 18/675,041

(22) Filed: May 27, 2024

(65) Prior Publication Data

US 2025/0306338 A1 Oct. 2, 2025

(30) Foreign Application Priority Data

Apr. 2, 2024 (TW) ................................ 113112534

(51) Int. Cl.
*G02B 13/00* (2006.01)
*G02B 9/62* (2006.01)

(52) U.S. Cl.
CPC ........... *G02B 9/62* (2013.01); *G02B 13/0045* (2013.01)

(58) Field of Classification Search
CPC ....... G02B 9/62; G02B 13/0045; H04N 23/55
See application file for complete search history.

(56) References Cited

U.S. PATENT DOCUMENTS

| | | | |
|---|---|---|---|
| 9,557,534 | B1 | 1/2017 | Liao et al. |
| 9,602,731 | B2 | 3/2017 | Lin et al. |
| 10,466,444 | B2 | 11/2019 | Chen et al. |
| 10,488,625 | B2 | 11/2019 | Lin et al. |
| 10,782,506 | B2 | 9/2020 | Wu et al. |
| 10,795,119 | B2 | 10/2020 | Chen et al. |
| 11,099,358 | B2 | 8/2021 | Chen et al. |

(Continued)

FOREIGN PATENT DOCUMENTS

| | | | |
|---|---|---|---|
| CN | 101520544 | A | 9/2009 |
| CN | 106443969 | B | 4/2019 |

(Continued)

OTHER PUBLICATIONS

UK Search and Examination Report dated Aug. 22, 2025 in application No. 2502483.7.

(Continued)

*Primary Examiner* — Bumsuk Won
*Assistant Examiner* — John C Sipes
(74) *Attorney, Agent, or Firm* — Maschoff Brennan

(57) ABSTRACT

A photographing optical lens assembly includes six lens elements which are, in order from an object side to an image side along an optical path: a first lens element, a second lens element, a third lens element, a fourth lens element, a fifth lens element and a sixth lens element. Each of the six lens elements has an object-side surface facing toward the object side and an image-side surface facing toward the image side. The first lens element has negative refractive power. The object-side surface of the second lens element is concave in a paraxial region thereof. The image-side surface of the third lens element is concave in a paraxial region thereof.

30 Claims, 36 Drawing Sheets

(56) References Cited

U.S. PATENT DOCUMENTS

| | | | | |
|---|---|---|---|---|
| 11,314,043 | B2 | 4/2022 | Fu et al. | |
| 11,662,560 | B2 | 5/2023 | Gyoda et al. | |
| 2017/0269334 | A1 | 9/2017 | Usui et al. | |
| 2018/0074290 | A1 | 3/2018 | Chang et al. | |
| 2018/0188505 | A1* | 7/2018 | Chang | G02B 13/0045 |
| 2019/0285858 | A1 | 9/2019 | Hsu et al. | |
| 2020/0379215 | A1* | 12/2020 | Su | G02B 13/04 |
| 2021/0072512 | A1* | 3/2021 | Syu | G02B 13/06 |
| 2021/0311290 | A1 | 10/2021 | Gyoda et al. | |
| 2021/0382272 | A1 | 12/2021 | Zhu et al. | |
| 2021/0389569 | A1* | 12/2021 | Lee | G02B 13/0045 |
| 2022/0206253 | A1 | 6/2022 | Li et al. | |
| 2022/0413266 | A1 | 12/2022 | Arita et al. | |
| 2023/0221523 | A1 | 7/2023 | Lin et al. | |
| 2024/0248284 | A1* | 7/2024 | Zhang | G02B 9/64 |
| 2024/0345368 | A1* | 10/2024 | Zhu | G02B 9/64 |

FOREIGN PATENT DOCUMENTS

| | | | |
|---|---|---|---|
| CN | 108152924 | B | 10/2019 |
| CN | 111580253 | A | 8/2020 |
| CN | 112415715 | A | 2/2021 |
| CN | 213659083 | U | 7/2021 |
| CN | 110412719 | B | 10/2021 |
| CN | 215297810 | U | 12/2021 |
| CN | 112147754 | B | 1/2022 |
| CN | 114460724 | A | 5/2022 |
| CN | 114326061 | B | 8/2022 |
| CN | 114839744 | A | 8/2022 |
| CN | 217385968 | U | 9/2022 |
| CN | 115166950 | B | 1/2023 |
| CN | 115185071 | B | 1/2023 |
| CN | 113433671 | B | 2/2023 |
| CN | 218585083 | U | 3/2023 |
| CN | 116184636 | A | 5/2023 |
| CN | 114200637 | B | 6/2023 |
| CN | 116299970 | A | 6/2023 |
| CN | 219695547 | U | 9/2023 |
| CN | 116500764 | B | 11/2023 |
| CN | 116990941 | A | 11/2023 |
| CN | 117008334 | A | 11/2023 |
| CN | 117233937 | A | 12/2023 |
| CN | 220188792 | U | 12/2023 |
| CN | 114815177 | B | 1/2024 |
| TW | I752639 | B | 1/2022 |
| WO | 2020/107934 | A1 | 6/2020 |

OTHER PUBLICATIONS

TW Office Action dated Apr. 9, 2025 as received in Application No. 113112534.

IN Examination Report dated Apr. 29, 2026 in application No. 202534031922.

* cited by examiner

PHOTOGRAPHING OPTICAL LENS ASSEMBLY, IMAGE CAPTURING UNIT AND ELECTRONIC DEVICE

RELATED APPLICATIONS

This application claims priority to Taiwan Application 113112534, filed on Apr. 2, 2024, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens assembly includes six lens elements. The six lens elements are, in order from an object side to an image side along an optical path, a first lens element, a second lens element, a third lens element, a fourth lens element, a fifth lens element, and a sixth lens element. Each of the six lens elements has an object-side surface facing toward the object side and an image-side surface facing toward the image side.

Preferably, the first lens element has negative refractive power. Preferably, the object-side surface of the second lens element is concave in a paraxial region thereof. Preferably, the image-side surface of the third lens element is concave in a paraxial region thereof.

When an axial distance between the object-side surface of the first lens element and the image-side surface of the sixth lens element is TD, a focal length of the photographing optical lens assembly is f, a focal length of the fifth lens element is f5, an axial distance between the fifth lens element and the sixth lens element is T56, an axial distance between the object-side surface of the first lens element and an image surface is TL, and a maximum image height of the photographing optical lens assembly is ImgH, the following conditions are preferably satisfied:

$$2.20 < TD/f < 4.50;$$

$$-0.80 < f/f5 < 0.20;$$

-continued $$1.00 < TD/T56 < 35.00; \text{ and}$$

$$0.50 < TL/ImgH < 4.00.$$

According to another aspect of the present disclosure, a photographing optical lens assembly includes six lens elements. The six lens elements are, in order from an object side to an image side along an optical path, a first lens element, a second lens element, a third lens element, a fourth lens element, a fifth lens element, and a sixth lens element. Each of the six lens elements has an object-side surface facing toward the object side and an image-side surface facing toward the image side.

Preferably, the first lens element has negative refractive power. Preferably, the object-side surface of the second lens element is concave in a paraxial region thereof. Preferably, the image-side surface of the third lens element is concave in a paraxial region thereof. Preferably, the fifth lens element has negative refractive power. Preferably, the image-side surface of the sixth lens element is concave in a paraxial region thereof. Preferably, the image-side surface of the sixth lens element has at least one inflection point.

When a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a composite focal length of the fourth lens element and the fifth lens element is f45, a focal length of the j-th lens element is fj, a maximum absolute value of f/fj is |f/fj|max, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a curvature radius of the object-side surface of the second lens element is R3, and a curvature radius of the image-side surface of the second lens element is R4, the following conditions are preferably satisfied:

$$0.45 < f/f45 < 1.00;$$

$$0.70 < T56/T34 < 20.00;$$

$$T23 < T12;$$

$$-5.00 < (R3 + R4)/(R3 - R4); \text{ and}$$

$$|f/fj|\max < 1.50, \text{ wherein } j = 1, 2, 3, 4, 5, \text{ or } 6.$$

According to another aspect of the present disclosure, a photographing optical lens assembly includes six lens elements. The six lens elements are, in order from an object side to an image side along an optical path, a first lens element, a second lens element, a third lens element, a fourth lens element, a fifth lens element, and a sixth lens element. Each of the six lens elements has an object-side surface facing toward the object side and an image-side surface facing toward the image side.

Preferably, the first lens element has negative refractive power. Preferably, the object-side surface of the second lens element is concave in a paraxial region thereof. Preferably, the image-side surface of the third lens element is concave in a paraxial region thereof. Preferably, the fifth lens element has negative refractive power.

When an axial distance between the object-side surface of the first lens element and the image-side surface of the sixth lens element is TD, a focal length of the photographing optical lens assembly is f, a focal length of the third lens element is f3, an axial distance between the fifth lens element and the sixth lens element is T56, an axial distance between the object-side surface of the first lens element and an image surface is TL, and a maximum image height of the photographing optical lens assembly is ImgH, the following conditions are preferably satisfied:

$$2.20 < TD/f < 4.50;$$

$$-1.50 < f/f3 < 0.30;$$

$$1.00 < TD/T56 < 19.00; \text{ and}$$

$$0.50 < TL/ImgH < 4.00.$$

According to another aspect of the present disclosure, an image capturing unit includes one of the aforementioned photographing optical lens assemblies and an image sensor, wherein the image sensor is disposed on the image surface of the photographing optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
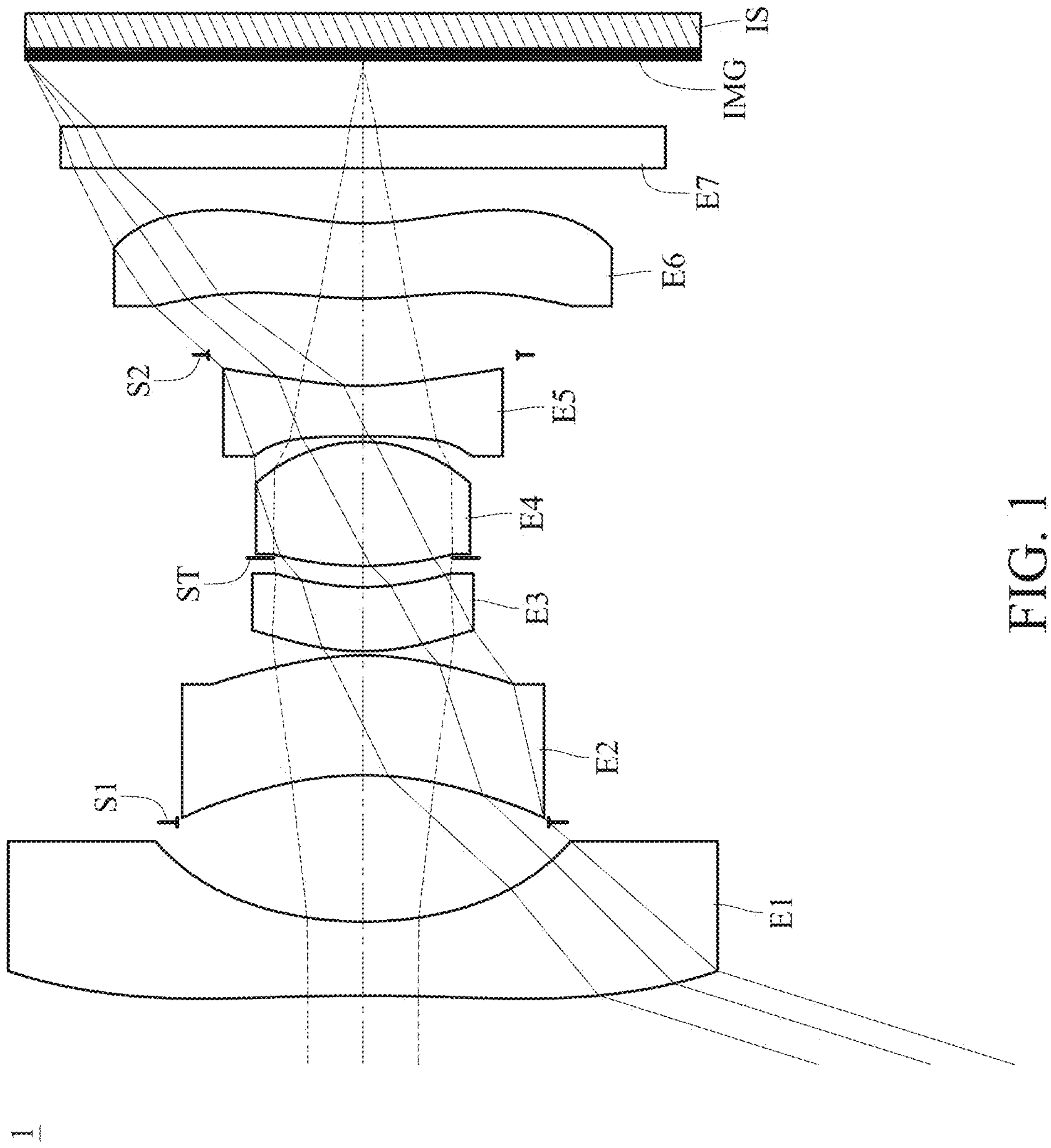
FIG. 1 is a schematic view of an image capturing unit according to the 1st embodiment of the present disclosure.

A photographing optical lens assembly includes six lens elements. The six lens elements are, in order from an object side to an image side along an optical path, a first lens element, a second lens element, a third lens element, a fourth lens element, a fifth lens element, and a sixth lens element. Each of the six lens elements of the photographing optical lens assembly has an object-side surface facing toward the object side and an image-side surface facing toward the image side.

The first lens element has negative refractive power. Therefore, it is favorable for enhancing the light-gathering ability so as to increase the field of view of the photographing optical lens assembly. The image-side surface of the first lens element can be concave in a paraxial region thereof. Therefore, it is favorable for adjusting the traveling direction of light so as to converge the light path incident from a wider field of view.

The second lens element can have positive refractive power. Therefore, it is favorable for balancing the refractive power distribution in the photographing optical lens assembly. The object-side surface of the second lens element can be concave in a paraxial region thereof, and the image-side surface of the second lens element can be convex in a paraxial region thereof. Therefore, it is favorable for adjusting the surface shape and refractive power of the second lens element so as to correct aberrations.

The third lens element can have negative refractive power. Therefore, it is favorable for correcting aberrations such as spherical aberration. The image-side surface of the third lens element can be concave in a paraxial region thereof. Therefore, it is favorable for adjusting the surface shape and refractive power of the third lens element so as to correct aberrations.

The fourth lens element can have positive refractive power. Therefore, it is favorable for reducing the size of the image-side part of the photographing optical lens assembly. The image-side surface of the fourth lens element can be convex in a paraxial region thereof. Therefore, it is favorable for adjusting the traveling direction of light so as to adjust the size distribution in the image-side part of the photographing optical lens assembly.

The fifth lens element can have negative refractive power. Therefore, it is favorable for correcting aberrations such as chromatic aberration. The image-side surface of the fifth lens element can be concave in a paraxial region thereof. Therefore, it is favorable for adjusting the traveling direction of light so as to increase an image surface.

The image-side surface of the sixth lens element can be concave in a paraxial region thereof. Therefore, it is favorable for adjusting the back focal length so as to reduce the total track length of the photographing optical lens assembly.

The object-side surface and the image-side surface of the sixth lens element can be both aspheric. Therefore, by utilizing the characteristics of the aspherical lens surface, it is favorable for effectively correcting off-axis aberrations such as distortion of the photographing optical lens assembly and reducing the total track length of the photographing optical lens assembly.

Figure 33:
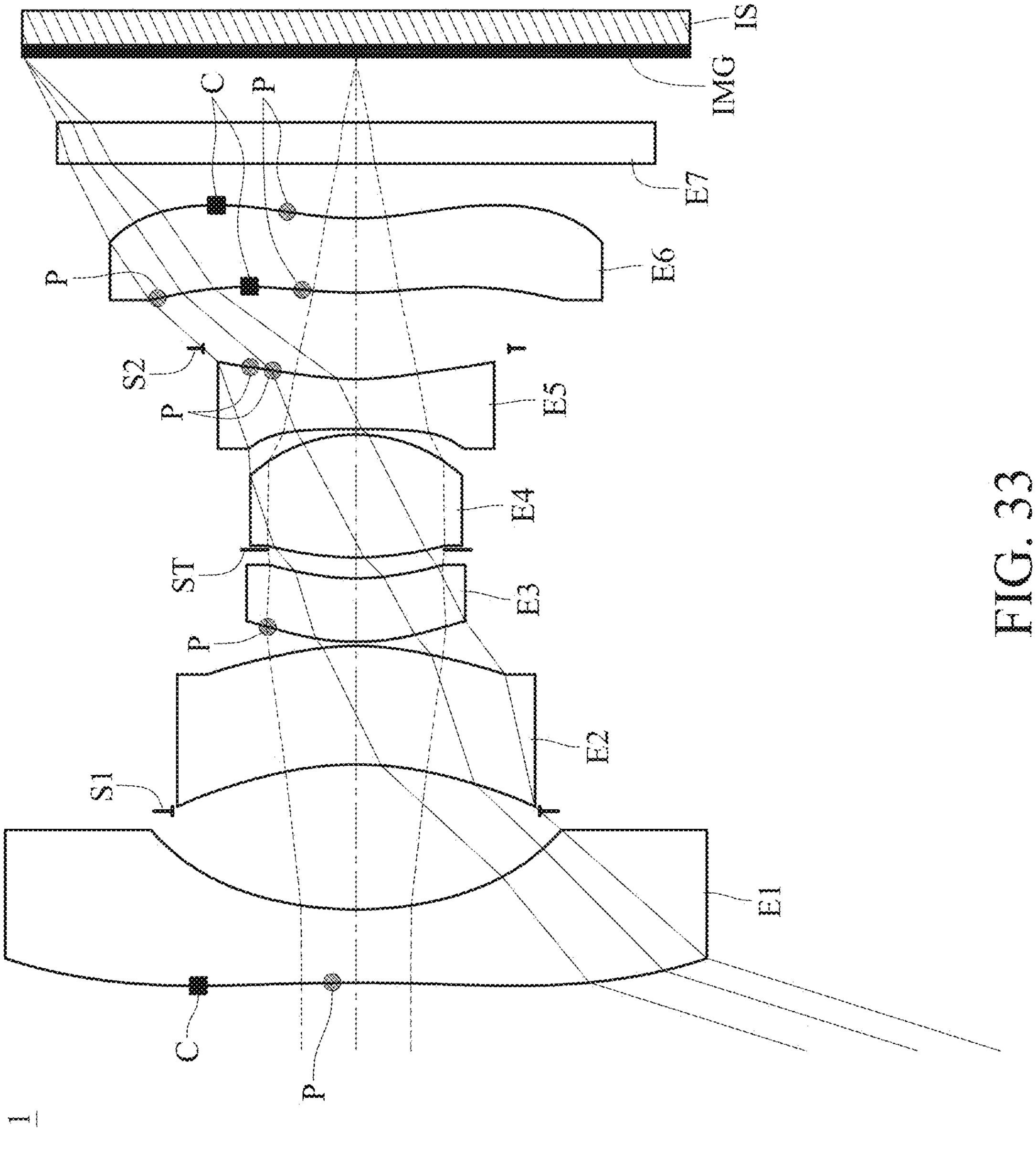
FIG. 33 shows a schematic view of inflection points and critical points on lens surfaces according to the 1st embodiment of the present disclosure.

At least one of the object-side surface and the image-side surface of the sixth lens element can have at least one inflection point. Therefore, it is favorable for correcting off-axis aberrations such as field curvature of the photographing optical lens assembly while reducing the total track length of the photographing optical lens assembly. Moreover, the image-side surface of the sixth lens element can have at least one inflection point. Please refer to FIG. 33, which shows a schematic view of the inflection points P on the lens surfaces according to the 1st embodiment of the present disclosure. In FIG. 33, the object-side surface of the first lens element E1, the object-side surface of the third lens element E3, and the image-side surface of the sixth lens element E6 each has one inflection point P, and the image-side surface of the fifth lens element E5 and the object-side surface of the sixth lens element E6 each has two inflection points P. The 1st embodiment of the present disclosure shown in FIG. 33 is only exemplary. Each of the lens elements in various embodiments of the present disclosure can have one or more inflection points.

The image-side surface of the sixth lens element can have at least one critical point in an off-axis region thereof. Therefore, it is favorable for correcting off-axis aberrations such as field curvature of the photographing optical lens assembly while reducing the total track length of the photographing optical lens assembly. Please refer to FIG. 33, which shows a schematic view of the critical points C on the lens surfaces according to the 1st embodiment of the present disclosure. In FIG. 33, the object-side surface of the first lens element E1, the object-side surface of the sixth lens element E6, and the image-side surface of the sixth lens element E6 each has a critical point C in an off-axis region thereof. The 1st embodiment of the present disclosure shown in FIG. 33 is only exemplary. Each of the lens elements in various embodiments of the present disclosure can have one or more critical points in an off-axis region thereof.

When an axial distance between the object-side surface of the first lens element and the image-side surface of the sixth lens element is TD, and a focal length of the photographing optical lens assembly is f, the following condition can be satisfied: $1.40<TD/f<6.00$. Therefore, it is favorable for balancing the total track length of the photographing optical lens assembly and controlling the field of view so as to meet product application requirements. Moreover, the following condition can also be satisfied: $2.20<TD/f<4.50$. Moreover, the following condition can also be satisfied: $2.50<TD/f<3.90$. Moreover, the following condition can also be satisfied: $2.50<TD/f<3.50$. Moreover, the following condition can also be satisfied: $2.51\leq TD/f\leq 3.47$.

When the focal length of the photographing optical lens assembly is f, and a focal length of the fifth lens element is f5, the following condition can be satisfied: $-0.80<f/f5<0.20$. Therefore, it is favorable for balancing the refractive power distribution of the photographing optical lens assembly so as to achieve better image quality. Moreover, the following condition can also be satisfied: $-0.65\leq f/f5\leq -0.16$.

When the axial distance between the object-side surface of the first lens element and the image-side surface of the sixth lens element is TD, and an axial distance between the fifth lens element and the sixth lens element is T56, the following condition can be satisfied: $1.00<TD/T56<35.00$. Therefore, it is favorable for adjusting the spatial configuration of the photographing optical lens assembly so as to balance the size distribution of the photographing optical lens assembly. Moreover, the following condition can also be satisfied: $1.00<TD/T56<19.00$. Moreover, the following condition can also be satisfied: $4.0<TD/T56<13.0$. Moreover, the following condition can also be satisfied: $6.48\leq TD/T56\leq 10.05$.

When an axial distance between the object-side surface of the first lens element and the image surface is TL, and a maximum image height of the photographing optical lens assembly (which can be half of a diagonal length of an effective photosensitive area of an image sensor) is ImgH, the following condition can be satisfied: $0.50<TL/ImgH<4.00$. Therefore, it is favorable for obtaining a balance between reducing the total track length and increasing the image surface so as to meet various applications. Moreover, the following condition can also be satisfied: 0.90<TL/ImgH<3.50. Moreover, the following condition can also be satisfied: 1.5<TL/ImgH<3.50. Moreover, the following condition can also be satisfied: 2.0<TL/ImgH<3.00. Moreover, the following condition can also be satisfied: 2.33≤TL/ImgH≤3.20.

When the focal length of the photographing optical lens assembly is f, and a composite focal length of the fourth lens element and the fifth lens element is f45, the following condition can be satisfied: 0.45<f/f45<1.20. Therefore, it is favorable for adjusting the overall refractive power of the fourth lens element and the fifth lens element so as to reduce the back focal length. Moreover, the following condition can also be satisfied: 0.45<f/f45<1.00. Moreover, the following condition can also be satisfied: 0.71≤f/f45≤0.92.

When an axial distance between the third lens element and the fourth lens element is T34, and the axial distance between the fifth lens element and the sixth lens element is T56, the following condition can be satisfied: 0.70<T56/T34<20.00. Therefore, it is favorable for effectively controlling the space arrangement of the photographing optical lens assembly so as to reduce the total track length of the photographing optical lens assembly. Moreover, the following condition can also be satisfied: 1.00<T56/T34<10.00. Moreover, the following condition can also be satisfied: 3.21≤T56/T34≤7.08.

When an axial distance between the first lens element and the second lens element is T12, and an axial distance between the second lens element and the third lens element is T23, the following condition can be satisfied: T23<T12. Therefore, it is favorable for adjusting the ratio of the distance between the first lens element and the second lens element and the distance between the second lens element and the third lens element so as to increase the field of view.

When a curvature radius of the object-side surface of the second lens element is R3, and a curvature radius of the image-side surface of the second lens element is R4, the following condition can be satisfied: −5.00<(R3+R4)/(R3−R4). Therefore, it is favorable for controlling the lens shape of the second lens element so as to correct aberrations of the photographing optical lens assembly and maintain good image quality. Moreover, the following condition can also be satisfied: 1.00<(R3+R4)/(R3−R4)<80.00. Moreover, the following condition can also be satisfied: 1.00< (R3+R4)/(R3−R4)<40.00. Moreover, the following condition can also be satisfied: 2.58≤(R3+R4)/(R3−R4)≤15.98.

When the focal length of the photographing optical lens assembly is f, a focal length of the first lens element is f1, a focal length of the second lens element is f2, the focal length of the third lens element is f3, a focal length of the fourth lens element is f4, the focal length of the fifth lens element is f5, a focal length of the sixth lens element is f6, a focal length of the j-th lens element is fj, and a maximum absolute value of f/fj is |f/fj|max, the following condition can be satisfied: |f/fj|max<1.50, wherein j=1, 2, 3, 4, 5, or 6. Therefore, it is favorable for balancing the refractive power distribution of the photographing optical lens assembly, effectively reducing the refractive change of the incident light, and correcting aberrations such as spherical aberration so as to improve image quality. Moreover, the following condition can also be satisfied: 0.70<|f/fj|max<1.30, wherein j=1, 2, 3, 4, 5, or 6.

When the focal length of the photographing optical lens assembly is f, and the focal length of the third lens element is f3, the following condition can be satisfied:—1.50<f/f3<0.30. Therefore, it is favorable for adjusting the light path control capability of the third lens element so as to balance the refractive power distribution of the photographing optical lens assembly and correct aberrations such as spherical aberration. Moreover, the following condition can also be satisfied: −1.00<f/f3<0.20. Moreover, the following condition can also be satisfied: −0.50<f/f3<0.10. Moreover, the following condition can also be satisfied: −0.36≤f/f3≤0.04.

When a maximum field of view of the photographing optical lens assembly is FOV, the following condition can be satisfied: 110.0 degrees<FOV. Therefore, it is favorable for adjusting the field of view so as to obtain a wider image capturing angle. Moreover, the following condition can also be satisfied: 125.0 degrees<FOV.

When an f-number of the photographing optical lens assembly is Fno, the following condition can be satisfied: 1.50<Fno<4.00. Therefore, it is favorable for controlling the aperture size so as to meet the clear aperture requirements of the application device and ensuring the amount of incident light of the photographing optical lens assembly so as to enhance image brightness. Moreover, the following condition can also be satisfied: 1.80<Fno<2.80.

When a minimum value among Abbe numbers of all lens elements of the photographing optical lens assembly is Vmin, the following condition can be satisfied: 5.0<Vmin<21.0. Therefore, it is favorable for adjusting the material distribution of the lens elements and correcting chromatic aberration generated by the photographing optical lens assembly so as to improve image quality. Moreover, the following condition can also be satisfied: 14.0<Vmin<20.0.

When the focal length of the photographing optical lens assembly is f, a curvature radius of the object-side surface of the sixth lens element is R11, and a curvature radius of the image-side surface of the sixth lens element is R12, the following condition can be satisfied: f/|R11|+f/|R12|<4.00. Therefore, it is favorable for controlling the surface curvature of the sixth lens element so as to reduce manufacturing difficulties and prevent image ghosting. Moreover, the following condition can also be satisfied: f/|R11|+f/|R12|<2.0.

Figure 32:
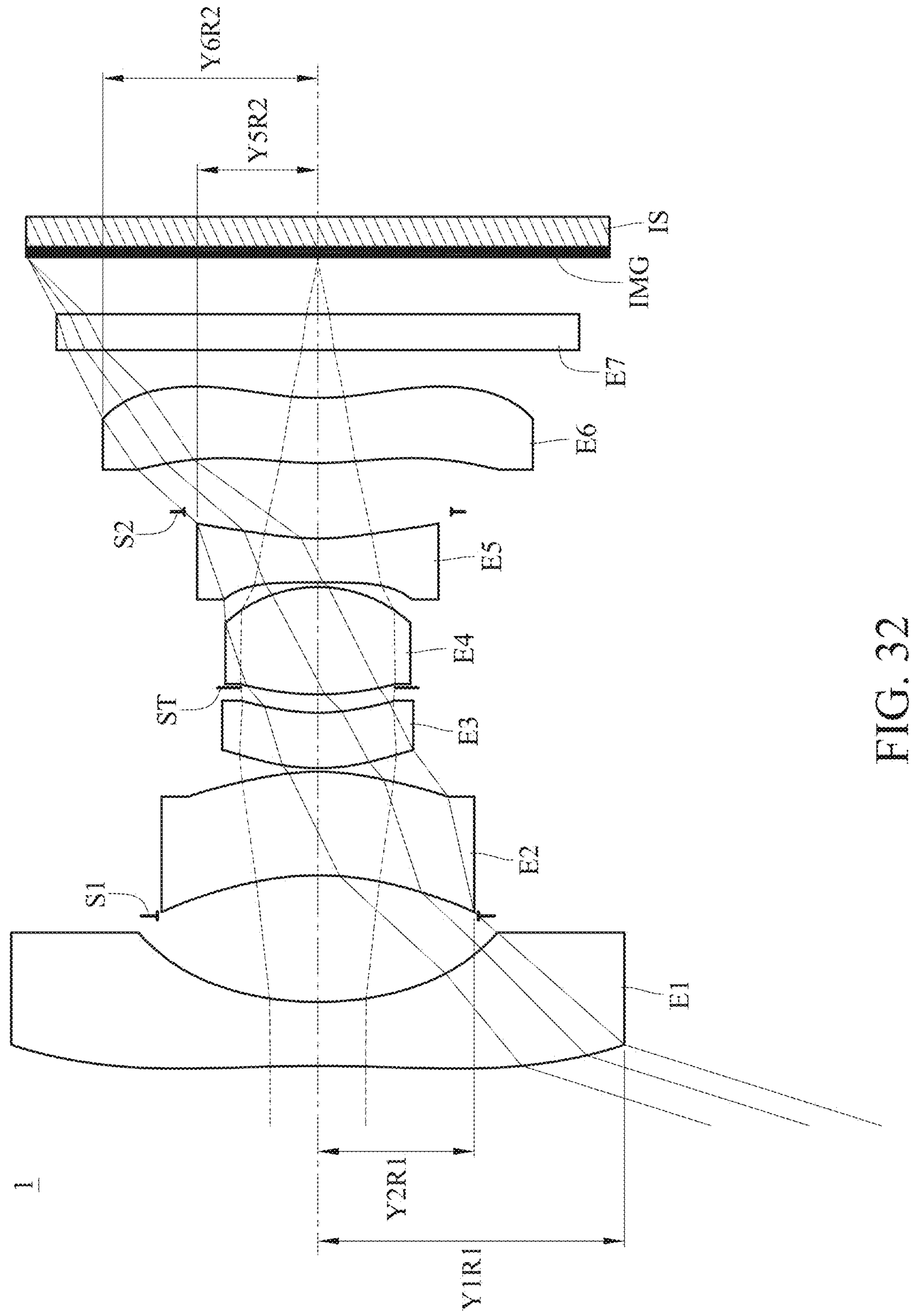
FIG. 32 shows a schematic view of Y1R1, Y2R1, Y5R2 and Y6R2 according to the 1st embodiment of the present disclosure.

When a maximum effective radius of the object-side surface of the first lens element is Y1R1, and a maximum effective radius of the image-side surface of the sixth lens element is Y6R2, the following condition can be satisfied: 0.60<Y1R1/Y6R2<8.00. Therefore, it is favorable for effectively controlling the ratio of the effective radii of the lens elements so as to increase the field of view. Moreover, the following condition can also be satisfied: 0.8<Y1R1/Y6R2<2.5. Please refer to FIG. 32, which shows a schematic view of Y1R1 and Y6R2 according to the 1st embodiment of the present disclosure.

When an axial distance between the image-side surface of the sixth lens element and the image surface is BL, and the axial distance between the object-side surface of the first lens element and the image surface is TL, the following condition can be satisfied: BL/TL<0.22. Therefore, it is favorable for reducing the back focal length of the photographing optical lens assembly so as to control the total track length of the photographing optical lens assembly.

According to the present disclosure, the photographing optical lens assembly can further include an aperture stop. When an axial distance between the aperture stop and the image surface is SL, and the axial distance between the object-side surface of the first lens element and the image surface is TL, the following condition can be satisfied: 0.30<SL/TL<0.80. Therefore, it is favorable for balancing the aperture stop position so as to control the size and the field of view of the photographing optical lens assembly. Moreover, the following condition can also be satisfied: 0.40<SL/TL<0.60.

When the focal length of the photographing optical lens assembly is f, and a composite focal length of the first lens element and the second lens element is f12, the following condition can be satisfied: f/f12<0.75. Therefore, it is favorable for adjusting the overall refractive power of the first lens element and the second lens element so as to balance the refractive power distribution of the photographing optical lens assembly. Moreover, the following condition can also be satisfied: 0.40<f/f12<0.50.

When the axial distance between the first lens element and the second lens element is T12, and the axial distance between the second lens element and the third lens element is T23, the following condition can be satisfied: T23/T12<0.80.

Therefore, it is favorable for adjusting the ratio of the lens interval between the first and second lens elements to the lens interval between the second and third lens elements so as to increase the field of view. Moreover, the following condition can also be satisfied: T23/T12<0.20.

When an Abbe number of the third lens element is V3, and an Abbe number of the fifth lens element is V5, the following condition can be satisfied: 10.0<V3+V5<80.0. Therefore, it is favorable for balancing the ability of photographing optical lens assembly to deflect different light bands to correct chromatic aberration, and increasing the density difference between the materials of the third and fifth lens elements and air so as to enhance light path control capability in a limited space. Moreover, the following condition can also be satisfied: 20.0<V3+V5<55.0.

When a maximum value among refractive indexes of all lens elements of the photographing optical lens assembly is Nmax, the following condition can be satisfied: 1.660<Nmax. Therefore, it is favorable for controlling lens materials to reduce manufacturing difficulties so as to increase the feasibility of commercializing the photographing optical lens assembly. Moreover, the following condition can also be satisfied: 1.660<Nmax<1.800.

A minimum value among maximum effective radii of all lens surfaces of the photographing optical lens assembly is Ymin, and a maximum effective radius of one of the object-side surface of the third lens element, the image-side surface of the third lens element, the object-side surface of the fourth lens element, and the image-side surface of the fourth lens element can be equal to Ymin. Therefore, it is favorable for positioning the aperture stop while balancing the amount of incident light and the size of the photographing optical lens assembly.

When the axial distance between the third lens element and the fourth lens element is T34, and a central thickness of the second lens element is CT2, the following condition can be satisfied: T34<CT2. Therefore, it is favorable for controlling the spatial distribution of the photographing optical lens assembly so as to reduce the sensitivity, and improving the performance of the photographing optical lens assembly.

When the axial distance between the second lens element and the third lens element is T23, and the axial distance between the fifth lens element and the sixth lens element is T56, the following condition can be satisfied: T23<T56. Therefore, it is favorable for adjusting the ratio of the lens interval between the second and third lens elements to the lens interval between the fifth and sixth lens elements so as to adjust the size distribution of the photographing optical lens assembly.

When the maximum field of view of the photographing optical lens assembly is FOV, the following condition can be satisfied: −1.80<tan (FOV)<0. Therefore, it is favorable for increasing the field of view so as to expand product application range.

When the axial distance between the object-side surface of the first lens element and the image-side surface of the sixth lens element is TD, and an entrance pupil diameter of the photographing optical lens assembly is EPD, the following condition can be satisfied: 5.00<TD/EPD<8.50. Therefore, it is favorable for reducing the total track length of the photographing optical lens assembly and featuring a large aperture stop so as to balance the image brightness and the size of the photographing optical lens assembly. Moreover, the following condition can also be satisfied: 6.00<TD/EPD<8.00.

When a maximum value among axial distances between each of all adjacent lens elements of the photographing optical lens assembly is ATmax, and the focal length of the photographing optical lens assembly is f, the following condition can be satisfied: 0<ATmax/f<2.50. Therefore, it is favorable for adjusting the distribution of lens elements in the photographing optical lens assembly so as to increase yield and reduce assembly errors. Moreover, the following condition can also be satisfied: 0.40<ATmax/f<1.30.

When a maximum effective radius of the object-side surface of the second lens element is Y2R1, and a maximum effective radius of the image-side surface of the fifth lens element is Y5R2, the following condition can be satisfied: 0.70<Y2R1/Y5R2<8.00. Therefore, it is favorable for controlling the ratio of effective radii of the lens elements so as to increase the field of view. Moreover, the following condition can also be satisfied: 1.10<Y2R1/Y5R2<2.00. Please refer to FIG. 32, which shows a schematic view of Y2R1 and Y5R2 according to the 1st embodiment of the present disclosure.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 34:
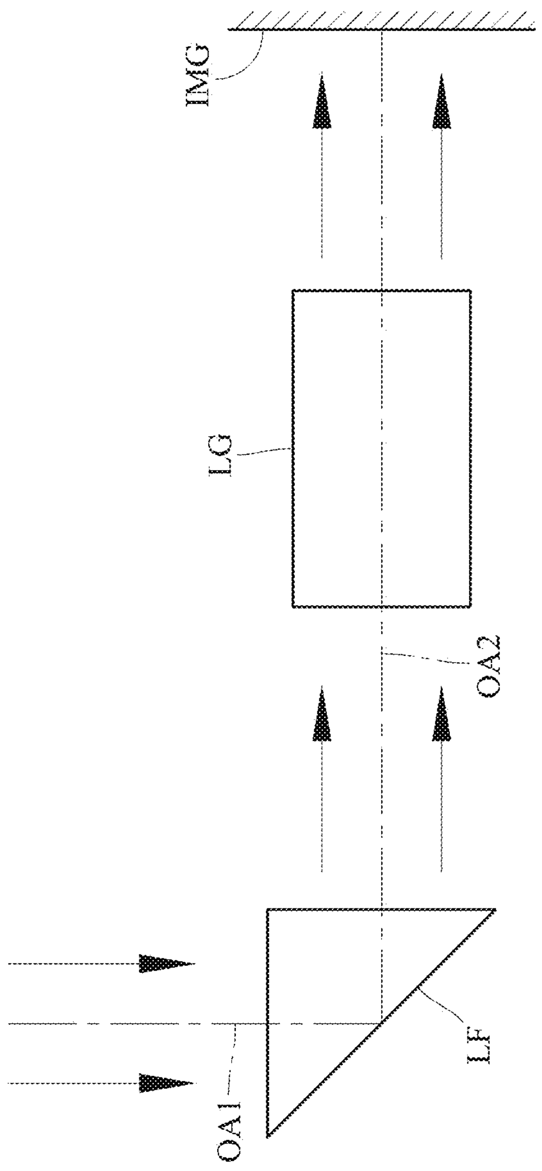
FIG. 34 shows a schematic view of a configuration of one light-folding element in a photographing optical lens assembly according to one embodiment of the present disclosure.
Figure 35:
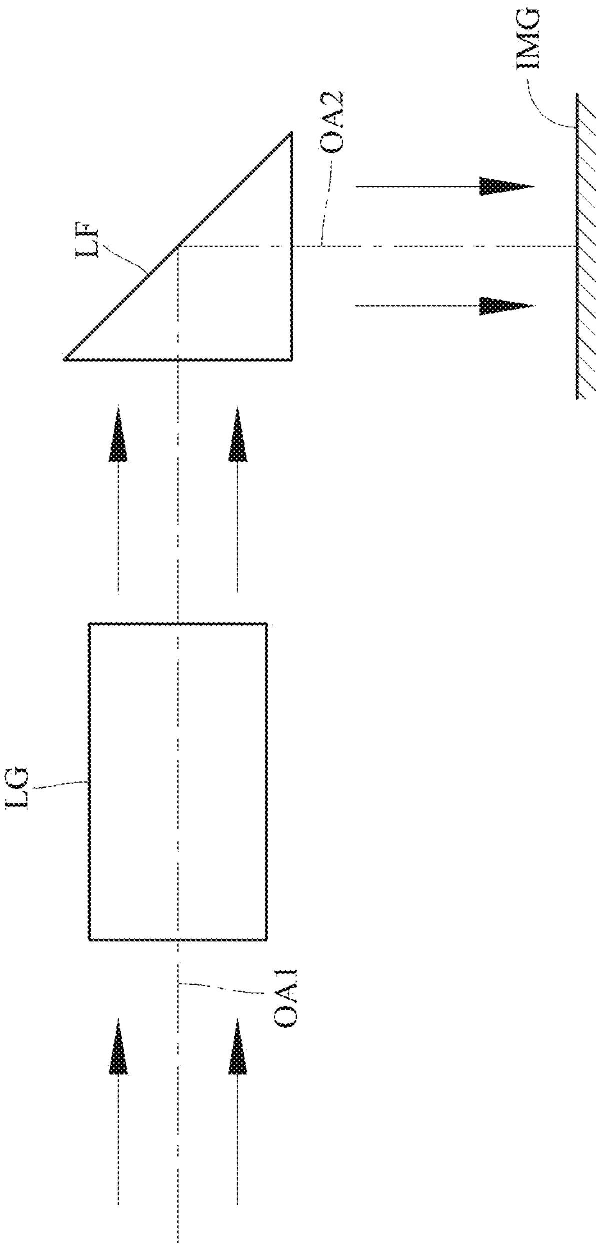
FIG. 35 shows a schematic view of another configuration of one light-folding element in a photographing optical lens assembly according to one embodiment of the present disclosure.
Figure 36:
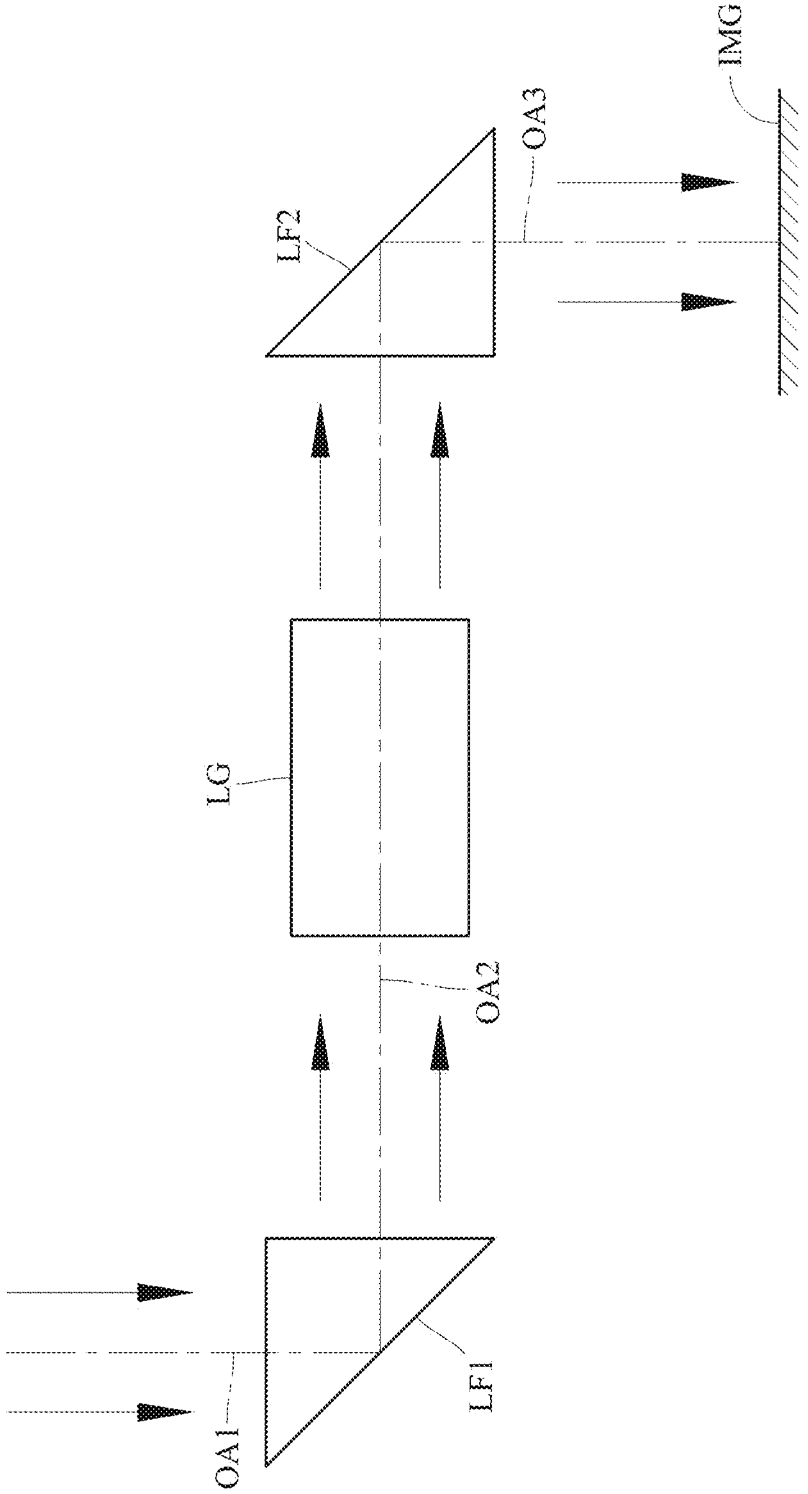
FIG. 36 shows a schematic view of a configuration of two light-folding elements in a photographing optical lens assembly according to one embodiment of the present disclosure.

According to the present disclosure, at least one light-folding element, such as a prism or a mirror, can be optionally provided between an imaged object and the image surface on the imaging optical path, and the surface shape of the prism or mirror can be planar, spherical, aspheric or freeform surface, such that the photographing optical lens assembly can be more flexible in space arrangement, and therefore the dimensions of an electronic device is not restricted by the total track length of the photographing optical lens assembly. Specifically, please refer to FIG. 34 and FIG. 35. FIG. 34 shows a schematic view of a configuration of one light-folding element in a photographing optical lens assembly according to one embodiment of the present disclosure, and FIG. 35 shows a schematic view of another configuration of one light-folding element in a photographing optical lens assembly according to one embodiment of the present disclosure. In FIG. 34 and FIG. 35, the photographing optical lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing optical lens assembly as shown in FIG. 34, or disposed between a lens group LG and the image surface IMG of the photographing optical lens assembly as shown in FIG. 35. Furthermore, please refer to FIG. 36, which shows a schematic view of a configuration of two light-folding elements in a photographing optical lens assembly according to one embodiment of the present disclosure. In FIG. 36, the photographing optical lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing optical lens assembly, the second light-folding element LF2 is disposed between the lens group LG and the image surface IMG of the photographing optical lens assembly, and the travelling direction of light on the first optical axis OA1 can be the same direction as the travelling direction of light on the third optical axis OA3 as shown in FIG. 36. The photographing optical lens assembly can be optionally provided with three or more light-folding elements, and the present disclosure is not limited to the type, amount and position of the light-folding elements of the embodiments disclosed in the aforementioned figures.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment.

In addition, the aperture control unit can be the aperture stop of the present disclosure, which changes the f-number to obtain different image effects, such as the depth of field or lens speed.

According to the present disclosure, the photographing optical lens assembly can include one or more optical elements for limiting the form of light passing through the photographing optical lens assembly. Each optical element can be, but not limited to, a filter, a polarizer, etc., and each optical element can be, but not limited to, a single-piece element, a composite component, a thin film, etc. The optical element can be located at the object side or the image side of the photographing optical lens assembly or between any two adjacent lens elements so as to allow light in a specific form to pass through, thereby meeting application requirements.

According to the present disclosure, the photographing optical lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element, the axial optical data are also calculated along the deflected optical axis.

According to the above description of the present disclosure, the following specific embodiments are provided for further explanation.

1st Embodiment

Figure 2:
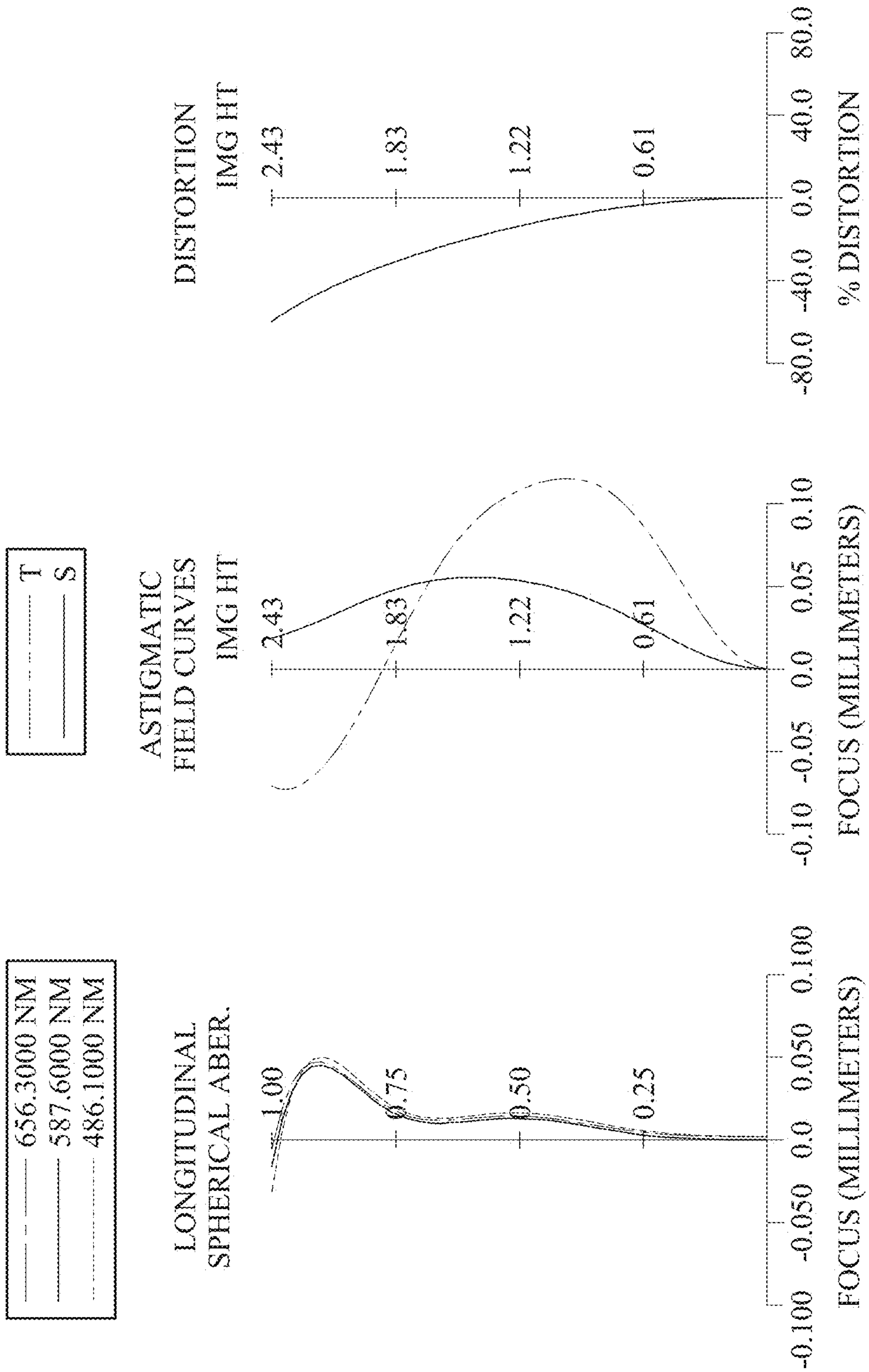
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing optical lens assembly (its reference numeral is omitted) of the present disclosure and an image sensor IS. The photographing optical lens assembly includes, in order from an object side to an image side along an optical path, a first lens element E1, a stop S1, a second lens element E2, a third lens element E3, an aperture stop ST, a fourth lens element E4, a fifth lens element E5, a stop S2, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The image-side surface of the fifth lens element E5 has two inflection points.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

- X is the displacement in parallel with an optical axis from an axial vertex on the aspheric surface to a point at a distance of Y from the optical axis on the aspheric surface;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14, 16, 18 and 20.

In the photographing optical lens assembly of the image capturing unit 1 according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=1.91 millimeters (mm), Fno=2.40, and HFOV=72.5 degrees (deg.).

When the maximum field of view of the photographing optical lens assembly is FOV, the following condition is satisfied: FOV=144.9 degrees.

When an axial distance between the object-side surface of the first lens element E1 and the image surface IMG is TL, and a maximum image height of the photographing optical lens assembly is ImgH, the following condition is satisfied:

$$TL/ImgH = 2.78.$$

When the maximum field of view of the photographing optical lens assembly is FOV, the following condition is satisfied: tan (FOV)=−0.70.

When an axial distance between the object-side surface of the first lens element E1 and the image-side surface of the sixth lens element E6 is TD, and an entrance pupil diameter of the photographing optical lens assembly is EPD, the following condition is satisfied: TD/EPD=7.01.

When the axial distance between the object-side surface of the first lens element E1 and the image-side surface of the sixth lens element E6 is TD, and the focal length of the photographing optical lens assembly is f, the following condition is satisfied: TD/f=2.92.

When the focal length of the photographing optical lens assembly is f, a focal length of the first lens element E1 is f1, a focal length of the second lens element E2 is f2, a focal length of the third lens element E3 is f3, a focal length of the fourth lens element E4 is f4, a focal length of the fifth lens element E5 is f5, a focal length of the sixth lens element E6 is f6, a focal length of the j-th lens element is fj, and a maximum absolute value of f/fj is |f/fj|max, the following condition is satisfied: |f/fj|max=1.24, wherein j=1, 2, 3, 4, 5, or 6. In this embodiment, an absolute value of f/f4 (i.e., |f/f4|) is larger than |f/f1|, |f/f2|, |f/f3|, |f/f5|, and |f/f6|, and |f/fj|max is equal to the absolute value of f/f4.

When the focal length of the photographing optical lens assembly is f, and the focal length of the third lens element E3 is f3, the following condition is satisfied: f/f3=0.03.

When the focal length of the photographing optical lens assembly is f, and the focal length of the fifth lens element E5 is f5, the following condition is satisfied: f/f5=−0.65.

When the focal length of the photographing optical lens assembly is f, and a composite focal length of the first lens element E1 and the second lens element E2 is f12, the following condition is satisfied: f/f12=−0.21.

When the focal length of the photographing optical lens assembly is f, and a composite focal length of the fourth lens element E4 and the fifth lens element E5 is f45, the following condition is satisfied: f/f45=0.78.

When the focal length of the photographing optical lens assembly is f, a curvature radius of the object-side surface of the sixth lens element E6 is R11, and a curvature radius of the image-side surface of the sixth lens element E6 is R12, the following condition is satisfied: f/|R11|+f/|R12|=1.56.

When a curvature radius of the object-side surface of the second lens element E2 is R3, and a curvature radius of the image-side surface of the second lens element E2 is R4, the following condition is satisfied: (R3+R4)/(R3−R4)=7.61

When a maximum value among axial distances between each of all adjacent lens elements of the photographing optical lens assembly is ATmax, and the focal length of the photographing optical lens assembly is f, the following condition is satisfied: ATmax/f=0.55. In this embodiment, an axial distance between the first lens element E1 and the second lens element E2 is larger than axial distances between any other two adjacent lens elements in the photographing optical lens assembly, and therefore ATmax is equal to the axial distance between the first lens element E1 and the second lens element E2.

When an axial distance between the image-side surface of the sixth lens element E6 and the image surface IMG is BL, and the axial distance between the object-side surface of the first lens element E1 and the image surface IMG is TL, the following condition is satisfied: BL/TL=0.17.

When an axial distance between the aperture stop ST and the image surface IMG is SL, and the axial distance between the object-side surface of the first lens element E1 and the image surface IMG is TL, the following condition is satisfied:

$$SL/TL = 0.53.$$

When the axial distance between the object-side surface of the first lens element E1 and the image-side surface of the sixth lens element E6 is TD, and an axial distance between the fifth lens element E5 and the sixth lens element E6 is T56, the following condition is satisfied: TD/T56=8.85. In this embodiment, an axial distance between two adjacent lens elements is a distance in a paraxial region between two adjacent lens surfaces of the two adjacent lens elements.

When the axial distance between the first lens element E1 and the second lens element E2 is T12, and an axial distance between the second lens element E2 and the third lens element E3 is T23, the following condition is satisfied: T23/T12=0.028.

When an axial distance between the third lens element E3 and the fourth lens element E4 is T34, and the axial distance between the fifth lens element E5 and the sixth lens element E6 is T56, the following condition is satisfied: T56/T34=4.10.

When a minimum value among Abbe numbers of all lens elements of the photographing optical lens assembly is Vmin, the following condition is satisfied: Vmin=18.2. In this embodiment, an Abbe number of the fifth lens element E5 is smaller than Abbe numbers of the other lens elements in the photographing optical lens assembly, and therefore Vmin is equal to the Abbe number of the fifth lens element E5.

When an Abbe number of the third lens element E3 is V3, and the Abbe number of the fifth lens element E5 is V5, the following condition is satisfied: V3+V5=38.6.

When a maximum value among refractive indexes of all lens elements of the photographing optical lens assembly is Nmax, the following condition is satisfied: Nmax=1.680. In this embodiment, a refractive index of the fifth lens element E5 is larger than refractive indexes of the other lens elements in the photographing optical lens assembly, and therefore Nmax is equal to the refractive index of the fifth lens element E5.

When a maximum effective radius of the object-side surface of the first lens element E1 is Y1R1, and a maximum effective radius of the image-side surface of the sixth lens element E6 is Y6R2, the following condition is satisfied: Y1R1/Y6R2=1.42.

When a maximum effective radius of the object-side surface of the second lens element E2 is Y2R1, and a maximum effective radius of the image-side surface of the fifth lens element E5 is Y5R2, the following condition is satisfied: Y2R1/Y5R2=1.29.

When the axial distance between the first lens element E1 and the second lens element E2 is T12, the axial distance between the second lens element E2 and the third lens element E3 is T23, the axial distance between the third lens element E3 and the fourth lens element E4 is T34, the axial distance between the fifth lens element E5 and the sixth lens element E6 is T56, and a central thickness of the second lens element E2 is CT2, the following conditions are satisfied: T23<T12; T34<CT2; and T23<T56.

The detailed optical data of the 1st embodiment are shown in Table 1A and the aspheric surface data are shown in Table 1B below.

TABLE 1A

| 1st Embodiment<br>f = 1.91 mm, Fno = 2.40, HFOV = 72.5 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | −14.3721 (ASP) | 0.535 | Glass | 1.639 | 44.9 | −3.62 |
| 2 | | 2.8028 (ASP) | 0.718 | | | | |
| 3 | Stop | Plano | 0.340 | | | | |
| 4 | Lens 2 | −2.5761 (ASP) | 0.866 | Plastic | 1.544 | 56.0 | 10.36 |
| 5 | | −1.9776 (ASP) | 0.030 | | | | |
| 6 | Lens 3 | 1.7092 (ASP) | 0.463 | Plastic | 1.660 | 20.4 | 61.04 |
| 7 | | 1.5927 (ASP) | 0.211 | | | | |
| 8 | Ape. Stop | Plano | −0.057 | | | | |
| 9 | Lens 4 | 2.3313 (ASP) | 0.897 | Plastic | 1.544 | 56.0 | 1.55 |
| 10 | | −1.1383 (ASP) | 0.039 | | | | |
| 11 | Lens 5 | −95.0841 (ASP) | 0.366 | Plastic | 1.680 | 18.2 | −2.96 |
| 12 | | 2.0619 (ASP) | 0.223 | | | | |
| 13 | Stop | Plano | 0.408 | | | | |
| 14 | Lens 6 | 2.9255 (ASP) | 0.543 | Plastic | 1.544 | 56.0 | −18.35 |
| 15 | | 2.1144 (ASP) | 0.400 | | | | |
| 16 | Filter | Plano | 0.300 | Glass | 1.517 | 64.2 | — |
| 17 | | Plano | 0.480 | | | | |
| 18 | Image | Plano | — | | | | |

Note:
Reference wavelength is 587.6 nm (d-line).
An effective radius of the stop S1 (Surface 3) is 1.342 mm.
An effective radius of the stop S2 (Surface 13) is 1.117 mm.

TABLE 1B

| Aspheric Coefficients | | | | | | |
|---|---|---|---|---|---|---|
| Surface # | 1 | 2 | 4 | 5 | 6 | 7 |
| k= | −8.41722E+01 | 6.51575E−01 | −4.75516E+00 | −8.11289E+00 | −8.19736E+00 | −6.62776E+00 |
| A4= | 1.19009E−02 | 1.27946E−02 | −4.31980E−02 | 2.68298E−02 | 1.13310E−01 | −1.97220E−01 |
| A6= | −6.05232E−04 | −7.50497E−04 | 6.29029E−02 | −2.67820E−02 | −1.92854E−01 | 1.13599E+00 |
| A8= | −5.29441E−05 | 3.87576E−03 | −4.45350E−02 | 4.63024E−02 | 2.52276E−01 | −5.61082E+00 |
| A10= | 8.28545E−06 | −7.10745E−04 | 1.42837E−02 | −6.68369E−02 | −5.95723E−01 | 1.82544E+01 |
| A12= | −1.08847E−07 | −1.18257E−12 | −1.97424E−03 | 3.58518E−02 | 6.30614E−01 | −3.18019E+01 |
| A14= | 4.23754E−10 | — | 8.35400E−06 | −6.51584E−03 | −2.25400E−01 | 2.41624E+01 |
| A16= | — | — | — | — | — | 7.93685E−13 |
| Surface # | 9 | 10 | 11 | 12 | 14 | 15 |
| k= | −5.07675E−02 | −5.84930E−01 | 8.87179E+01 | −2.11485E+01 | −7.49124E−01 | −5.59565E−01 |
| A4= | −7.07072E−02 | −1.89709E−01 | −5.88315E−01 | −6.97035E−02 | −2.72645E−01 | −2.41134E−01 |
| A6= | 1.62812E−01 | 1.51934E+00 | 2.44595E+00 | 1.69364E−01 | 3.01664E−01 | 1.72002E−01 |
| A8= | 2.11144E−01 | −6.26840E+00 | −1.03646E+01 | −3.38758E−01 | −3.76303E−01 | −1.28657E−01 |
| A10= | −3.23449E+00 | 1.29427E+01 | 2.57260E+01 | 3.85838E−01 | 3.70541E−01 | 7.62496E−02 |
| A12= | 7.44997E+00 | −1.40957E+01 | −3.92556E+01 | −2.49813E−01 | −2.42594E−01 | −3.32265E−02 |
| A14= | −4.97928E+00 | 6.39709E+00 | 3.26502E+01 | 1.16658E−01 | 1.00769E−01 | 1.01440E−02 |
| A16= | 7.93850E−13 | 7.93850E−13 | −1.11747E+01 | −3.26256E−02 | −2.55314E−02 | −2.05690E−03 |
| A18= | — | — | 2.84592E−14 | 2.84592E−14 | 3.60922E−03 | 2.45059E−04 |
| A20= | — | — | — | — | −2.18835E−04 | −1.27733E−05 |

In Table 1A, the curvature radius, the thickness and the focal length are shown in millimeters (mm). Surface numbers 0-18 represent the surfaces sequentially arranged from the object side to the image side along the optical axis. In Table 1B, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
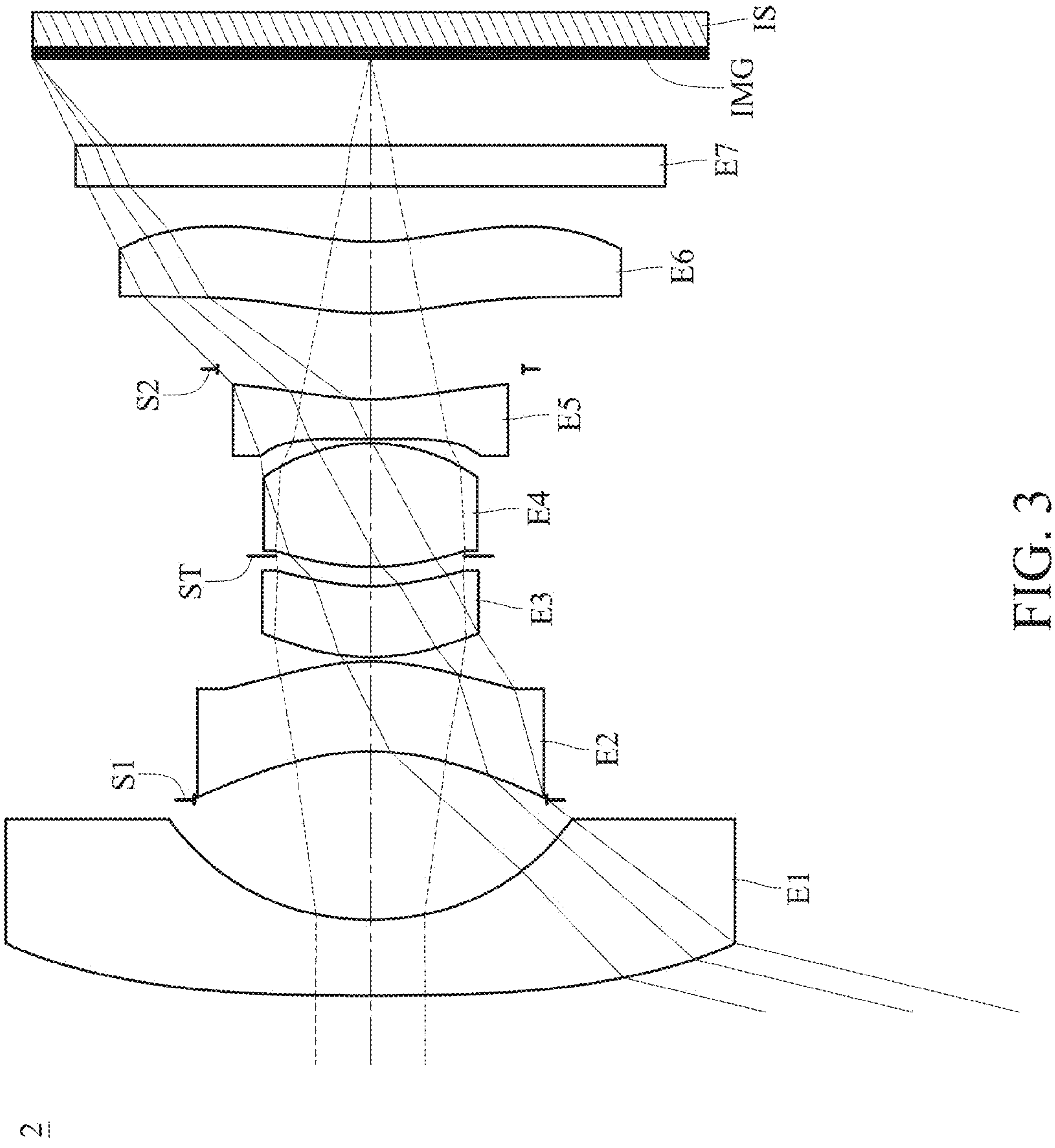
FIG. 3 is a schematic view of an image capturing unit according to the 2nd embodiment of the present disclosure.
Figure 4:
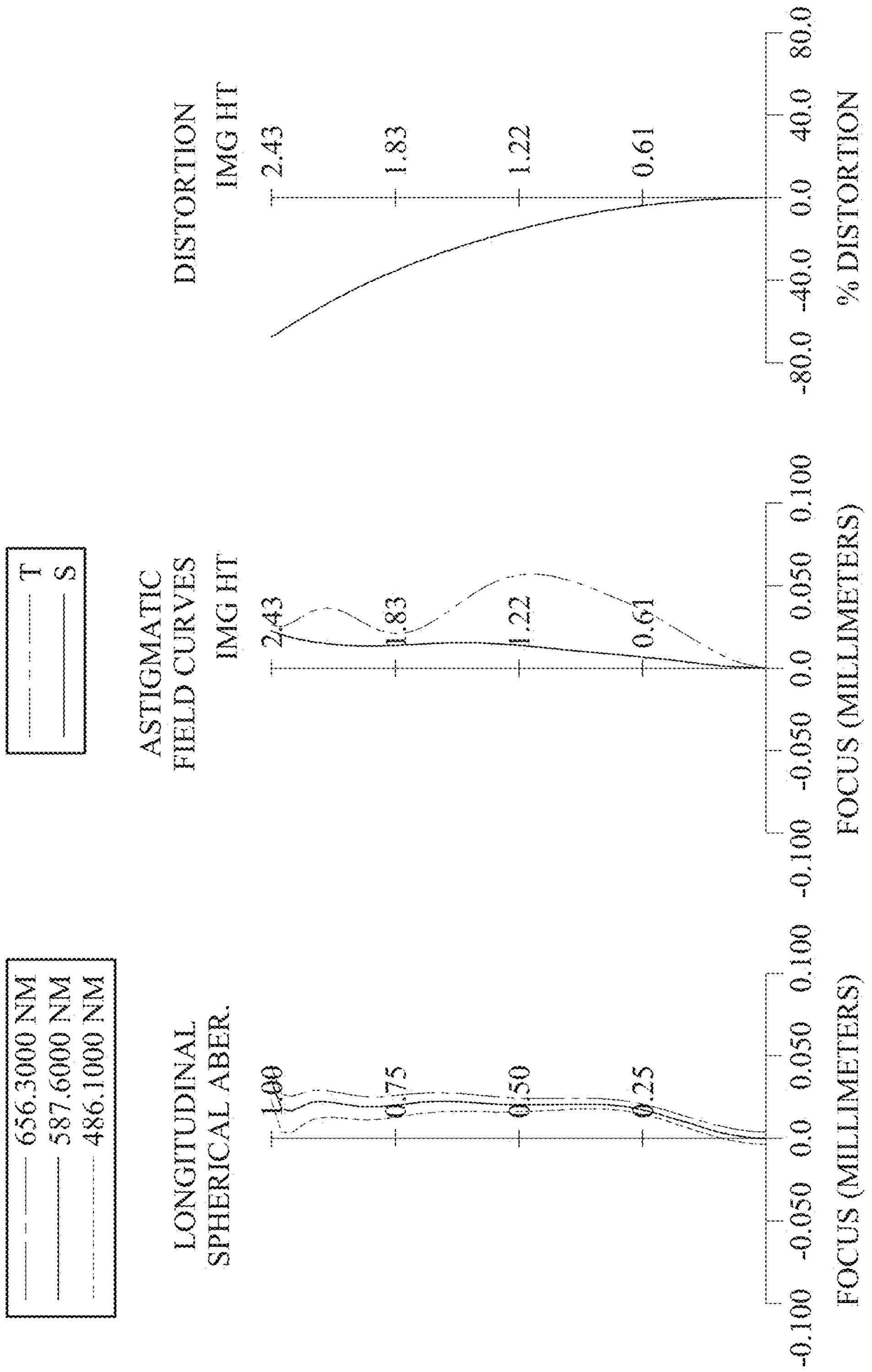
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing optical lens assembly (its reference numeral is omitted) of the present disclosure and an image sensor IS. The photographing optical lens assembly includes, in order from an object side to an image side along an optical path, a first lens element E1, a stop S1, a second lens element E2, a third lens element E3, an aperture stop ST, a fourth lens element E4, a fifth lens element E5, a stop S2, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The object-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 2nd embodiment are shown in Table 2A and the aspheric surface data are shown in Table 2B below.

TABLE 2A

| 2nd Embodiment<br>f = 1.80 mm, Fno = 2.27, HFOV = 76.4 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | 33.1808 (ASP) | 0.550 | Glass | 1.697 | 55.5 | −3.10 |
| 2 | | 2.0131 (ASP) | 0.872 | | | | |
| 3 | Stop | Plano | 0.350 | | | | |
| 4 | Lens 2 | −1.9276 (ASP) | 0.654 | Plastic | 1.544 | 56.0 | 13.17 |
| 5 | | −1.7006 (ASP) | 0.030 | | | | |
| 6 | Lens 3 | 1.6037 (ASP) | 0.515 | Plastic | 1.587 | 28.3 | 45.69 |
| 7 | | 1.5030 (ASP) | 0.221 | | | | |
| 8 | Ape. Stop | Plano | −0.079 | | | | |
| 9 | Lens 4 | 1.9390 (ASP) | 0.896 | Plastic | 1.535 | 55.9 | 1.61 |
| 10 | | −1.2918 (ASP) | 0.030 | | | | |
| 11 | Lens 5 | 10.2775 (ASP) | 0.288 | Plastic | 1.680 | 18.2 | −3.27 |
| 12 | | 1.8063 (ASP) | 0.220 | | | | |

TABLE 2A-continued

| 2nd Embodiment f = 1.80 mm, Fno = 2.27, HFOV = 76.4 deg. | | | | | | | |
|---|---|---|---|---|---|---|---|
| Surface # | | Curvature Radius | Thickness | Material | Index | Abbe # | Focal Length |
| 13 | Stop | Plano | 0.405 | | | | |
| 14 | Lens 6 | 2.0519 (ASP) | 0.521 | Plastic | 1.535 | 55.9 | 45.32 |
| 15 | | 2.0435 (ASP) | 0.400 | | | | |
| 16 | Filter | Plano | 0.300 | Glass | 1.517 | 64.2 | — |
| 17 | | Plano | 0.630 | | | | |
| 18 | Image | Plano | — | | | | |

Note:
Reference wavelength is 587.6 nm (d-line).
An effective radius of the stop S1 (Surface 3) is 1.279 mm.
An effective radius of the stop S2 (Surface 13) is 1.109 mm.

TABLE 2B

| Aspheric Coefficients | | | | | | |
|---|---|---|---|---|---|---|
| Surface # | 1 | 2 | 4 | 5 | 6 | 7 |
| k= | 2.34362E+01 | 2.11507E−01 | −4.78531E+00 | −8.16772E+00 | −6.18593E+00 | −7.23399E+00 |
| A4= | 1.00367E−02 | 1.70876E−02 | −4.86597E−02 | −2.68580E−02 | 1.10957E−01 | −5.82808E−02 |
| A6= | −9.84208E−04 | −1.62449E−02 | 8.90240E−02 | 1.88181E−01 | 6.34243E−02 | −3.18640E−01 |
| A8= | −7.50874E−05 | 3.03811E−02 | −8.36833E−02 | −3.54824E−01 | −7.01787E−01 | 3.82356E+00 |
| A10= | 3.86980E−05 | −2.45960E−02 | 4.56890E−02 | 3.88977E−01 | 1.44208E+00 | −1.96512E+01 |
| A12= | −4.27710E−06 | 9.35302E−03 | −1.59125E−02 | −2.44370E−01 | −1.78928E+00 | 5.29248E+01 |
| A14= | 1.79163E−07 | −1.39062E−03 | 2.83168E−03 | 6.65945E−02 | 1.04460E+00 | −7.33501E+01 |
| A16= | | – | – | – | −1.03039E−01 | 4.25362E+01 |
| Surface # | 9 | 10 | 11 | 12 | 14 | 15 |
| k= | −3.85912E−01 | −1.11984E+00 | 3.84226E+01 | −2.65910E+01 | −9.86254E−01 | −1.06194E−02 |
| A4= | −4.40986E−02 | −1.15446E−01 | −5.97049E−01 | −2.42866E−02 | −2.62298E−01 | −2.33778E−01 |
| A6= | 6.87894E−02 | 1.59068E+00 | 2.63934E+00 | 4.40780E−03 | 2.26981E−01 | 1.32466E−01 |
| A8= | −8.32275E−01 | −8.42220E+00 | −1.17741E+01 | 3.21886E−02 | −1.87085E−01 | −7.78733E−02 |
| A10= | 5.51433E+00 | 2.14789E+01 | 2.99904E+01 | −7.12848E−01 | 1.38808E−01 | 3.81810E−02 |
| A12= | −1.85172E+01 | −3.03778E+01 | −4.76076E+01 | 2.05705E+00 | −8.05710E−02 | −1.60680E−02 |
| A14= | 2.96374E+01 | 2.22638E+01 | 4.48279E+01 | −2.54506E+00 | 3.27179E−02 | 5.52145E−03 |
| A16= | −1.75664E+01 | −6.19898E+00 | −2.24888E+01 | 1.52023E+00 | −8.53926E−03 | −1.39873E−03 |
| A18= | – | – | 4.77994E+00 | −3.60121E−01 | 1.28302E−03 | 2.18166E−04 |
| A20= | | | – | – | −8.45425E−05 | −1.50753E−05 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Optical and Physical Parameters/Definitions | | | |
|---|---|---|---|
| f [mm] | 1.80 | f/\|R11\| + f/\|R12\| | 1.76 |
| Fno | 2.27 | (R3 + R4)/(R3 − R4) | 15.98 |
| HFOV [deg.] | 76.4 | ATmax/f | 0.68 |
| FOV [deg.] | 152.8 | BL/TL | 0.20 |
| tan(HFOV) | 2.79 | SL/TL | 0.53 |
| TD/EPD | −0.51 | TD/T56 | 8.76 |
| f[mm] | 6.89 | T23/T12 | 0.025 |
| TD/f | 3.03 | T56/T34 | 4.40 |
| \|f/fj\|max | 1.12 | Vmin | 18.2 |
| f/f3 | 0.04 | V3 + V5 | 46.5 |
| f/f5 | −0.55 | Nmax | 1.697 |

TABLE 2C-continued

| Values of Optical and Physical Parameters/Definitions | | | |
|---|---|---|---|
| f/f12 | −0.31 | Y1R1/Y6R2 | 1.45 |
| f/f45 | 0.74 | Y2R1/Y5R2 | 1.26 |

3rd Embodiment

Figure 5:
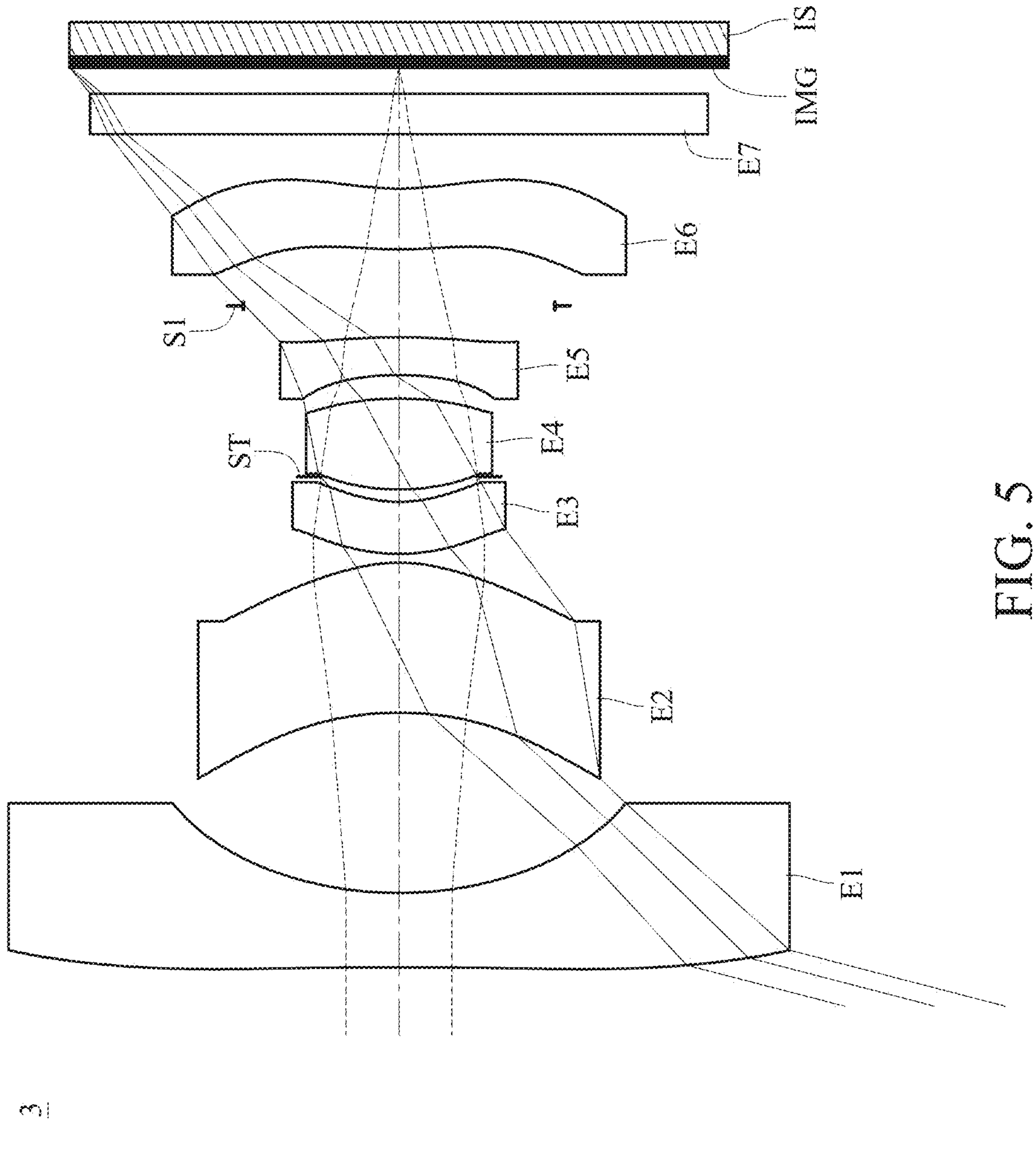
FIG. 5 is a schematic view of an image capturing unit according to the 3rd embodiment of the present disclosure.
Figure 6:
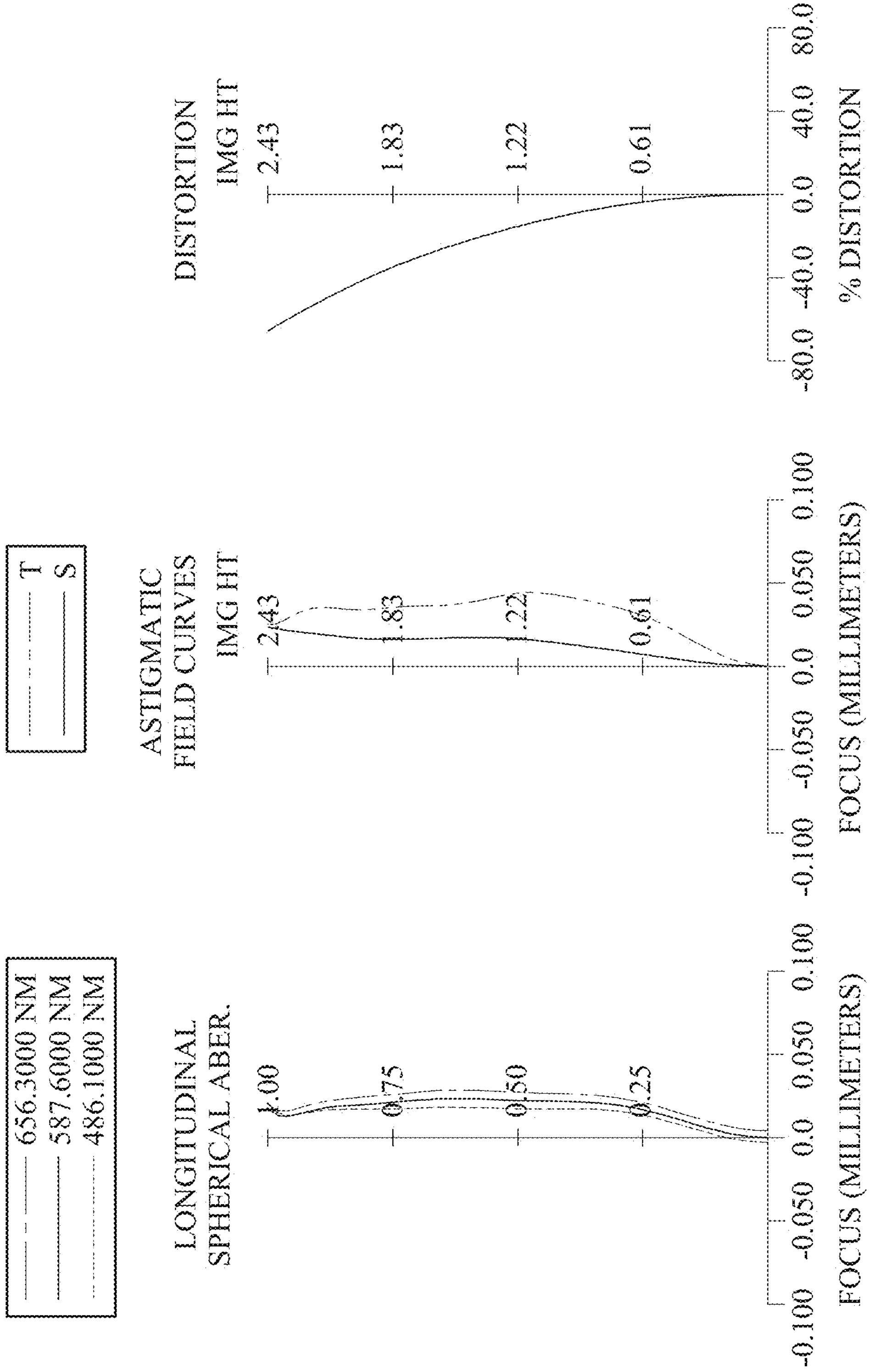
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has one inflection point.

The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has three inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the object-side surface of the fourth lens element E4 is equal to Ymin.

The detailed optical data of the 3rd embodiment are shown in Table 3A and the aspheric surface data are shown in Table 3B below.

TABLE 3A

| 3rd Embodiment<br>f = 1.82 mm, Fno = 2.33, HFOV = 75.4 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | −67.6929 (ASP) | 0.550 | Plastic | 1.534 | 56.0 | −4.89 |
| 2 | | 2.7275 (ASP) | 1.333 | | | | |
| 3 | Lens 2 | −2.4192 (ASP) | 1.109 | Plastic | 1.545 | 54.8 | 3.38 |
| 4 | | −1.2152 (ASP) | 0.066 | | | | |
| 5 | Lens 3 | 1.4819 (ASP) | 0.383 | Plastic | 1.615 | 25.3 | −6.48 |
| 6 | | 0.9738 (ASP) | 0.188 | | | | |
| 7 | Ape. Stop | Plano | −0.096 | | | | |
| 8 | Lens 4 | 1.6177 (ASP) | 0.672 | Plastic | 1.544 | 56.0 | 1.91 |
| 9 | | −2.4749 (ASP) | 0.173 | | | | |
| 10 | Lens 5 | −2.5328 (ASP) | 0.280 | Plastic | 1.697 | 16.3 | −5.93 |
| 11 | | −6.8356 (ASP) | 0.232 | | | | |
| 12 | Stop | Plano | 0.419 | | | | |
| 13 | Lens 6 | 3.4585 (ASP) | 0.449 | Plastic | 1.669 | 19.5 | −9.54 |
| 14 | | 2.1260 (ASP) | 0.400 | | | | |
| 15 | Filter | Plano | 0.300 | Glass | 1.517 | 64.2 | — |
| 16 | | Plano | 0.194 | | | | |
| 17 | Image | Plano | — | | | | |

Note:

Reference wavelength is 587.6 nm (d-line).

An effective radius of the stop S1 (Surface 12) is 1.151 mm.

TABLE 3B

| Aspheric Coefficients | | | | | | |
|---|---|---|---|---|---|---|
| Surface # | 1 | 2 | 3 | 4 | 5 | 6 |
| k= | −6.19731E+01 | 2.42291E−01 | −1.62677E+00 | −6.38010E+00 | −5.05694E+00 | −5.81214E−01 |
| A4= | −5.03180E−03 | −1.07047E−02 | −6.23486E−02 | −4.11389E−02 | 1.34247E−01 | −7.04715E−01 |
| A6= | 4.64693E−03 | 7.95486E−03 | 6.03151E−02 | 1.79345E−02 | 1.95783E−01 | 1.25729E+00 |
| A8= | −1.16826E−03 | −1.16410E−03 | −3.74726E−02 | −7.66784E−03 | −1.26892E+00 | 9.30282E+00 |
| A10= | 1.51525E−04 | 1.56653E−03 | 1.55968E−02 | 6.58316E−03 | 2.32799E+00 | −1.05557E+02 |
| A12= | −1.00181E−05 | −9.73848E−04 | −3.61806E−03 | −3.49196E−03 | −2.74075E+00 | 4.78999E+02 |
| A14= | 2.67984E−07 | 1.85507E−04 | 3.51701E−04 | 7.29302E−04 | 1.32150E+00 | −1.19385E+03 |
| A16= | — | — | — | — | — | 1.57556E+03 |
| A18= | — | — | — | — | — | −8.54544E+02 |
| Surface # | 8 | 9 | 10 | 11 | 13 | 14 |
| k= | 1.16084E+00 | −1.20745E+01 | −3.62201E+01 | −9.00000E+01 | −2.69083E+01 | 1.32334E−01 |
| A4= | −1.76467E−01 | −2.66644E−01 | −6.78731E−01 | −1.99347E−01 | −2.39794E−01 | −3.10448E−01 |
| A6= | 8.78437E−01 | 4.45578E−01 | 1.51346E+00 | 5.76325E−01 | 7.78653E−02 | 1.58808E−01 |
| A8= | −1.18375E+00 | −5.92583E−01 | −3.42002E+00 | −3.35168E−01 | 1.82906E−01 | −1.64363E−02 |
| A10= | −2.01921E+00 | 4.82621E−01 | 4.26299E+00 | −9.91543E−01 | −5.28388E−01 | −9.57505E−02 |
| A12= | 8.56193E+00 | −6.10499E−01 | −2.61435E+00 | 2.55983E+00 | 7.69476E−01 | 1.11855E−01 |
| A14= | −8.19633E+00 | 2.11163E+00 | −3.83607E+00 | −2.40277E+00 | −6.75135E−01 | −6.34515E−02 |
| A16= | — | — | 6.44383E+00 | 8.34708E−01 | 3.50120E−01 | 1.99605E−02 |
| A18= | — | — | — | — | −9.78306E−02 | −3.29594E−03 |
| A20= | — | — | — | — | 1.12924E−02 | 2.21162E−04 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Optical and Physical Parameters/Definitions | | | |
|---|---|---|---|
| f [mm] | 1.82 | f/\|R11\| + f/\|R12\| | 1.39 |
| Fno | 2.33 | (R3 + R4)/(R3 − R4) | 3.02 |
| HFOV [deg.] | 75.4 | ATmax/f | 0.73 |
| FOV [deg.] | 150.9 | BL/TL | 0.13 |
| tan(HFOV) | 2.73 | SL/TL | 0.45 |
| TD/EPD | −0.56 | TD/T56 | 8.84 |
| f[mm] | 7.35 | T23/T12 | 0.050 |
| TD/f | 3.16 | T56/T34 | 7.08 |
| \|f/fj\|max | 0.96 | Vmin | 16.3 |
| f/f3 | −0.28 | V3 + V5 | 41.6 |
| f/f5 | −0.31 | Nmax | 1.697 |
| f/f12 | 0.43 | Y1R1/Y6R2 | 1.72 |
| f/f45 | 0.71 | Y2R1/Y5R2 | 1.69 |

4th Embodiment

Figure 7:
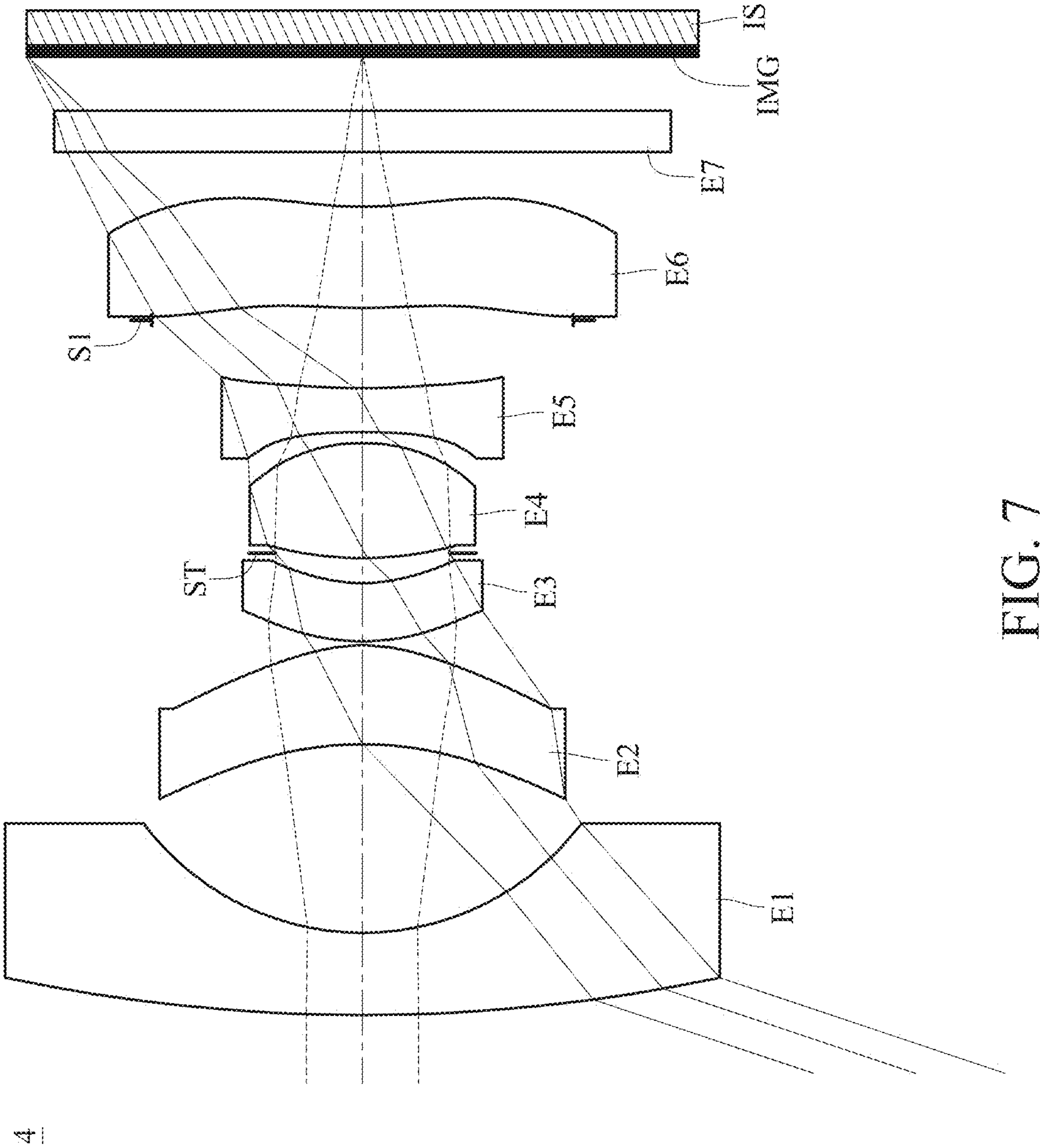
FIG. 7 is a schematic view of an image capturing unit according to the 4th embodiment of the present disclosure.
Figure 8:
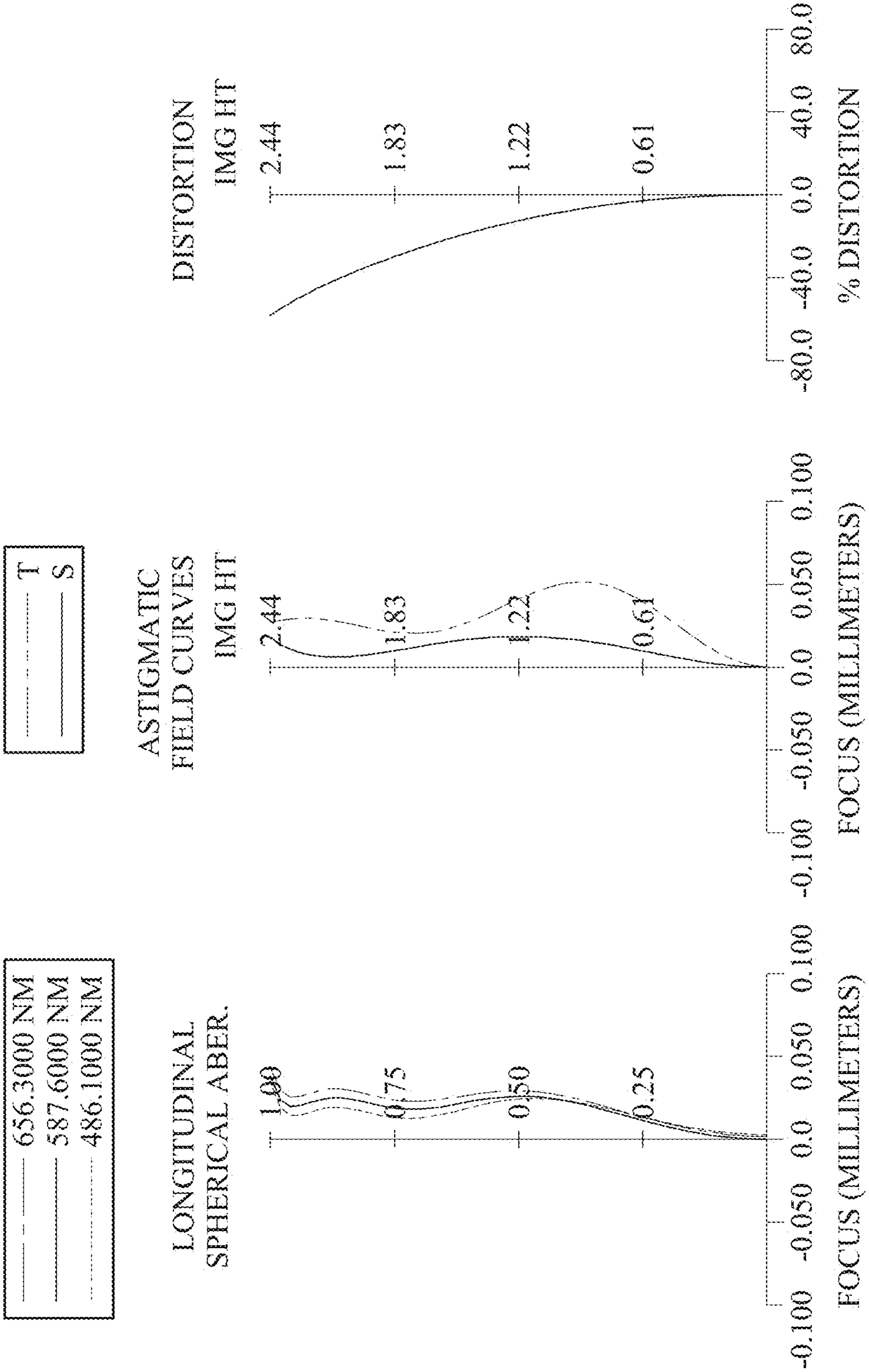
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 4th embodiment are shown in Table 4A and the aspheric surface data are shown in Table 4B below.

TABLE 4A

4th Embodiment
f = 1.95 mm, Fno = 2.38, HFOV = 71.5 deg.

| Surface # | | Curvature Radius | | Thickness | Material | Index | Abbe # | Focal Length |
|---|---|---|---|---|---|---|---|---|
| 0 | Object | Infinity | | Infinity | | | | |
| 1 | Lens 1 | 12.5949 | (SPH) | 0.600 | Glass | 1.729 | 54.7 | −3.34 |
| 2 | | 2.0000 | (SPH) | 1.375 | | | | |
| 3 | Lens 2 | −2.6925 | (ASP) | 0.722 | Plastic | 1.545 | 56.1 | 3.55 |
| 4 | | −1.2329 | (ASP) | 0.030 | | | | |
| 5 | Lens 3 | 1.6260 | (ASP) | 0.424 | Plastic | 1.660 | 20.4 | −8.20 |
| 6 | | 1.1208 | (ASP) | 0.218 | | | | |
| 7 | Ape. Stop | Plano | | −0.035 | | | | |
| 8 | Lens 4 | 2.5099 | (ASP) | 0.839 | Plastic | 1.545 | 56.1 | 1.78 |
| 9 | | −1.3961 | (ASP) | 0.079 | | | | |
| 10 | Lens 5 | −10.4773 | (ASP) | 0.320 | Plastic | 1.669 | 19.5 | −4.00 |
| 11 | | 3.6337 | (ASP) | 0.497 | | | | |
| 12 | Stop | Plano | | 0.090 | | | | |
| 13 | Lens 6 | 4.4128 | (ASP) | 0.738 | Plastic | 1.534 | 56.0 | −15.07 |
| 14 | | 2.6848 | (ASP) | 0.400 | | | | |
| 15 | Filter | Plano | | 0.300 | Glass | 1.517 | 64.2 | — |
| 16 | | Plano | | 0.395 | | | | |
| 17 | Image | Plano | | — | | | | |

Note:
Reference wavelength is 587.6 nm (d-line).
An effective radius of the stop S1 (Surface 12) is 1.538 mm.

TABLE 4B

Aspheric Coefficients

| Surface # | 3 | 4 | 5 | 6 | 8 | 9 |
|---|---|---|---|---|---|---|
| k= | −2.58762E+00 | −6.32180E+00 | −4.39629E+00 | −5.19676E+00 | 3.97268E−01 | −8.64579E−02 |
| A4= | −6.02354E−02 | −4.62861E−02 | 1.05061E−01 | −1.37346E−01 | −5.63933E−02 | −3.51121E−01 |
| A6= | 8.07719E−02 | 4.74130E−02 | 9.19416E−02 | 1.32673E+00 | 9.99465E−02 | 1.78302E+00 |
| A8= | −5.66666E−02 | −3.89730E−02 | −4.71651E−01 | −5.78951E+00 | 6.35819E−01 | −5.95686E+00 |
| A10= | 2.29405E−02 | 2.13284E−02 | 5.87423E−01 | 1.74816E+01 | −3.84917E+00 | 1.11880E+01 |
| A12= | −5.10604E−03 | −6.79943E−03 | −4.67744E−01 | −3.09090E+01 | 7.05737E+00 | −1.18008E+01 |
| A14= | 4.98524E−04 | 9.82873E−04 | 1.84147E−01 | 2.41506E+01 | −4.02917E+00 | 5.44081E+00 |

| Surface # | 10 | 11 | 13 | 14 | — | — |
|---|---|---|---|---|---|---|
| k= | 1.41523E+01 | −9.00000E+01 | 2.22598E+00 | 2.31372E−01 | — | — |
| A4= | −7.22801E−01 | −1.51104E−01 | −2.60051E−01 | −2.02650E−01 | — | — |
| A6= | 2.97137E+00 | 5.12606E−01 | 2.24123E−01 | 1.15132E−01 | — | — |
| A8= | −1.10395E+01 | −9.34445E−01 | −1.96188E−01 | −7.11136E−02 | — | — |
| A10= | 2.69204E+01 | 1.12840E+00 | 1.85613E−01 | 3.50582E−02 | — | — |
| A12= | −4.25327E+01 | −8.87367E−01 | −1.34025E−01 | −1.22869E−02 | — | — |
| A14= | 3.75577E+01 | 4.37376E−01 | 6.42342E−02 | 2.89702E−03 | — | — |
| A16= | −1.36428E+01 | −1.01885E−01 | −1.94138E−02 | −4.30591E−04 | — | — |
| A18= | — | — | 3.37588E−03 | 3.40363E−05 | — | — |
| A20= | — | — | −2.58184E−04 | −8.79791E−07 | — | — |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Optical and Physical Parameters/Definitions | | | |
|---|---|---|---|
| f[mm] | 1.95 | f/\|R11\| + f/\|R12\| | 1.17 |
| Fno | 2.38 | (R3 + R4)/(R3 − R4) | 2.69 |
| HFOV [deg.] | 71.5 | ATmax/f | 0.70 |
| FOV [deg.] | 143.0 | BL/TL | 0.16 |
| tan(HFOV) | 2.87 | SL/TL | 0.52 |
| TD/EPD | −0.75 | TD/T56 | 10.05 |
| f[mm] | 7.19 | T23/T12 | 0.022 |
| TD/f | 3.02 | T56/T34 | 3.21 |
| \|f/fj\|max | 1.10 | Vmin | 19.5 |
| f/f3 | −0.24 | V3 + V5 | 39.9 |
| f/f5 | −0.49 | Nmax | 1.729 |
| f/f12 | 0.30 | Y1R1/Y6R2 | 1.41 |
| f/f45 | 0.73 | Y2R1/Y5R2 | 1.44 |

5th Embodiment

Figure 9:
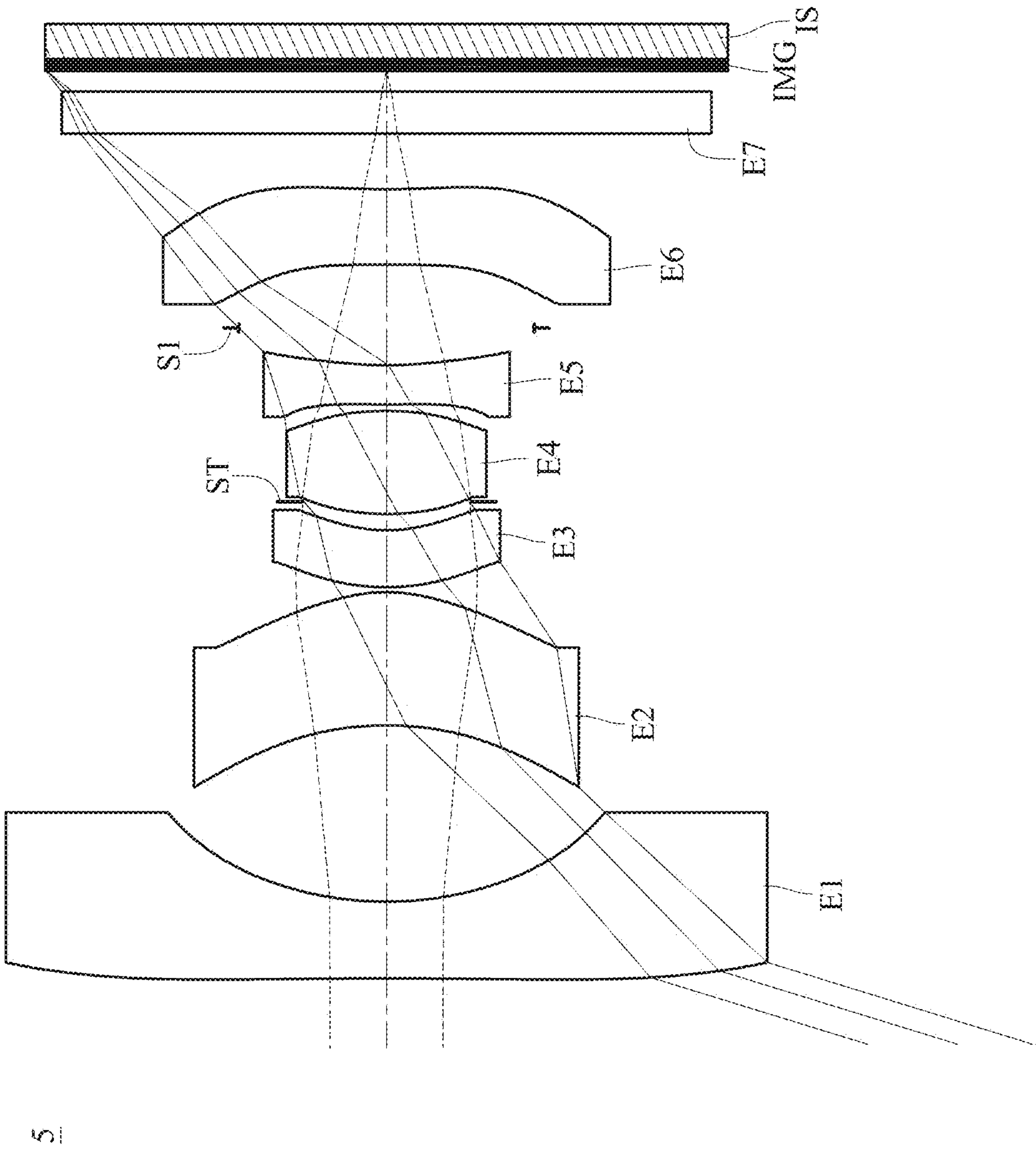
FIG. 9 is a schematic view of an image capturing unit according to the 5th embodiment of the present disclosure.
Figure 10:
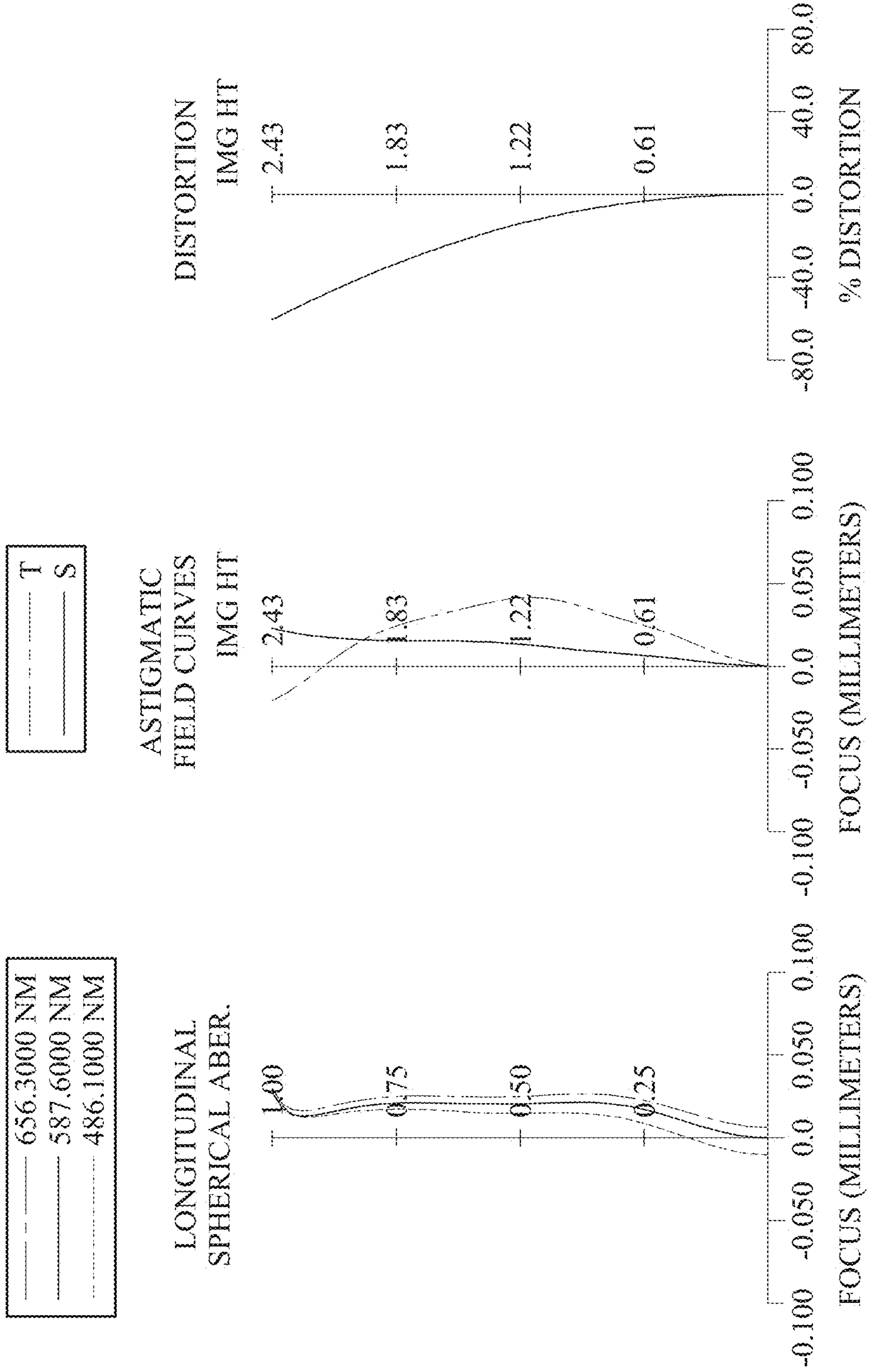
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the object-side surface of the fourth lens element E4 is equal to Ymin.

The detailed optical data of the 5th embodiment are shown in Table 5A and the aspheric surface data are shown in Table 5B below.

TABLE 5A

| 5th Embodiment<br>f = 1.89 mm, Fno = 2.33, HFOV = 72.9 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | −53.6264 (ASP) | 0.550 | Plastic | 1.534 | 56.0 | −4.47 |
| 2 | | 2.5089 (ASP) | 1.263 | | | | |

TABLE 5A-continued

| 5th Embodiment f = 1.89 mm, Fno = 2.33, HFOV = 72.9 deg. | | | | | | | |
|---|---|---|---|---|---|---|---|
| Surface # | | Curvature Radius | Thickness | Material | Index | Abbe # | Focal Length |
| 3 | Lens 2 | −2.3501 (ASP) | 0.954 | Plastic | 1.544 | 56.0 | 3.26 |
| 4 | | −1.1559 (ASP) | 0.036 | | | | |
| 5 | Lens 3 | 1.6304 (ASP) | 0.407 | Plastic | 1.614 | 25.6 | −6.21 |
| 6 | | 1.0335 (ASP) | 0.204 | | | | |
| 7 | Ape. Stop | Plano | −0.087 | | | | |
| 8 | Lens 4 | 1.7477 (ASP) | 0.738 | Plastic | 1.544 | 56.0 | 2.01 |
| 9 | | −2.4949 (ASP) | 0.047 | | | | |
| 10 | Lens 5 | 5.2410 (ASP) | 0.281 | Plastic | 1.680 | 18.2 | −7.99 |
| 11 | | 2.6098 (ASP) | 0.267 | | | | |
| 12 | Stop | Plano | 0.454 | | | | |
| 13 | Lens 6 | −43.7281 (ASP) | 0.539 | Plastic | 1.642 | 22.5 | −6.69 |
| 14 | | 4.7845 (ASP) | 0.400 | | | | |
| 15 | Filter | Plano | 0.300 | Glass | 1.517 | 64.2 | — |
| 16 | | Plano | 0.149 | | | | |
| 17 | Image | Plano | — | | | | |

Note:
Reference wavelength is 587.6 nm (d-line).
An effective radius of the stop S1 (Surface 12) is 1.058 mm.

TABLE 5B

| Aspheric Coefficients | | | | | | |
|---|---|---|---|---|---|---|
| Surface # | 1 | 2 | 3 | 4 | 5 | 6 |
| k= | −9.00000E+01 | 1.91885E−01 | −1.42412E+00 | −6.28923E+00 | −5.03901E+00 | −4.97552E−01 |
| A4= | −1.20475E−04 | −2.66341E−03 | −7.70222E−02 | −4.84591E−02 | 1.29000E−01 | −6.84393E−01 |
| A6= | 2.18930E−03 | 1.78356E−03 | 8.14372E−02 | 2.90243E−02 | 9.92194E−02 | 1.51919E+00 |
| A8= | −5.78657E−04 | 5.32287E−03 | −4.49361E−02 | −4.91730E−03 | −7.77496E−01 | 1.91039E+00 |
| A10= | 7.85581E−05 | −3.45715E−03 | 1.01577E−02 | −9.54721E−03 | 1.21542E+00 | −3.81716E+01 |
| A12= | −5.55652E−06 | 1.29564E−03 | 1.30830E−03 | 9.02148E−03 | −1.27002E+00 | 1.59846E+02 |
| A14= | 1.66880E−07 | −1.96344E−04 | −6.77592E−04 | −2.16861E−03 | 5.60279E−01 | −3.48400E+02 |
| A16= | — | — | — | — | — | 3.99315E+02 |
| A18= | — | — | — | — | — | −1.87775E+02 |
| Surface # | 8 | 9 | 10 | 11 | 13 | 14 |
| k= | 1.79464E+00 | 2.51590E−02 | −6.49243E+01 | −2.35647E+01 | 9.00000E+01 | 3.99932E+00 |
| A4= | −9.94287E−02 | −9.28820E−01 | −1.11570E+00 | −1.81282E−01 | −2.75547E−01 | −2.15581E−01 |
| A6= | 4.97386E−01 | 5.42058E+00 | 5.09366E+00 | 6.94614E−01 | 3.18297E−01 | 1.35453E−01 |
| A8= | −3.05776E−01 | −1.92821E+01 | −1.80644E+01 | −1.36678E+00 | −7.30257E−01 | −1.11045E−01 |
| A10= | −2.92820E+00 | 4.07110E+01 | 3.81819E+01 | 1.26126E+00 | 1.40626E+00 | 7.14293E−02 |
| A12= | 8.28173E+00 | −4.64303E+01 | −4.65203E+01 | 2.39471E−01 | −1.75670E+00 | −2.95783E−02 |
| A14= | −7.06271E+00 | 2.25051E+01 | 2.57376E+01 | −1.34755E+00 | 1.38807E+00 | 6.50055E−03 |
| A16= | — | — | −2.40185E+00 | 7.17653E−01 | −6.59713E−01 | −2.52710E−04 |
| A18= | — | — | — | — | 1.70871E−01 | −1.57390E−04 |
| A20= | — | — | — | — | −1.85148E−02 | 1.99034E−05 |

In the 5th embodiment, the equation of the aspheric surface profiles of the aforementioned lens elements is the same as the equation of the 1st embodiment.

Also, the definitions of these parameters shown in Table 5C below are the same as those stated in the 1st embodiment with corresponding values for the 5th embodiment, so an explanation in this regard will not be provided again. Moreover, these parameters can be calculated from Table 5A and Table 5B as the following values and satisfy the following conditions:

TABLE 5C

| Values of Optical and Physical Parameters/Definitions | | | |
|---|---|---|---|
| f[mm] | 1.89 | f/\|R11\| + f/\|R12\| | 0.44 |
| Fno | 2.33 | (R3 + R4)/(R3 − R4) | 2.94 |
| HFOV [deg.] | 72.9 | ATmax/f | 0.67 |

TABLE 5C-continued

| Values of Optical and Physical Parameters/Definitions | | | |
|---|---|---|---|
| FOV [deg.] | 145.8 | BL/TL | 0.13 |
| TL/ImgH | 2.67 | SL/TL | 0.47 |
| tan(HFOV) | −0.68 | TD/T56 | 7.84 |
| TD/EPD | 6.96 | T23/T12 | 0.029 |
| TD/f | 2.99 | T56/T34 | 6.16 |
| \|f/fj\|max | 0.94 | Vmin | 18.2 |
| f/f3 | −0.30 | V3 + V5 | 43.8 |
| f/f5 | −0.24 | Nmax | 1.680 |
| f/f12 | 0.45 | Y1R1/Y6R2 | 1.70 |
| f/f45 | 0.79 | Y2R1/Y5R2 | 1.56 |

6th Embodiment

Figure 11:
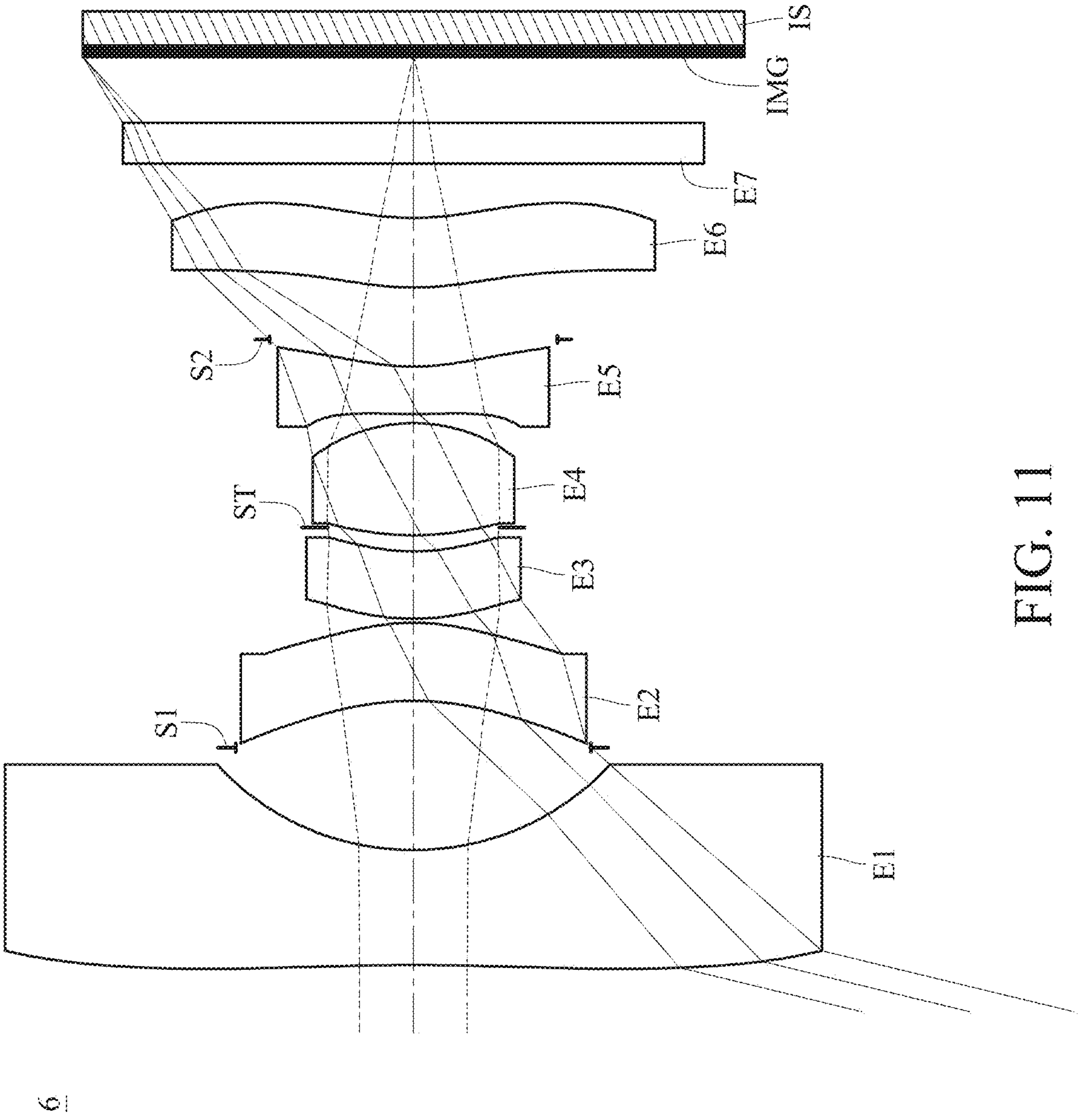
FIG. 11 is a schematic view of an image capturing unit according to the 6th embodiment of the present disclosure.

FIG. 11 is a schematic view of an image capturing unit according to the 6th embodiment of the present disclosure.

Figure 12:
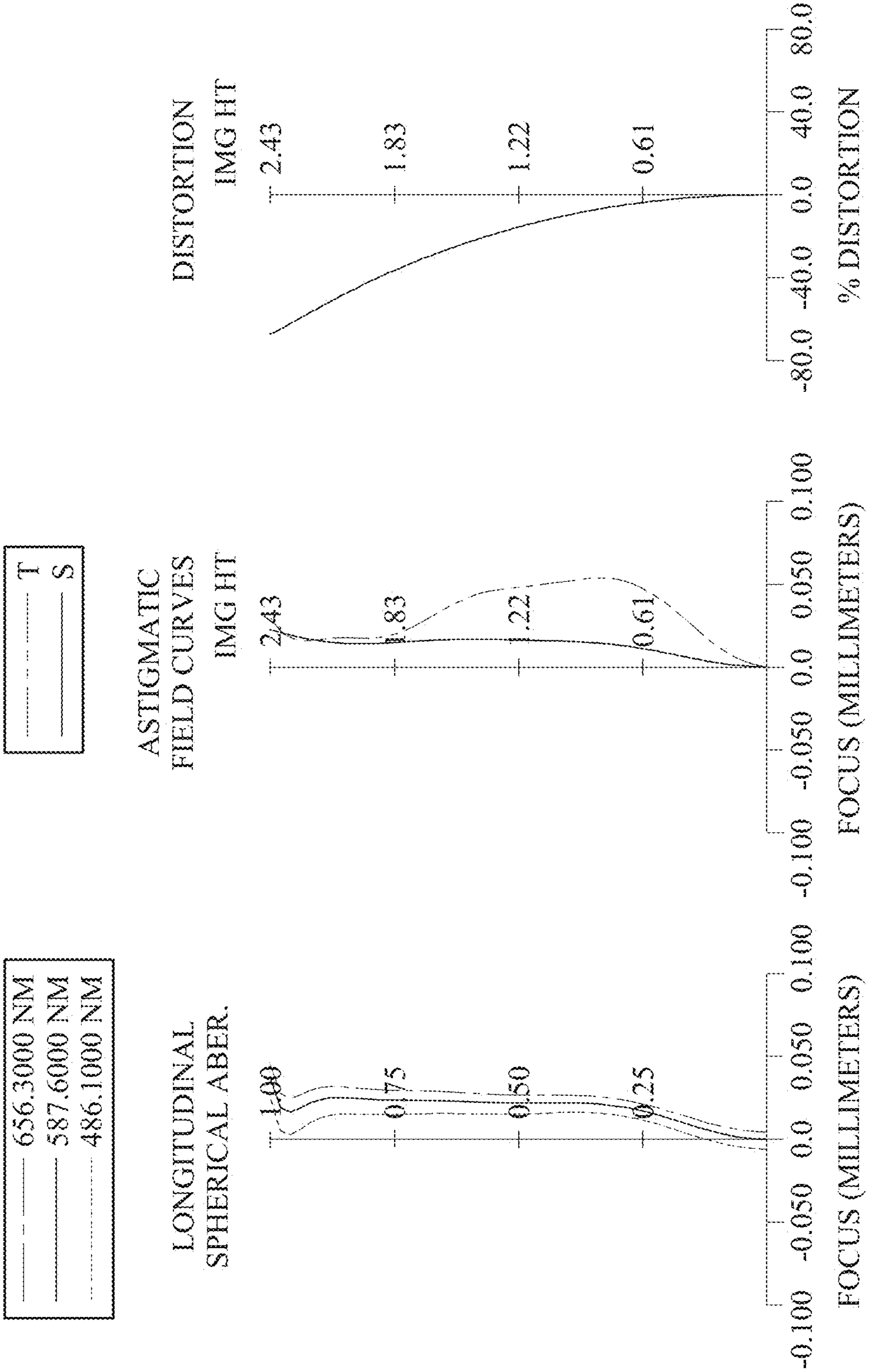
FIG. 12 shows spherical aberration curves, astigmatic field curves and a distortion curve of the image capturing unit according to the 6th embodiment.

FIG. 12 shows, in order from left to right, spherical aberration curves, astigmatic field curves and a distortion curve of the image capturing unit according to the 6th embodiment. In FIG. 11, the image capturing unit 6 includes the photographing optical lens assembly (its reference numeral is omitted) of the present disclosure and an image sensor IS. The photographing optical lens assembly includes, in order from an object side to an image side along an optical path, a first lens element E1, a stop S1, a second lens element E2, a third lens element E3, an aperture stop ST, a fourth lens element E4, a fifth lens element E5, a stop S2, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The object-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 6th embodiment are shown in Table 6A and the aspheric surface data are shown in Table 6B below.

TABLE 6A

6th Embodiment
f = 1.80 mm, Fno = 2.27, HFOV = 76.4 deg.

| Surface # | | Curvature Radius | Thickness | Material | Index | Abbe # | Focal Length |
|---|---|---|---|---|---|---|---|
| 0 | Object | Infinity | Infinity | | | | |
| 1 | Lens 1 | −18.9008 (ASP) | 0.850 | Glass | 1.547 | 62.7 | −3.36 |
| 2 | | 2.0641 (ASP) | 0.755 | | | | |
| 3 | Stop | Plano | 0.345 | | | | |
| 4 | Lens 2 | −2.1859 (ASP) | 0.577 | Plastic | 1.535 | 55.9 | 7.76 |
| 5 | | −1.5631 (ASP) | 0.030 | | | | |
| 6 | Lens 3 | 1.8377 (ASP) | 0.496 | Plastic | 1.587 | 28.3 | −21.58 |
| 7 | | 1.4447 (ASP) | 0.176 | | | | |
| 8 | Ape. Stop | Plano | −0.056 | | | | |
| 9 | Lens 4 | 2.1406 (ASP) | 0.827 | Plastic | 1.544 | 56.0 | 1.58 |
| 10 | | −1.2444 (ASP) | 0.068 | | | | |
| 11 | Lens 5 | 6.7036 (ASP) | 0.350 | Plastic | 1.669 | 19.5 | −3.47 |
| 12 | | 1.6889 (ASP) | 0.199 | | | | |
| 13 | Stop | Plano | 0.384 | | | | |
| 14 | Lens 6 | 1.9977 (ASP) | 0.514 | Plastic | 1.544 | 56.0 | 36.15 |
| 15 | | 2.0220 (ASP) | 0.400 | | | | |

TABLE 6A-continued

| 6th Embodiment f = 1.80 mm, Fno = 2.27, HFOV = 76.4 deg. | | | | | | | |
|---|---|---|---|---|---|---|---|
| Surface # | | Curvature Radius | Thickness | Material | Index | Abbe # | Focal Length |
| 16 | Filter | Plano | 0.300 | Glass | 1.517 | 64.2 | — |
| 17 | | Plano | 0.489 | | | | |
| 18 | Image | Plano | — | | | | |

Note:
Reference wavelength is 587.6 nm (d-line).
An effective radius of the stop S1 (Surface 3) is 1.310 mm.
An effective radius of the stop S2 (Surface 13) is 1.061 mm.

TABLE 6B

| Aspheric Coefficients | | | | | | |
|---|---|---|---|---|---|---|
| Surface # | 1 | 2 | 4 | 5 | 6 | 7 |
| k= | −9.00000E+01 | 2.79501E−01 | −5.00777E+00 | −8.12185E+00 | −7.91578E+00 | −6.62647E+00 |
| A4= | 5.64083E−03 | 5.99949E−03 | −5.95229E−02 | 1.99805E−02 | 1.53610E−01 | −8.19425E−02 |
| A6= | −3.76127E−05 | −9.50293E−03 | 1.16989E−01 | −1.22170E−03 | −9.40610E−02 | −2.91430E−01 |
| A8= | −1.59060E−04 | 1.61548E−02 | −1.16563E−01 | 3.83235E−02 | −1.01091E+00 | 5.35426E+00 |
| A10= | 3.02877E−05 | −1.12080E−02 | 6.94306E−02 | −7.86506E−02 | 3.75886E+00 | −3.34938E+01 |
| A12= | −2.25963E−06 | 1.90649E−03 | −2.58872E−02 | 4.02052E−02 | −7.24238E+00 | 1.08550E+02 |
| A14= | 6.25603E−08 | 2.23394E−04 | 4.57549E−03 | −3.72630E−03 | 6.72541E+00 | −1.80737E+02 |
| A16= | — | — | — | — | −2.29725E+00 | 1.25428E+02 |
| Surface # | 9 | 10 | 11 | 12 | 14 | 15 |
| k= | −8.78452E−01 | −6.65909E−01 | 2.24883E+01 | −1.48660E+01 | −9.06446E−01 | −1.82567E−02 |
| A4= | −3.43665E−02 | −1.27765E−01 | −5.34893E−01 | −6.58175E−02 | −2.65292E−01 | −2.29180E−01 |
| A6= | −1.61730E−01 | 9.69479E−01 | 2.05757E+00 | 2.22615E−01 | 2.33837E−01 | 1.12812E−01 |
| A8= | 8.64397E−01 | −4.12511E+00 | −9.35864E+00 | −5.88323E−01 | −2.18468E−01 | −5.34920E−02 |
| A10= | −5.21493E−01 | 7.89158E+00 | 2.50787E+01 | 5.80160E−01 | 1.91008E−01 | 1.89022E−02 |
| A12= | −9.71678E+00 | −6.99124E+00 | −4.25062E+01 | 1.39277E−01 | −1.24587E−01 | −5.51411E−03 |
| A14= | 2.83054E+01 | 8.55378E−01 | 4.15712E+01 | −7.60667E−01 | 5.39205E−02 | 1.84360E−03 |
| A16= | −2.21840E+01 | 2.00639E+00 | −1.97624E+01 | 6.06657E−01 | −1.45122E−02 | −6.77524E−04 |
| A18= | — | — | 2.88817E+00 | −1.65474E−01 | 2.21017E−03 | 1.56000E−04 |
| A20= | — | — | — | — | −1.46946E−04 | −1.44661E−05 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Optical and Physical Parameters/Definitions | | | |
|---|---|---|---|
| f[mm] | 1.80 | f/\|R11\| + f/\|R12\| | 1.79 |
| Fno | 2.27 | (R3 + R4)/(R3 − R4) | 6.02 |
| HFOV [deg.] | 76.4 | ΣATmax/f | 0.61 |
| FOV [deg.] | 152.7 | BL/TL | 0.18 |
| TL/ImgH | 2.75 | SL/TL | 0.52 |
| tan(HFOV) | −0.52 | TD/T56 | 9.46 |
| TD/EPD | 6.95 | T23/T12 | 0.027 |
| TD/f | 3.06 | T56/T34 | 4.86 |
| \|f/fj\|max | 1.14 | Vmin | 19.5 |
| f/f3 | −0.08 | V3 + V5 | 47.8 |
| f/f5 | −0.52 | Nmax | 1.669 |
| f/f12 | −0.16 | Y1R1/Y6R2 | 1.69 |
| f/f45 | 0.81 | Y2R1/Y5R2 | 1.27 |

7th Embodiment

Figure 13:
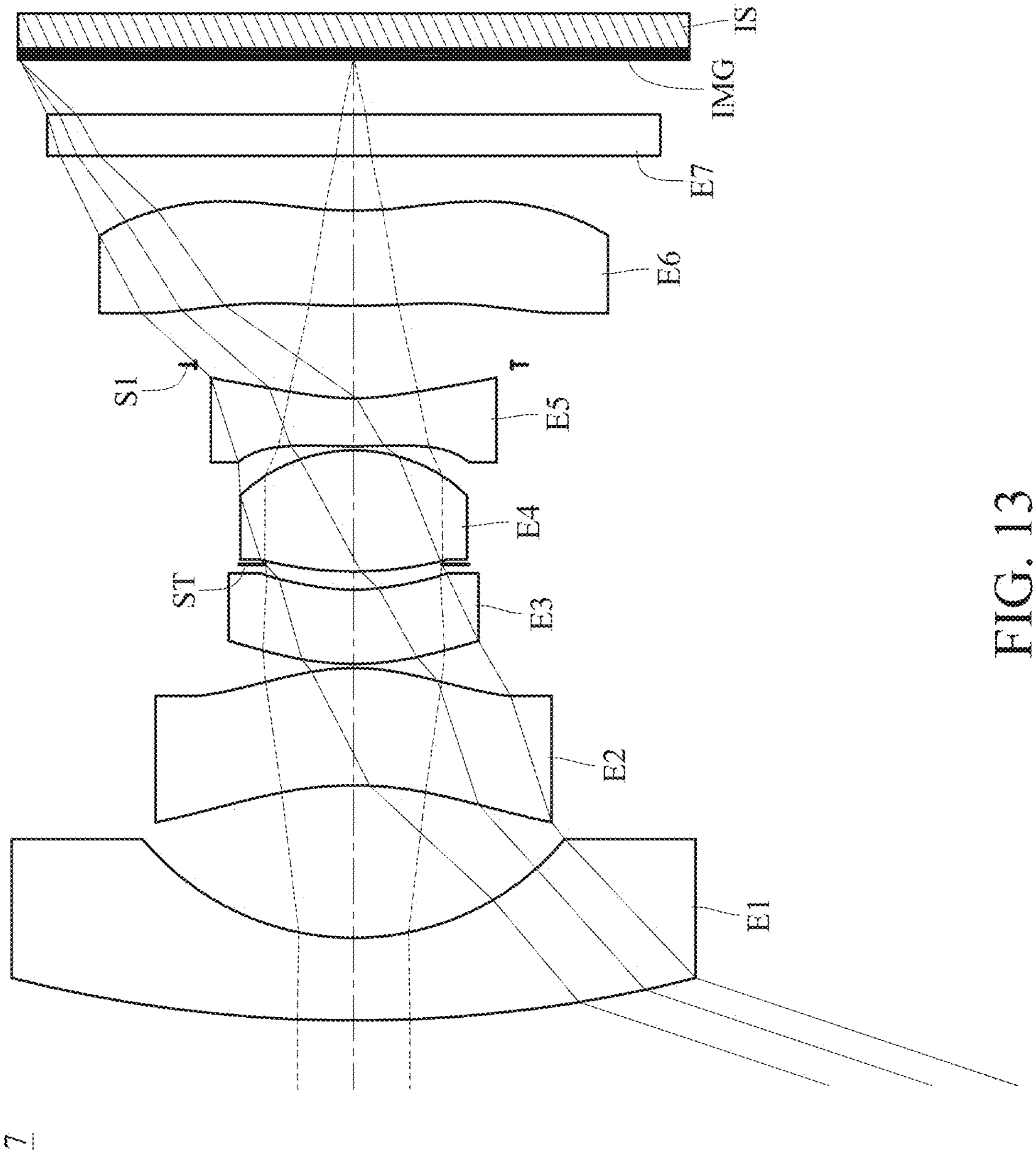
FIG. 13 is a schematic view of an image capturing unit according to the 7th embodiment of the present disclosure.
Figure 14:
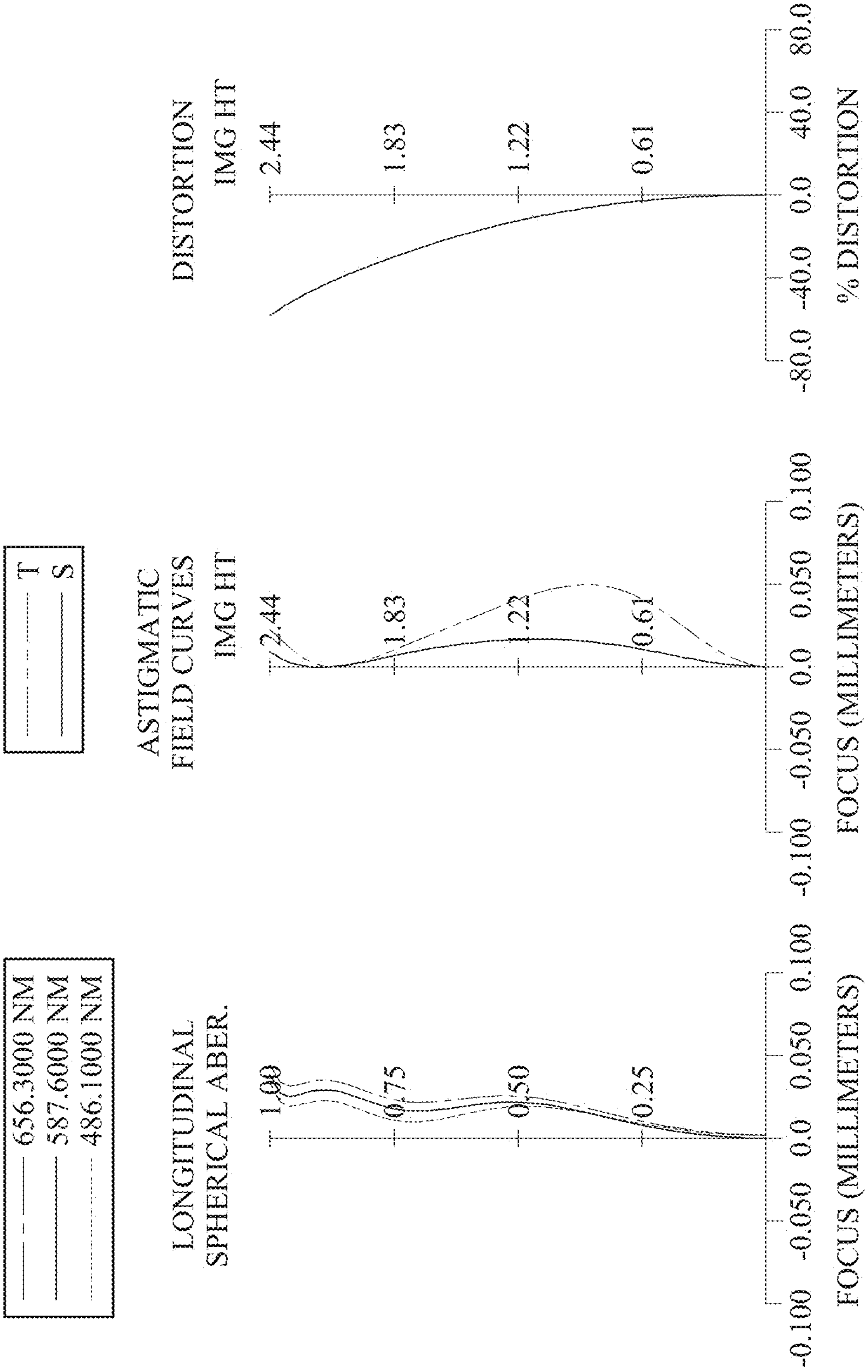
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 7th embodiment are shown in Table 7A and the aspheric surface data are shown in Table 7B below.

TABLE 7A

| 7th Embodiment<br>f = 1.95 mm, Fno = 2.38, HFOV = 71.5 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | 10.1571 (SPH) | 0.600 | Glass | 1.729 | 54.7 | −3.53 |
| 2 | | 2.0008 (SPH) | 1.111 | | | | |
| 3 | Lens 2 | −2.6162 (ASP) | 0.854 | Plastic | 1.544 | 56.0 | 5.51 |
| 4 | | −1.5576 (ASP) | 0.030 | | | | |
| 5 | Lens 3 | 2.1668 (ASP) | 0.540 | Plastic | 1.669 | 19.5 | −12.29 |
| 6 | | 1.5437 (ASP) | 0.183 | | | | |
| 7 | Ape. Stop | Plano | −0.051 | | | | |
| 8 | Lens 4 | 2.5546 (ASP) | 0.881 | Plastic | 1.544 | 56.0 | 1.65 |
| 9 | | −1.2131 (ASP) | 0.030 | | | | |
| 10 | Lens 5 | 6.1211 (ASP) | 0.350 | Plastic | 1.669 | 19.5 | −3.99 |
| 11 | | 1.8157 (ASP) | 0.243 | | | | |
| 12 | Stop | Plano | 0.428 | | | | |
| 13 | Lens 6 | 4.1660 (ASP) | 0.693 | Plastic | 1.544 | 56.0 | −13.83 |
| 14 | | 2.5239 (ASP) | 0.400 | | | | |
| 15 | Filter | Plano | 0.300 | Glass | 1.517 | 64.2 | — |
| 16 | | Plano | 0.399 | | | | |
| 17 | Image | Plano | — | | | | |

Note:
Reference wavelength is 587.6 nm (d-line).
An effective radius of the stop S1 (Surface 12) is 1.150 mm.

TABLE 7B

| Aspheric Coefficients | | | | | | |
|---|---|---|---|---|---|---|
| Surface # | 3 | 4 | 5 | 6 | 8 | 9 |
| k= | −6.45268E+00 | −8.12339E+00 | −8.31626E+00 | −6.65981E+00 | 1.04347E−01 | −5.74728E−01 |
| A4= | −3.53447E−02 | 2.79950E−02 | 1.12813E−01 | −1.97094E−01 | −6.93463E−02 | −1.90933E−01 |
| A6= | 6.32960E−02 | −1.65810E−02 | −1.90344E−01 | 1.13874E+00 | 1.66301E−01 | 1.51841E+00 |
| A8= | −4.08319E−02 | 5.51718E−02 | 2.66946E−01 | −5.60338E+00 | 2.24555E−01 | −6.26931E+00 |
| A10= | 1.38406E−02 | −6.52144E−02 | −5.69039E−01 | 1.82603E+01 | −3.16419E+00 | 1.29519E+01 |

TABLE 7B-continued

| Aspheric Coefficients | | | | | | |
|---|---|---|---|---|---|---|
| A12= | −1.97424E−03 | 3.58518E−02 | 6.30614E−01 | −3.18019E+01 | 7.44997E+00 | −1.40957E+01 |
| A14= | 8.35400E−06 | −6.51584E−03 | −2.25400E−01 | 2.41624E+01 | −4.97928E+00 | 6.39709E+00 |

| Surface # | 10 | 11 | 13 | 14 | — | — |
|---|---|---|---|---|---|---|
| k= | 2.33939E+01 | −1.79760E+01 | 2.26634E+00 | 2.25504E−01 | — | — |
| A4= | −5.91763E−01 | −4.59761E−02 | −2.69798E−01 | −2.29118E−01 | — | — |
| A6= | 2.44226E+00 | 1.30835E−01 | 3.08532E−01 | 1.62502E−01 | — | — |
| A8= | −1.03237E+01 | −3.18475E−01 | −3.74741E−01 | −1.26117E−01 | — | — |
| A10= | 2.57384E+01 | 3.83345E−01 | 3.69682E−01 | 7.62139E−02 | — | — |
| A12= | −3.92556E+01 | −2.49813E−01 | −2.42594E−01 | −3.32265E−02 | — | — |
| A14= | 3.26502E+01 | 1.16658E−01 | 1.00769E−01 | 1.01440E−02 | — | — |
| A16= | −1.11747E+01 | −3.26256E−02 | −2.55314E−02 | −2.05690E−03 | — | — |
| A18= | — | — | 3.60922E−03 | 2.45059E−04 | — | — |
| A20= | — | — | −2.18835E−04 | −1.27733E−05 | — | — |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Optical and Physical Parameters/Definitions | | | |
|---|---|---|---|
| f [mm] | 1.95 | f/\|R11\| + f/\|R12\| | 1.24 |
| Fno | 2.38 | (R3 + R4)/(R3 − R4) | 3.94 |
| HFOV [deg.] | 71.5 | ATmax/f | 0.57 |
| FOV [deg.] | 143.0 | BL/TL | 0.16 |
| TL/ImgH | 2.87 | SL/TL | 0.53 |
| tan(HFOV) | −0.75 | TD/T56 | 8.78 |
| TD/EPD | 7.18 | T23/T12 | 0.027 |
| TD/f | 3.02 | T56/T34 | 5.08 |
| \|f/fj\|max | 1.19 | Vmin | 19.5 |
| f/f3 | −0.16 | V3 + V5 | 39.0 |
| f/f5 | −0.49 | Nmax | 1.729 |
| f/f12 | 0.01 | Y1R1/Y6R2 | 1.34 |
| f/f45 | 0.86 | Y2R1/Y5R2 | 1.38 |

8th Embodiment

Figure 15:
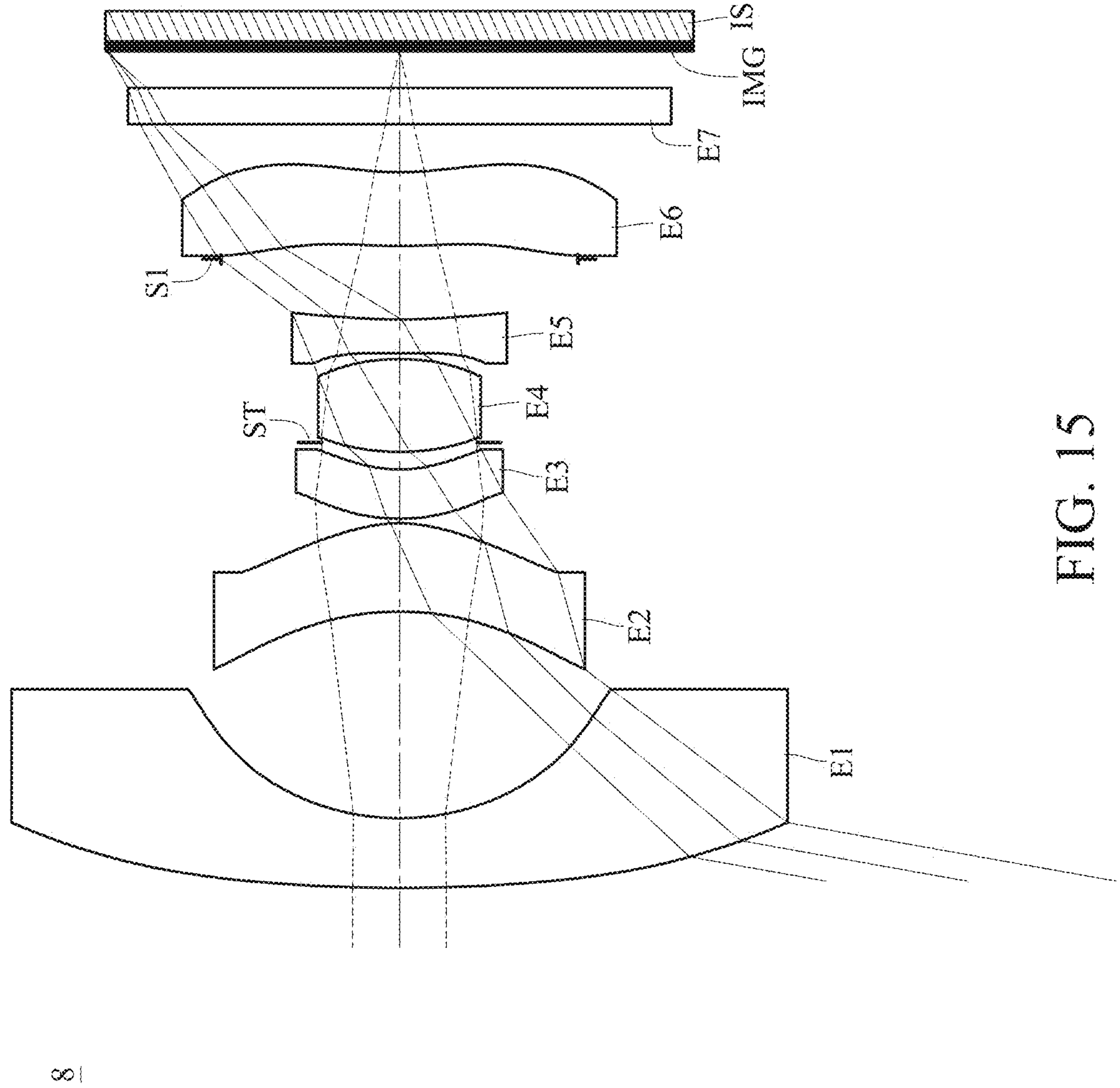
FIG. 15 is a schematic view of an image capturing unit according to the 8th embodiment of the present disclosure.
Figure 16:
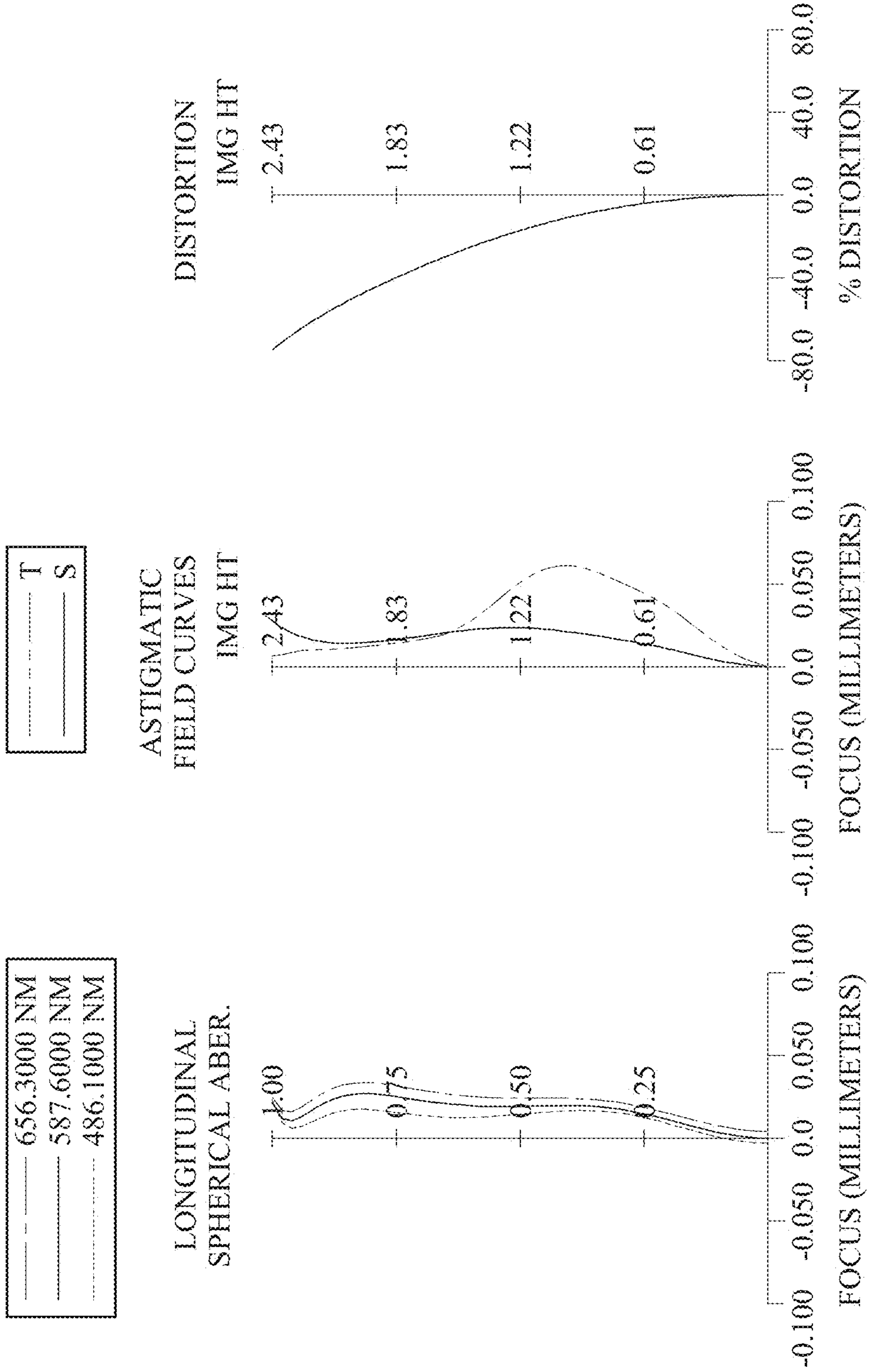
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the object-side surface of the fourth lens element E4 is equal to Ymin.

The detailed optical data of the 8th embodiment are shown in Table 8A and the aspheric surface data are shown in Table 8B below.

TABLE 8A

| 8th Embodiment<br>f = 1.73 mm, Fno = 2.20, HFOV = 79.9 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | 14.4014 (ASP) | 0.583 | Glass | 1.713 | 53.8 | −3.49 |
| 2 | | 2.0871 (ASP) | 1.729 | | | | |
| 3 | Lens 2 | −2.5166 (ASP) | 0.739 | Plastic | 1.544 | 56.0 | 3.51 |
| 4 | | −1.1977 (ASP) | 0.038 | | | | |
| 5 | Lens 3 | 1.5865 (ASP) | 0.412 | Plastic | 1.697 | 16.3 | −6.49 |
| 6 | | 1.0492 (ASP) | 0.226 | | | | |
| 7 | Ape. Stop | Plano | −0.079 | | | | |
| 8 | Lens 4 | 1.8694 (ASP) | 0.776 | Plastic | 1.544 | 56.0 | 2.10 |
| 9 | | −2.4987 (ASP) | 0.050 | | | | |
| 10 | Lens 5 | 6.6329 (ASP) | 0.281 | Plastic | 1.697 | 16.3 | −10.75 |
| 11 | | 3.4582 (ASP) | 0.505 | | | | |
| 12 | Stop | Plano | 0.112 | | | | |
| 13 | Lens 6 | 4.7032 (ASP) | 0.617 | Plastic | 1.535 | 55.9 | −11.95 |
| 14 | | 2.5845 (ASP) | 0.404 | | | | |
| 15 | Filter | Plano | 0.300 | Glass | 1.517 | 64.2 | — |
| 16 | | Plano | 0.308 | | | | |
| 17 | Image | Plano | — | | | | |

Note:
Reference wavelength is 587.6 nm (d-line).
An effective radius of the stop S1 (Surface 12) is 1.494 mm.

TABLE 8B

| Aspheric Coefficients | | | | | | |
|---|---|---|---|---|---|---|
| Surface # | 1 | 2 | 3 | 4 | 5 | 6 |
| k= | 6.39341E+00 | 9.76123E−02 | −1.94296E+00 | −6.59322E+00 | −4.46863E+00 | −3.94996E−01 |
| A4= | −1.00079E−04 | 5.80337E−03 | −6.89946E−02 | −5.27627E−02 | 1.00149E−01 | −6.91748E−01 |
| A6= | 1.83527E−04 | −1.36502E−02 | 8.11751E−02 | 8.33091E−02 | 1.82949E−01 | 1.94157E+00 |
| A8= | 7.15706E−05 | 2.00132E−02 | −4.62229E−02 | −9.84561E−02 | −7.36092E−01 | −4.11076E+00 |
| A10= | −1.82493E−05 | −1.36292E−02 | 9.79878E−03 | 7.52720E−02 | 1.08983E+00 | 1.99475E+00 |
| A12= | 1.46092E−06 | 4.92694E−03 | 9.73741E−04 | −3.30428E−02 | −1.06859E+00 | 1.61921E+01 |
| A14= | −3.99794E−08 | −6.94463E−04 | −4.30657E−04 | 6.51446E−03 | 4.16642E−01 | −5.25231E+01 |
| A16= | — | — | — | — | — | 6.73371E+01 |
| A18= | — | — | — | — | — | −3.12680E+01 |
| Surface # | 8 | 9 | 10 | 11 | 13 | 14 |
| k= | 5.71506E−01 | 2.15606E+00 | −8.63023E+01 | −6.75260E+01 | 2.43743E+00 | 1.87947E−01 |
| A4= | −1.10308E−01 | −9.81382E−01 | −1.17761E+00 | −1.73356E−01 | −2.69602E−01 | −2.22884E−01 |
| A6= | 2.97996E−01 | 4.87416E+00 | 4.93513E+00 | 5.52117E−01 | 2.93613E−01 | 1.57687E−01 |
| A8= | 2.81075E−01 | −1.43435E+01 | −1.54186E+01 | −7.84558E−01 | −3.51951E−01 | −1.31544E−01 |
| A10= | −2.34354E+00 | 2.45039E+01 | 2.97101E+01 | 2.66144E−01 | 3.68427E−01 | 8.77753E−02 |
| A12= | 4.19801E+00 | −2.27674E+01 | −3.51310E+01 | 6.67651 E−01 | −2.64779E−01 | −4.28206E−02 |
| A14= | −2.59989E+00 | 9.18252E+00 | 2.15925E+01 | −8.13729E−01 | 1.22262E−01 | 1.45862E−02 |
| A16= | — | — | −4.56270E+00 | 2.81920E−01 | −3.45698E−02 | −3.27074E−03 |
| A18= | — | — | — | — | 5.41882E−03 | 4.28520E−04 |
| A20= | — | — | — | — | −3.58125E−04 | −2.44881E−05 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Optical and Physical Parameters/Definitions | | | |
|---|---|---|---|
| f[mm] | 1.73 | f/\|R11\| + f/\|R12\| | 1.04 |
| Fno | 2.20 | (R3 + R4)/(R3 − R4) | 2.82 |
| HFOV [deg.] | 79.9 | ATmax/f | 1.00 |
| FOV [deg.] | 159.7 | BL/TL | 0.14 |
| TL/ImgH | 2.87 | SL/TL | 0.47 |
| tan(HFOV) | −0.37 | TD/T56 | 9.71 |
| TD/EPD | 7.63 | T23/T12 | 0.022 |
| TD/f | 3.47 | T56/T34 | 4.20 |
| \|f/fj\|max | 0.82 | Vmin | 16.3 |
| f/f3 | −0.27 | V3 + V5 | 32.6 |
| f/f5 | −0.16 | Nmax | 1.713 |
| f/f12 | 0.34 | Y1R1/Y6R2 | 1.78 |
| f/f45 | 0.72 | Y2R1/Y5R2 | 1.72 |

9th Embodiment

Figure 17:
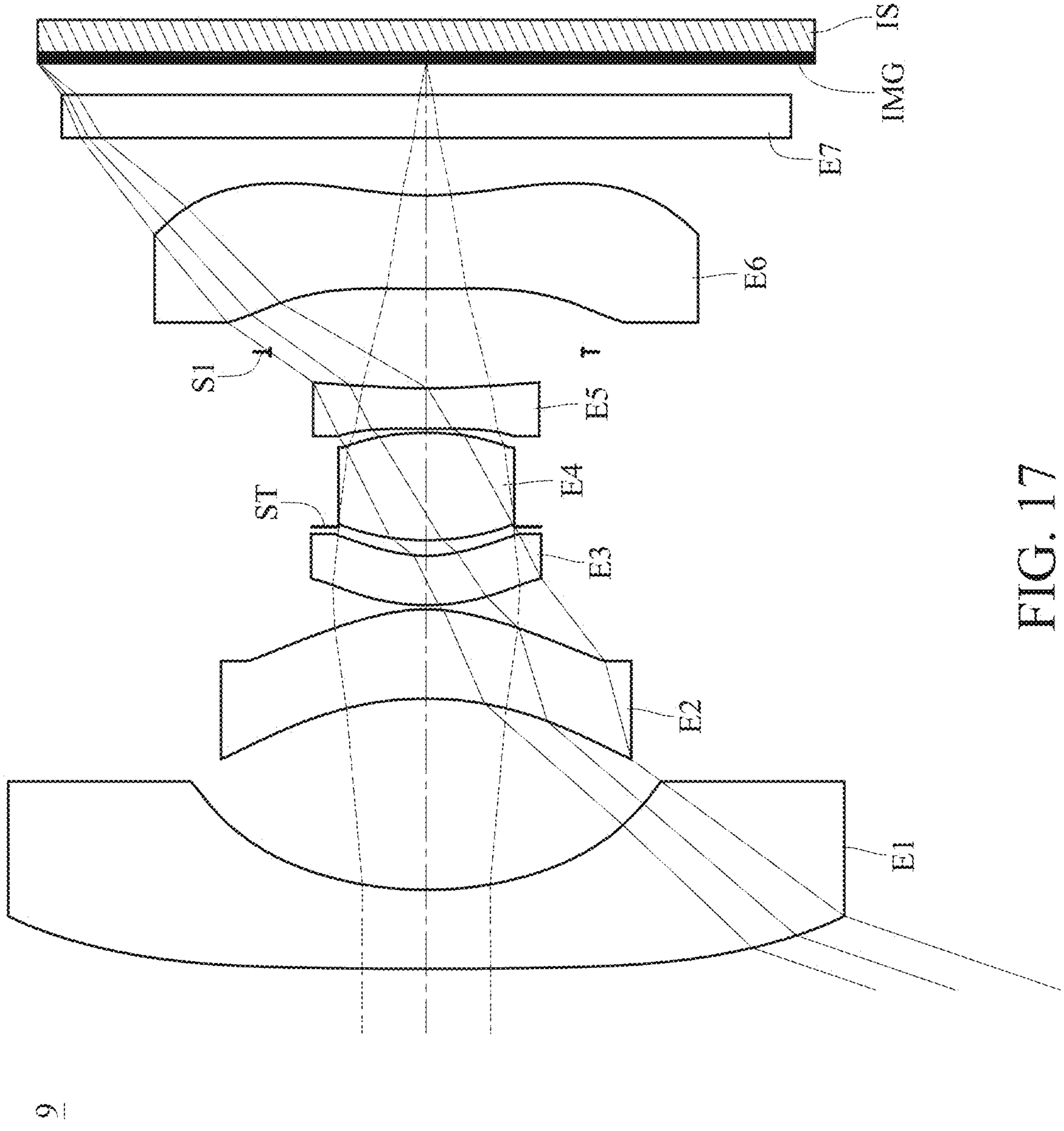
FIG. 17 is a schematic view of an image capturing unit according to the 9th embodiment of the present disclosure.
Figure 18:
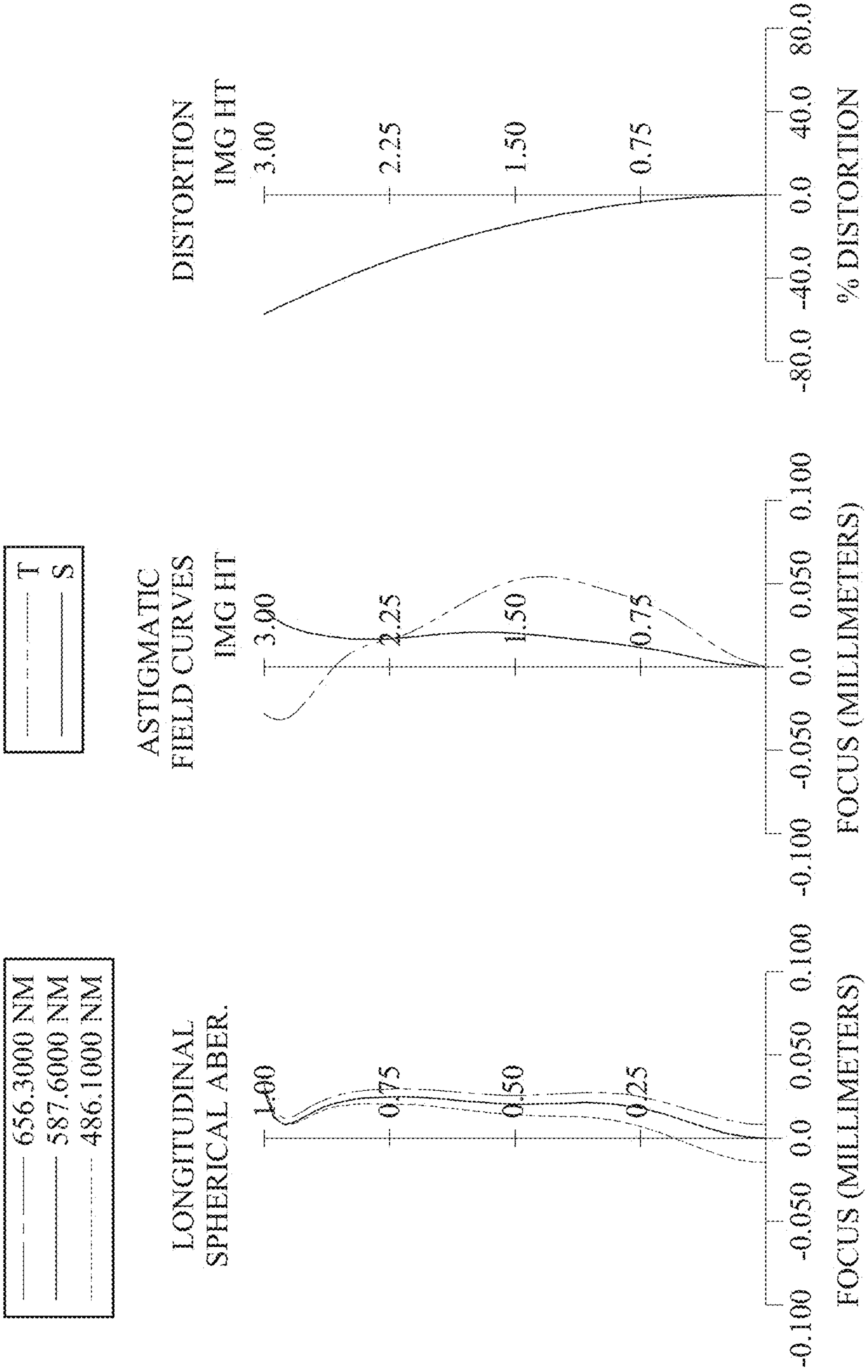
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has two inflection points. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the fourth lens element E4 is equal to Ymin.

The detailed optical data of the 9th embodiment are shown in Table 9A and the aspheric surface data are shown in Table 9B below.

TABLE 9A

| 9th Embodiment<br>f = 2.38 mm, Fno = 2.40, HFOV = 71.1 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | 46.9406 (ASP) | 0.610 | Plastic | 1.544 | 56.0 | −5.72 |
| 2 | | 2.9046 (ASP) | 1.477 | | | | |
| 3 | Lens 2 | −2.7097 (ASP) | 0.690 | Plastic | 1.544 | 55.5 | 4.19 |
| 4 | | −1.3481 (ASP) | 0.033 | | | | |
| 5 | Lens 3 | 1.6390 (ASP) | 0.382 | Plastic | 1.614 | 25.6 | −7.12 |
| 6 | | 1.0863 (ASP) | 0.224 | | | | |
| 7 | Ape. Stop | Plano | −0.105 | | | | |
| 8 | Lens 4 | 1.9326 (ASP) | 0.830 | Plastic | 1.544 | 56.0 | 2.22 |

TABLE 9A-continued

| 9th Embodiment f = 2.38 mm, Fno = 2.40, HFOV = 71.1 deg. | | | | | | | |
|---|---|---|---|---|---|---|---|
| Surface # | | Curvature Radius | Thickness | Material | Index | Abbe # | Focal Length |
| 9 | | −2.7441 (ASP) | 0.033 | | | | |
| 10 | Lens 5 | 12.7050 (ASP) | 0.311 | Plastic | 1.680 | 18.2 | −11.10 |
| 11 | | 4.6894 (ASP) | 0.280 | | | | |
| 12 | Stop | Plano | 0.488 | | | | |
| 13 | Lens 6 | 11.6048 (ASP) | 0.723 | Plastic | 1.535 | 55.9 | −6.29 |
| 14 | | 2.5495 (ASP) | 0.444 | | | | |
| 15 | Filter | Plano | 0.333 | Glass | 1.517 | 64.2 | — |
| 16 | | Plano | 0.243 | | | | |
| 17 | Image | Plano | — | | | | |

Note:
Reference wavelength is 587.6 nm (d-line).
An effective radius of the stop S1 (Surface 12) is 1.208 mm.

TABLE 9B

| Aspheric Coefficients | | | | | | |
|---|---|---|---|---|---|---|
| Surface # | 1 | 2 | 3 | 4 | 5 | 6 |
| k= | 9.00000E+01 | 2.43432E−01 | −1.99846E+00 | −7.03880E+00 | −5.37137E+00 | −7.31402E−01 |
| A4= | −3.39151E−03 | 7.87842E−04 | −5.40879E−02 | −1.32113E−02 | 9.11920E−02 | −5.67007E−01 |
| A6= | 2.47264E−03 | 2.33872E−04 | 6.10059E−02 | −5.25670E−03 | 2.02667E−01 | 1.20124E+00 |
| A8= | −4.46744E−04 | 5.09107E−03 | −3.83529E−02 | 1.50799E−02 | −8.89066E−01 | 5.34017E−01 |
| A10= | 4.27332E−05 | −2.69378E−03 | 1.26329E−02 | −1.27093E−02 | 1.35976E+00 | −1.84094E+01 |
| A12= | −2.14780E−06 | 8.01244E−04 | −1.68069E−03 | 5.14701E−03 | −1.27464E+00 | 7.11516E+01 |
| A14= | 4.62677E−08 | −9.89861E−05 | 3.35765E−05 | −6.59606E−04 | 4.87964E−01 | −1.38662E+02 |
| A16= | — | — | — | — | — | 1.38752E+02 |
| A18= | — | — | — | — | — | −5.57182E+01 |
| Surface # | 8 | 9 | 10 | 11 | 13 | 14 |
| k= | 1.14311E+00 | 2.37223E+00 | −7.26050E+01 | −6.36448E+01 | −4.62270E+01 | −4.95736E−02 |
| A4= | −7.40507E−02 | −8.27546E−01 | −9.17774E−01 | −1.08921E−01 | −1.92794E−01 | −1.77505E−01 |
| A6= | 2.29821E−01 | 4.16028E+00 | 3.67136E+00 | 2.83722E−01 | 2.04805E−01 | 1.18794E−01 |
| A8= | 9.64263E−02 | −1.22087E+01 | −1.07131E+01 | −3.31180E−01 | −3.04207E−01 | −8.88662E−02 |
| A10= | −1.39193E+00 | 2.05075E+01 | 1.79206E+01 | −1.00318E−01 | 3.64622E−01 | 5.08146E−02 |
| A12= | 2.22230E+00 | −1.82181E+01 | −1.69249E+01 | 7.22916E−01 | −2.87612E−01 | −2.03616E−02 |
| A14= | −1.18135E+00 | 6.75629E+00 | 7.71718E+00 | −6.81678E−01 | 1.41900E−01 | 5.42099E−03 |
| A16= | — | — | −1.08555E+00 | 2.07416E−01 | −4.15831E−02 | −9.10020E−04 |
| A18= | — | — | — | — | 6.57355E−03 | 8.66475E−05 |
| A20= | — | — | — | — | −4.29679E−04 | −3.53258E−06 |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Values of Optical and Physical Parameters/Definitions | | | |
|---|---|---|---|
| f[mm] | 2.38 | f/\|R11\| + f/\|R12\| | 1.14 |
| Fno | 2.40 | (R3 + R4)/(R3 − R4) | 2.98 |
| HFOV [deg.] | 71.1 | ATmax/f | 0.62 |
| FOV [deg.] | 142.2 | BL/TL | 0.15 |
| TL/ImgH | 2.33 | SL/TL | 0.51 |
| tan(HFOV) | −0.77 | TD/T56 | 7.78 |
| TD/EPD | 6.02 | T23/T12 | 0.022 |
| TD/f | 2.51 | T56/T34 | 6.45 |
| \|f/fj\|max | 1.07 | Vmin | 18.2 |

TABLE 9C-continued

| Values of Optical and Physical Parameters/Definitions | | | |
|---|---|---|---|
| f/f3 | −0.33 | V3 + V5 | 43.8 |
| f/f5 | −0.21 | Nmax | 1.680 |
| f/f12 | 0.37 | Y1R1/Y6R2 | 1.54 |
| f/f45 | 0.92 | Y2R1/Y5R2 | 1.82 |

10th Embodiment

Figure 19:
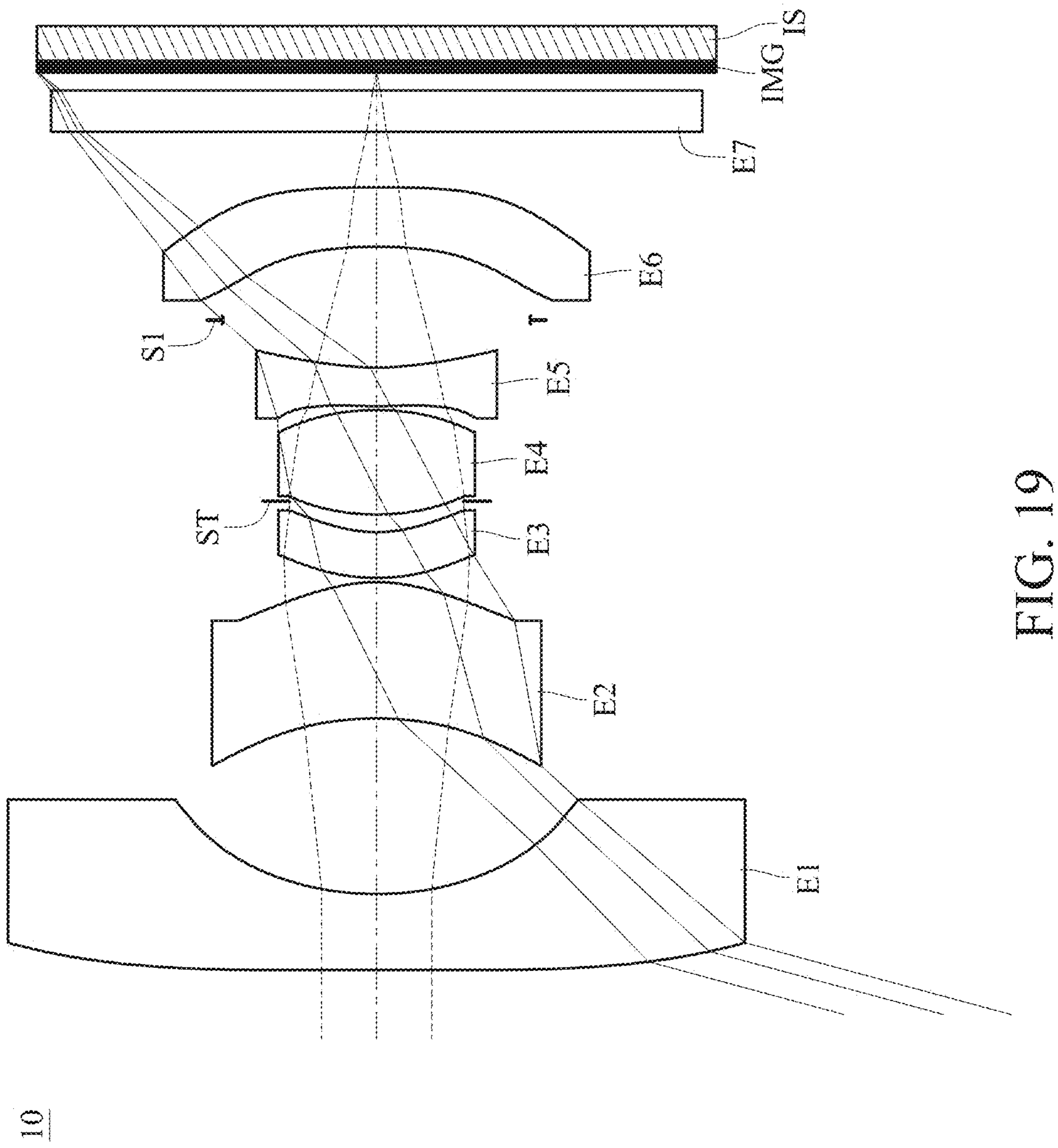
FIG. 19 is a schematic view of an image capturing unit according to the 10th embodiment of the present disclosure.
Figure 20:
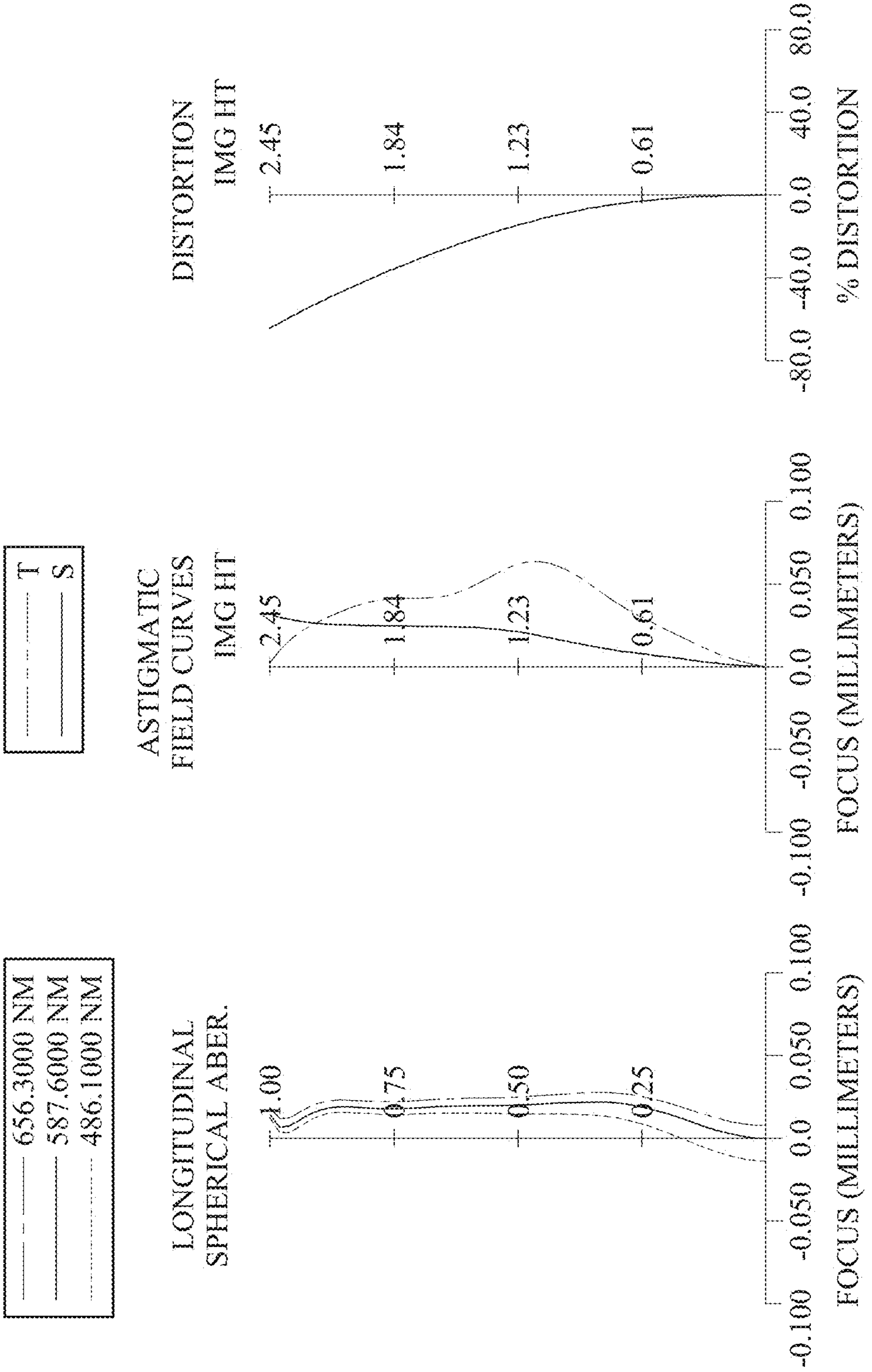
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 10th embodiment are shown in Table 10A and the aspheric surface data are shown in Table 10B below.

TABLE 10A

10th Embodiment
f = 1.85 mm, Fno = 2.32, HFOV = 74.9 deg.

| Surface # | | Curvature Radius | Thickness | Material | Index | Abbe # | Focal Length |
|---|---|---|---|---|---|---|---|
| 0 | Object | Infinity | Infinity | | | | |
| 1 | Lens 1 | −102.9227 (ASP) | 0.550 | Plastic | 1.545 | 56.0 | −4.00 |
| 2 | | 2.2311 (ASP) | 1.272 | | | | |
| 3 | Lens 2 | −2.3896 (ASP) | 0.988 | Plastic | 1.544 | 56.0 | 3.18 |
| 4 | | −1.1499 (ASP) | 0.030 | | | | |
| 5 | Lens 3 | 1.4552 (ASP) | 0.331 | Plastic | 1.584 | 28.2 | −5.99 |
| 6 | | 0.9418 (ASP) | 0.223 | | | | |
| 7 | Ape. Stop | Plano | −0.095 | | | | |
| 8 | Lens 4 | 1.6793 (ASP) | 0.755 | Plastic | 1.544 | 56.0 | 1.96 |
| 9 | | −2.4674 (ASP) | 0.030 | | | | |
| 10 | Lens 5 | 3.8284 (ASP) | 0.280 | Plastic | 1.669 | 19.5 | −7.26 |
| 11 | | 2.0778 (ASP) | 0.344 | | | | |
| 12 | Stop | Plano | 0.531 | | | | |
| 13 | Lens 6 | −3.3745 (ASP) | 0.431 | Plastic | 1.650 | 21.8 | −7.64 |
| 14 | | −11.0675 (ASP) | 0.400 | | | | |
| 15 | Filter | Plano | 0.300 | Glass | 1.517 | 64.2 | — |
| 16 | | Plano | 0.131 | | | | |
| 17 | Image | Plano | — | | | | |

Note:

Reference wavelength is 587.6 nm (d-line).

An effective radius of the stop S1 (Surface 12) is 1.114 mm.

TABLE 10B

| Aspheric Coefficients | | | | | | |
|---|---|---|---|---|---|---|
| Surface # | 1 | 2 | 3 | 4 | 5 | 6 |
| k= | −9.00000E+01 | 1.73737E−04 | −1.12961E+00 | −6.74808E+00 | −4.74684E+00 | −6.95148E−01 |
| A4= | 7.71253E−03 | 1.55747E−02 | −8.23176E−02 | −4.79398E−02 | 1.00328E−01 | −7.77955E−01 |
| A6= | −1.61504E−03 | −1.61233E−02 | 8.04452E−02 | 5.66127E−02 | 3.97847E−01 | 1.94438E+00 |
| A8= | 4.83841E−04 | 4.09323E−02 | −4.90603E−02 | −1.01286E−01 | −1.72671E+00 | 2.15718E+00 |
| A10= | −8.42878E−05 | −3.78665E−02 | 1.83334E−02 | 1.59023E−01 | 2.84889E+00 | −5.17754E+01 |
| A12= | 7.23565E−06 | 1.83159E−02 | −2.09626E−03 | −1.20127E−01 | −2.67565E+00 | 2.29327E+02 |
| A14= | −2.37931E−07 | −3.34169E−03 | −2.18655E−04 | 3.67939E−02 | 9.96591E−01 | −5.13977E+02 |
| A16= | — | — | — | — | — | 5.93920E+02 |
| A18= | — | — | — | — | — | −2.78045E+02 |
| Surface # | 8 | 9 | 10 | 11 | 13 | 14 |
| k= | 1.70924E+00 | 3.06861E+00 | −8.21707E+01 | −1.14860E+01 | −3.25437E+01 | −6.76579E+01 |
| A4= | −2.86422E−02 | −1.15745E+00 | −1.21456E+00 | −1.36898E−01 | −2.03113E−01 | −4.92105E−02 |
| A6= | 2.93031E−03 | 7.09710E+00 | 6.00370E+00 | 3.33259E−01 | −2.68731E−02 | −1.61103E−01 |
| A8= | 1.69559E+00 | −2.51855E+01 | −2.23679E+01 | −4.74157E−02 | 1.84197E−01 | 2.67346E−01 |
| A10= | −8.43662E+00 | 5.20312E+01 | 4.85554E+01 | −1.60027E+00 | −1.14693E−01 | −2.54676E−01 |
| A12= | 1.55215E+01 | −5.84936E+01 | −6.08438E+01 | 3.88586E+00 | −1.34672E−01 | 1.56744E−01 |
| A14= | −1.02114E+01 | 2.79396E+01 | 3.49270E+01 | −3.86721E+00 | 3.16411E−01 | −6.22197E−02 |
| A16= | — | — | −3.63509E+00 | 1.45005E+00 | −2.40354E−01 | 1.59437E−02 |
| A18= | — | — | — | — | 8.21357E−02 | −2.50405E−03 |
| A20= | — | — | — | — | −1.06604E−02 | 1.86531E−04 |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Values of Optical and Physical Parameters/Definitions | | | |
|---|---|---|---|
| f[mm] | 1.85 | f/\|R11\| + f/\|R12\| | 0.71 |
| Fno | 2.32 | (R3 + R4)/(R3 − R4) | 2.86 |
| HFOV [deg.] | 74.9 | ATmax/f | 0.69 |
| FOV [deg.] | 149.9 | BL/TL | 0.13 |
| TL/ImgH | 2.65 | SL/TL | 0.48 |
| tan(HFOV) | −0.58 | TD/T56 | 6.48 |
| TD/EPD | 7.12 | T23/T12 | 0.024 |
| TD/f | 3.07 | T56/T34 | 6.84 |
| \|f/fj\|max | 0.94 | Vmin | 19.5 |
| f/f3 | −0.31 | V3 + V5 | 47.7 |
| f/f5 | −0.25 | Nmax | 1.669 |
| f/f12 | 0.44 | Y1R1/Y6R2 | 1.73 |
| f/f45 | 0.78 | Y2R1/Y5R2 | 1.37 |

11th Embodiment

Figure 21:
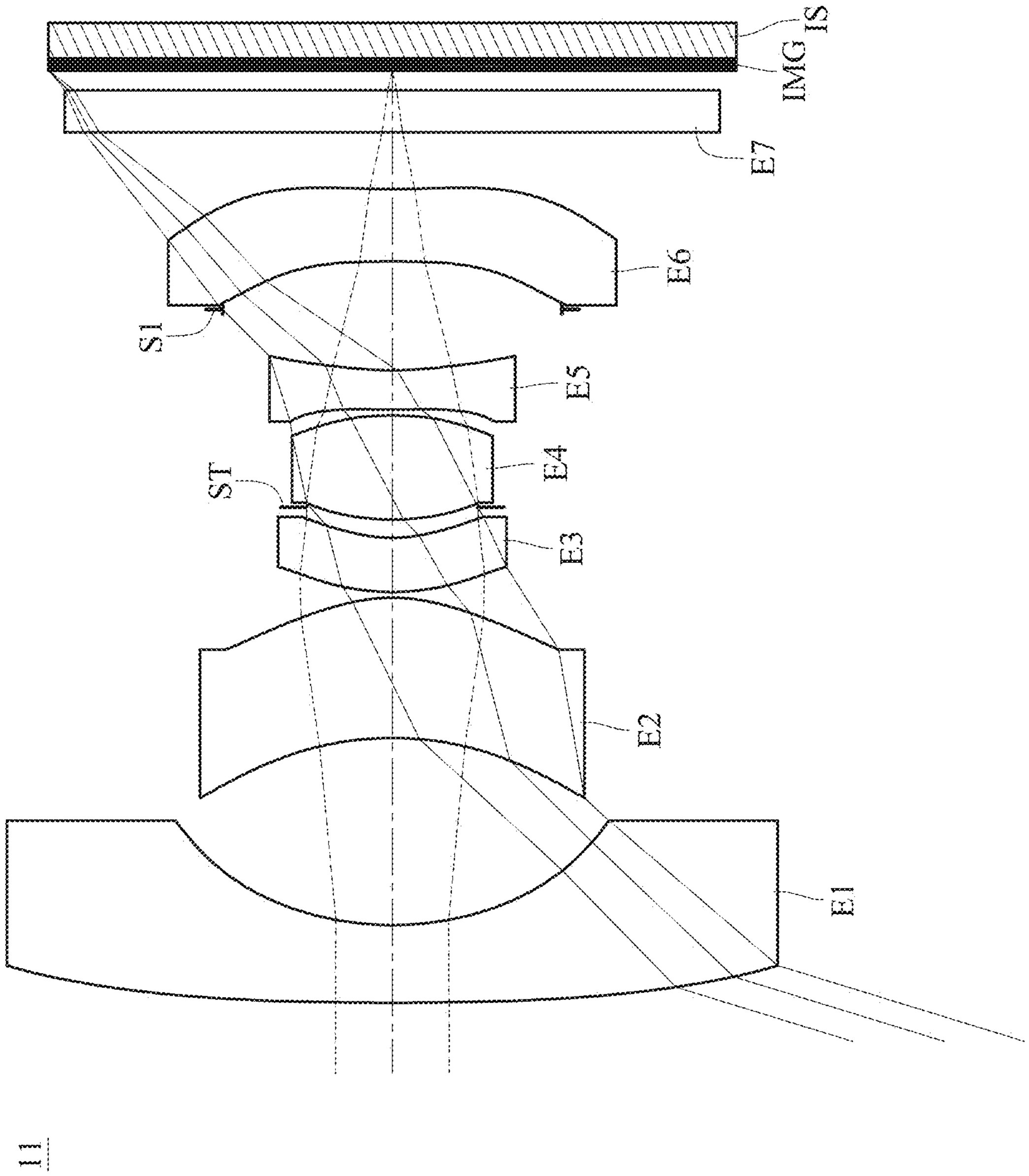
FIG. 21 is a schematic view of an image capturing unit according to the 11th embodiment of the present disclosure.
Figure 22:
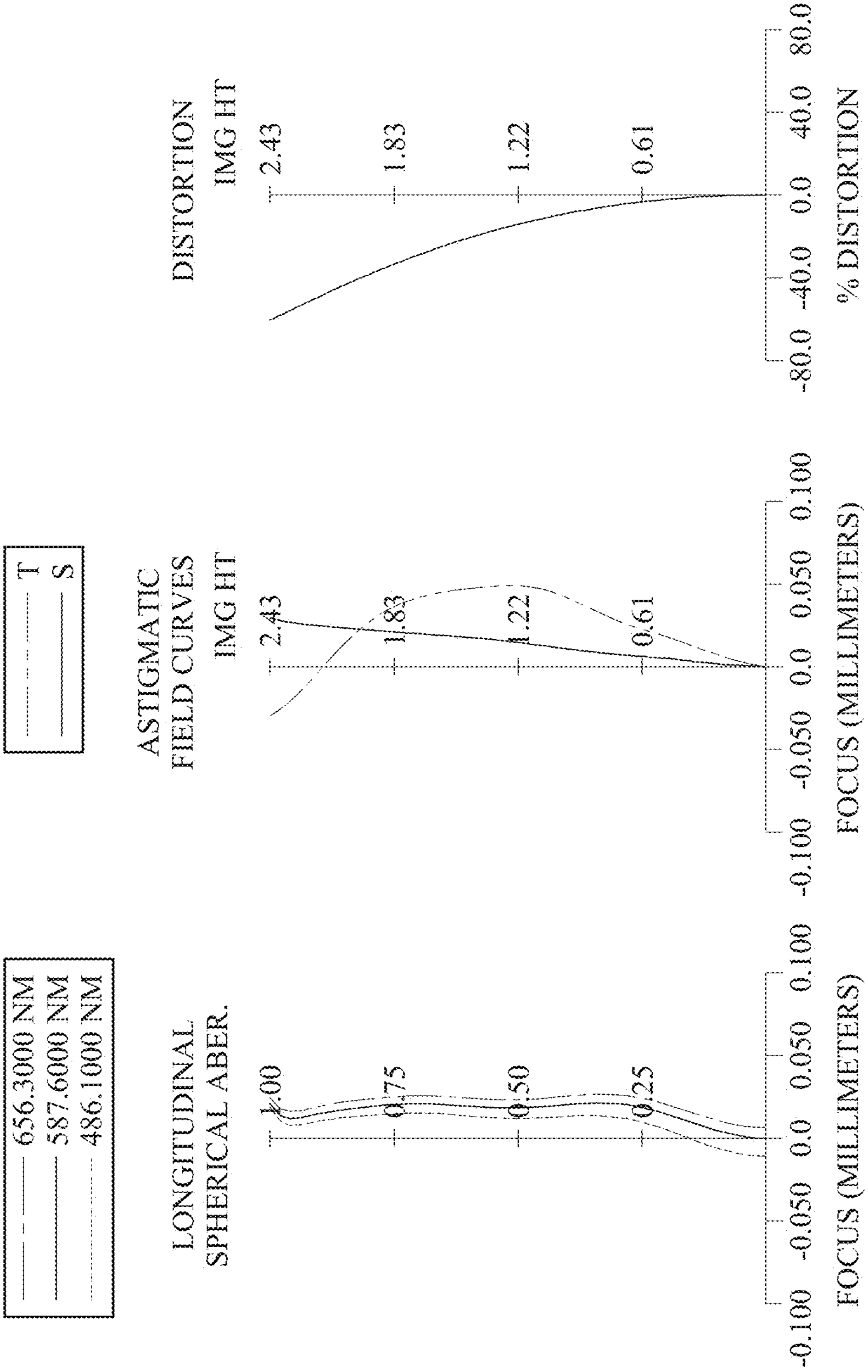
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The object-side surface of the fifth lens element E5 has one critical point in an off-axis region thereof.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the object-side surface of the fourth lens element E4 is equal to Ymin.

The detailed optical data of the 11th embodiment are shown in Table 11A and the aspheric surface data are shown in Table 11B below.

TABLE 11A

| 11th Embodiment<br>f = 1.89 mm, Fno = 2.35, HFOV = 72.9 deg. | | | | | | | |
|---|---|---|---|---|---|---|---|
| Surface # | | Curvature Radius | Thickness | Material | Index | Abbe # | Focal Length |
| 0 | Object | Infinity | Infinity | | | | |
| 1 | Lens 1 | 27.0286 (ASP) | 0.550 | Plastic | 1.544 | 56.0 | −4.46 |
| 2 | | 2.2085 (ASP) | 1.324 | | | | |
| 3 | Lens 2 | −2.3815 (ASP) | 0.994 | Plastic | 1.544 | 56.0 | 3.20 |
| 4 | | −1.1536 (ASP) | 0.040 | | | | |
| 5 | Lens 3 | 1.6524 (ASP) | 0.384 | Plastic | 1.615 | 25.3 | −5.91 |
| 6 | | 1.0357 (ASP) | 0.215 | | | | |
| 7 | Ape. Stop | Plano | −0.086 | | | | |
| 8 | Lens 4 | 1.7387 (ASP) | 0.737 | Plastic | 1.544 | 56.0 | 2.01 |
| 9 | | −2.4937 (ASP) | 0.040 | | | | |
| 10 | Lens 5 | 4.7500 (ASP) | 0.280 | Plastic | 1.669 | 19.5 | −8.18 |
| 11 | | 2.4834 (ASP) | 0.430 | | | | |
| 12 | Stop | Plano | 0.340 | | | | |
| 13 | Lens 6 | −10.7941 (ASP) | 0.513 | Plastic | 1.639 | 23.5 | −6.11 |
| 14 | | 6.2258 (ASP) | 0.400 | | | | |
| 15 | Filter | Plano | 0.300 | Glass | 1.517 | 64.2 | — |
| 16 | | Plano | 0.140 | | | | |
| 17 | Image | Plano | — | | | | |

Note:
Reference wavelength is 587.6 nm (d-line).
An effective radius of the stop S1 (Surface 12) is 1.201 mm.

TABLE 11B

| Aspheric Coefficients | | | | | | |
|---|---|---|---|---|---|---|
| Surface # | 1 | 2 | 3 | 4 | 5 | 6 |
| k= | 4.32927E+01 | 1.50735E−01 | −1.51087E+00 | −6.41263E+00 | −5.54147E+00 | −5.39403E−01 |
| A4= | −3.93039E−05 | 4.40257E−03 | −6.63604E−02 | −4.14573E−02 | 1.27705E−01 | −6.61046E−01 |
| A6= | 1.40185E−03 | −4.46528E−03 | 6.42828E−02 | 1.52268E−02 | 8.13279E−02 | 9.57336E−01 |
| A8= | −3.75440E−04 | 1.56325E−02 | −3.07662E−02 | 1.53756E−02 | −7.01191E−01 | 7.73742E+00 |
| A10= | 4.74786E−05 | −1.23650E−02 | 1.59222E−03 | −2.61154E−02 | 1.06312E+00 | −7.38896E+01 |
| A12= | −2.97850E−06 | 5.37178E−03 | 4.69975E−03 | 1.67546E−02 | −1.07782E+00 | 2.91412E+02 |
| A14= | 8.13990E−08 | −9.15935E−04 | −1.24593E−03 | −3.43227E−03 | 4.62896E−01 | −6.31399E+02 |
| A16= | — | — | — | — | — | 7.26186E+02 |
| A18= | — | — | — | — | — | −3.43926E+02 |
| Surface # | 8 | 9 | 10 | 11 | 13 | 14 |
| k= | 1.82457E+00 | 1.38302E+00 | −8.95026E+01 | −1.98201E+01 | −2.03948E+01 | 6.20773E+00 |
| A4= | −6.81587E−02 | −1.04161E+00 | −1.17672E+00 | −1.73832E−01 | −2.59681E−01 | −2.08843E−01 |
| A6= | 2.58352E−01 | 6.47471E+00 | 5.76144E+00 | 6.62470E−01 | 2.96480E−01 | 1.48873E−01 |
| A8= | 7.01512E−01 | −2.38052E+01 | −2.10272E+01 | −1.36810E+00 | −6.50947E−01 | −1.40690E−01 |
| A10= | −5.60572E+00 | 5.15088E+01 | 4.46364E+01 | 1.55066E+00 | 1.24430E+00 | 1.07143E−01 |
| A12= | 1.19070E+01 | −6.00569E+01 | −5.23395E+01 | −4.53489E−01 | −1.57796E+00 | −5.52968E−02 |
| A14= | −8.81773E+00 | 2.93672E+01 | 2.48872E+01 | −6.85229E−01 | 1.27436E+00 | 1.71724E−02 |
| A16= | — | — | 8.60750E−01 | 4.86219E−01 | −6.15305E−01 | −2.54657E−03 |
| A18= | — | — | — | — | 1.59640E−01 | 2.54591E−05 |
| A20= | — | — | — | — | −1.69610E−02 | 2.40019E−05 |

In the 11th embodiment, the equation of the aspheric surface profiles of the aforementioned lens elements is the same as the equation of the 1st embodiment. Also, the definitions of these parameters shown in Table 11C below are the same as those stated in the 1st embodiment with corresponding values for the 11th embodiment, so an explanation in this regard will not be provided again.

Moreover, these parameters can be calculated from Table 11A and Table 11B as the following values and satisfy the following conditions:

TABLE 11C

| Values of Optical and Physical Parameters/Definitions | | | |
|---|---|---|---|
| f[mm] | 1.89 | f/\|R11\| + f/\|R12\| | 0.48 |
| Fno | 2.35 | (R3 + R4)/(R3 − R4) | 2.88 |
| HFOV [deg.] | 72.9 | ATmax/f | 0.70 |
| FOV [deg.] | 145.9 | BL/TL | 0.13 |
| TL/ImgH | 2.71 | SL/TL | 0.47 |
| tan(HFOV) | −0.68 | TD/T56 | 7.48 |
| TD/EPD | 7.16 | T23/T12 | 0.030 |
| TD/f | 3.05 | T56/T34 | 5.97 |
| \|f/fj\|max | 0.94 | Vmin | 19.5 |
| f/f3 | −0.32 | V3 + V5 | 44.8 |
| f/f5 | −0.23 | Nmax | 1.669 |
| f/f12 | 0.47 | Y1R1/Y6R2 | 1.72 |
| f/f45 | 0.79 | Y2R1/Y5R2 | 1.56 |

12th Embodiment

Figure 23:
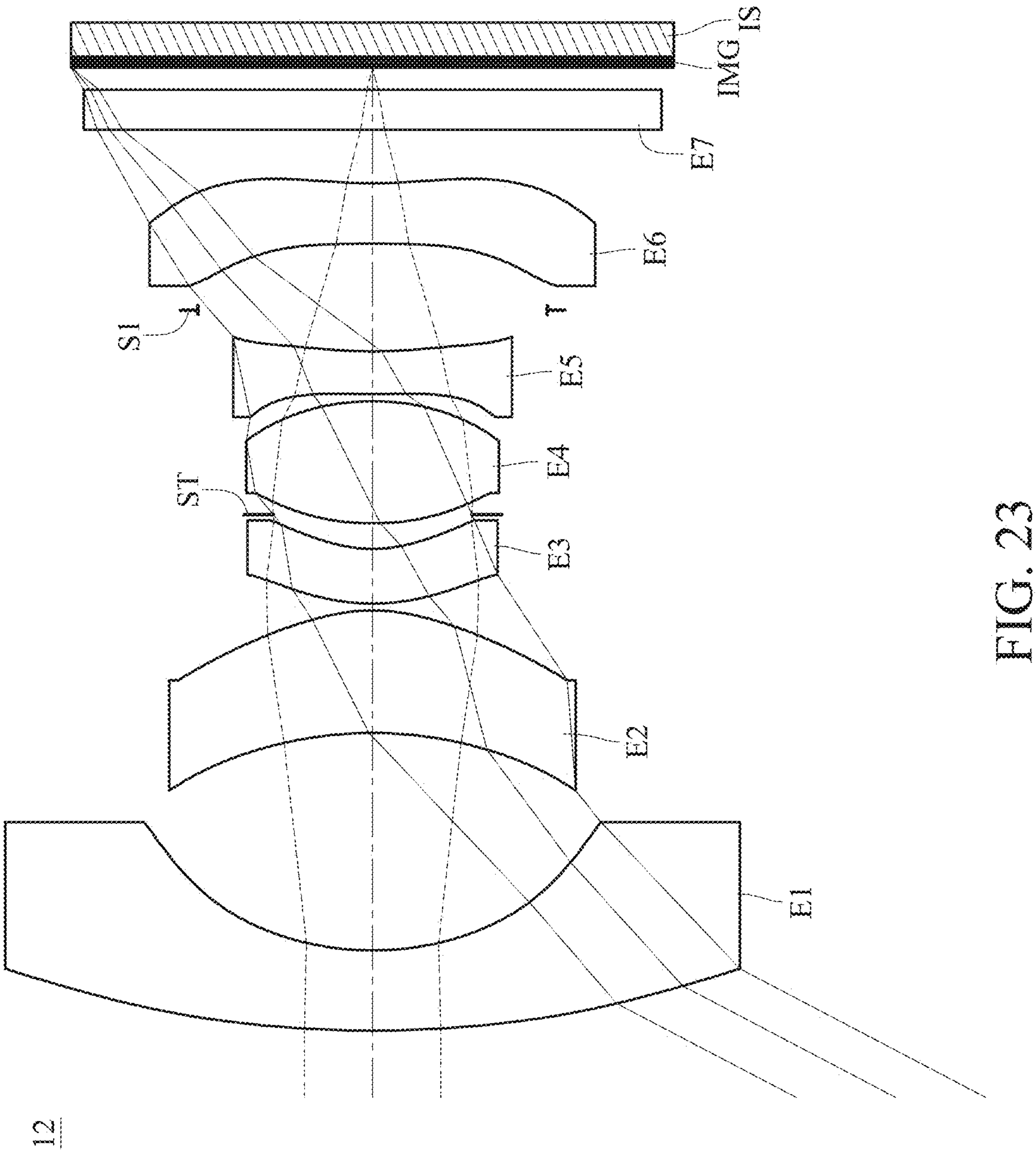
FIG. 23 is a schematic view of an image capturing unit according to the 12th embodiment of the present disclosure.
Figure 24:
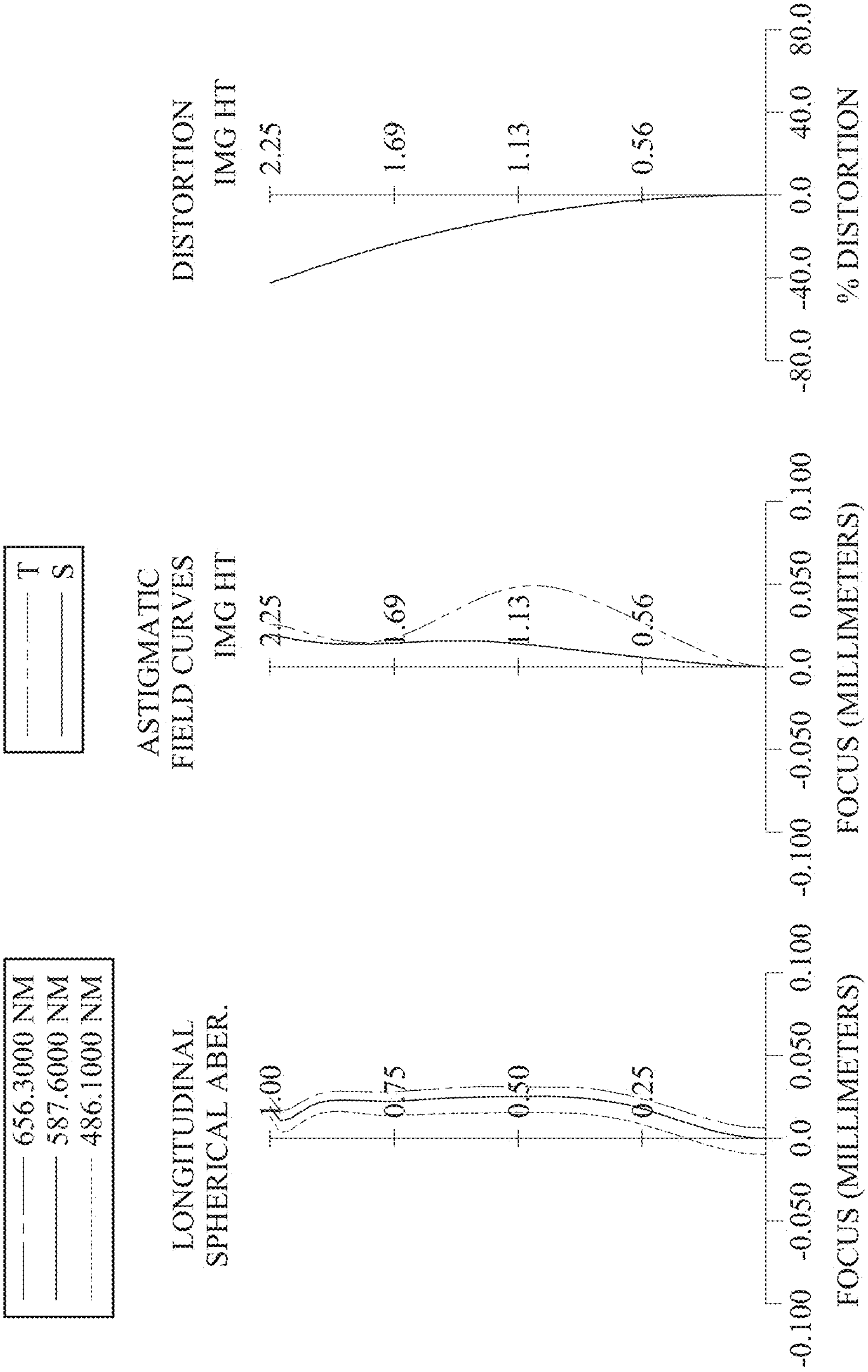
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit 12 includes the photographing optical lens assembly (its reference numeral is omitted) of the present disclosure and an image sensor IS. The photographing optical lens assembly includes, in order from an object side to an image side along an optical path, a first lens element E1, a second lens element E2, a third lens element E3, an aperture stop ST, a fourth lens element E4, a fifth lens element E5, a stop S1, a sixth lens element E6, a filter E7 and an image surface IMG. The photographing optical lens assembly includes six lens elements (E1, E2, E3, E4, E5 and E6) with no additional lens element disposed between each of the adjacent six lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The object-side surface of the fifth lens element E5 has one critical point in an off-axis region thereof.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has two inflection points. The image-side surface of the sixth lens element E6 has one critical point in an off-axis region thereof.

The filter E7 is made of glass material and located between the sixth lens element E6 and the image surface IMG, and will not affect the focal length of the photographing optical lens assembly. The image sensor IS is disposed on or near the image surface IMG of the photographing optical lens assembly.

In this embodiment, a minimum value among maximum effective radii of all lens surfaces of the photographing optical lens assembly is Ymin, and a maximum effective radius of the image-side surface of the third lens element E3 is equal to Ymin.

The detailed optical data of the 12th embodiment are shown in Table 12A and the aspheric surface data are shown in Table 12B below.

TABLE 12A

12th Embodiment
f = 2.04 mm, Fno = 2.00, HFOV = 62.4 deg.

| Surface # | | Curvature Radius | | Thickness | Material | Index | Abbe # | Focal Length |
|---|---|---|---|---|---|---|---|---|
| 0 | Object | Infinity | | Infinity | | | | |
| 1 | Lens 1 | 8.2929 | (ASP) | 0.600 | Glass | 1.640 | 60.2 | |
| 2 | | 2.2139 | (ASP) | 1.627 | | | | |
| 3 | Lens 2 | −2.9845 | (ASP) | 0.916 | Plastic | 1.544 | 56.0 | 3.62 |

TABLE 12A-continued

| 12th Embodiment f = 2.04 mm, Fno = 2.00, HFOV = 62.4 deg. | | | | | | | |
|---|---|---|---|---|---|---|---|
| Surface # | | Curvature Radius | Thickness | Material | Index | Abbe # | Focal Length |
| 4 | | −1.3155 (ASP) | 0.052 | | | | |
| 5 | Lens 3 | 1.6024 (ASP) | 0.409 | Plastic | 1.669 | 19.5 | −5.66 |
| 6 | | 1.0107 (ASP) | 0.256 | | | | |
| 7 | Ape. Stop | Plano | −0.065 | | | | |
| 8 | Lens 4 | 1.9225 (ASP) | 0.912 | Plastic | 1.544 | 56.0 | 2.05 |
| 9 | | −2.2222 (ASP) | 0.054 | | | | |
| 10 | Lens 5 | 5.9303 (ASP) | 0.320 | Plastic | 1.650 | 21.8 | −11.30 |
| 11 | | 3.2111 (ASP) | 0.309 | | | | |
| 12 | Stop | Plano | 0.496 | | | | |
| 13 | Lens 6 | −24.8139 (ASP) | 0.454 | Plastic | 1.562 | 44.6 | −5.99 |
| 14 | | 3.9159 (ASP) | 0.400 | | | | |
| 15 | Filter | Plano | 0.300 | Glass | 1.517 | 64.2 | — |
| 16 | | Plano | 0.166 | | | | |
| 17 | Image | Plano | — | | | | |

Note:
Reference wavelength is 587.6 nm (d-line).
An effective radius of the stop S1 (Surface 12) is 1.308 mm.

TABLE 12B

| Aspheric Coefficients | | | | | | |
|---|---|---|---|---|---|---|
| Surface # | 1 | 2 | 3 | 4 | 5 | 6 |
| k= | −3.63002E−01 | 1.59724E−01 | −2.17662E+00 | −6.35133E+00 | −5.98867E+00 | −3.39177E−01 |
| A4= | −4.13066E−03 | −4.90417E−04 | −1.49710E−02 | −3.23994E−02 | 1.01104E−01 | −5.27462E−01 |
| A6= | 2.50953E−03 | 5.88036E−03 | 1.51919E−02 | 1.04073E−02 | −3.61430E−02 | 1.00396E+00 |
| A8= | −5.05745E−04 | 2.21218E−03 | −1.46231E−02 | −5.15852E−03 | −1.15090E−01 | −1.28146E+00 |
| A10= | 4.13865E−05 | −1.86440E−03 | 6.37616E−03 | 2.77688E−03 | 3.37161E−02 | −2.88039E+00 |
| A12= | −1.25395E−06 | 1.00594E−03 | −1.68889E−03 | −1.03905E−03 | 6.05330E−02 | 1.36136E+01 |
| A14= | 1.09258E−08 | −2.33310E−04 | 2.20363E−04 | 1.71426E−04 | −5.65437E−02 | −2.14772E+01 |
| A16= | — | — | — | — | — | 1.43831E+01 |
| A18= | — | — | — | — | — | −2.68517E+00 |
| Surface # | 8 | 9 | 10 | 11 | 13 | 14 |
| k= | 1.17139E+00 | 3.86785E−01 | −4.92633E+01 | −3.71800E+01 | −6.86005E+01 | 1.21955E+00 |
| A4= | −8.93271E−03 | −4.73339E−01 | −6.72365E−01 | −5.61917E−02 | −1.80776E−01 | −1.66954E−01 |
| A6= | 1.93261E−01 | 1.76017E+00 | 1.82722E+00 | −7.30240E−02 | 1.94897E−01 | 1.09941E−01 |
| A8= | −5.28918E−01 | −4.06765E+00 | −4.52353E+00 | 5.13188E−01 | −4.56706E−01 | −1.38844E−01 |
| A10= | 7.06493E−01 | 5.55262E+00 | 6.82323E+00 | −1.08173E+00 | 7.49512E−01 | 1.43485E−01 |
| A12= | −6.07850E−01 | −4.14160E+00 | −6.12610E+00 | 1.22299E+00 | −7.15072E−01 | −9.89684E−02 |
| A14= | 2.15713E−01 | 1.27321E+00 | 2.65602E+00 | −6.69234E−01 | 3.91677E−01 | 4.39979E−02 |
| A16= | — | — | −2.78047E−01 | 1.38626E−01 | −1.16834E−01 | −1.22667E−02 |
| A18= | — | — | — | — | 1.66728E−02 | 1.95530E−03 |
| A20= | — | — | — | — | −7.78315E−04 | −1.34574E−04 |

In the 12th embodiment, the equation of the aspheric surface profiles of the aforementioned lens elements is the same as the equation of the 1st embodiment. Also, the definitions of these parameters shown in Table 12C below are the same as those stated in the 1st embodiment with corresponding values for the 12th embodiment, so an explanation in this regard will not be provided again.

Moreover, these parameters can be calculated from Table 12A and Table 12B as the following values and satisfy the following conditions:

TABLE 12C

| Values of Optical and Physical Parameters/Definitions | | | |
|---|---|---|---|
| f[mm] | 2.04 | f/\|R11\| + f/\|R12\| | 0.60 |
| Fno | 2.00 | (R3 + R4)/(R3 − R4) | 2.58 |
| HFOV [deg.] | 62.4 | ATmax/f | 0.80 |
| FOV [deg.] | 124.8 | BL/TL | 0.12 |

TABLE 12C-continued

| Values of Optical and Physical Parameters/Definitions | | | |
|---|---|---|---|
| TL/ImgH | 3.20 | SL/TL | 0.46 |
| tan(HFOV) | −1.44 | TD/T56 | 7.88 |
| TD/EPD | 6.21 | T23/T12 | 0.032 |
| TD/f | 3.11 | T56/T34 | 4.21 |
| \|f/fj\|max | 0.99 | Vmin | 19.5 |
| f/f3 | −0.36 | V3 + V5 | 41.3 |
| f/f5 | −0.18 | Nmax | 1.669 |
| f/f12 | 0.42 | Y1R1/Y6R2 | 1.65 |
| f/f45 | 0.89 | Y2R1/Y5R2 | 1.46 |

13th Embodiment

Figure 25:
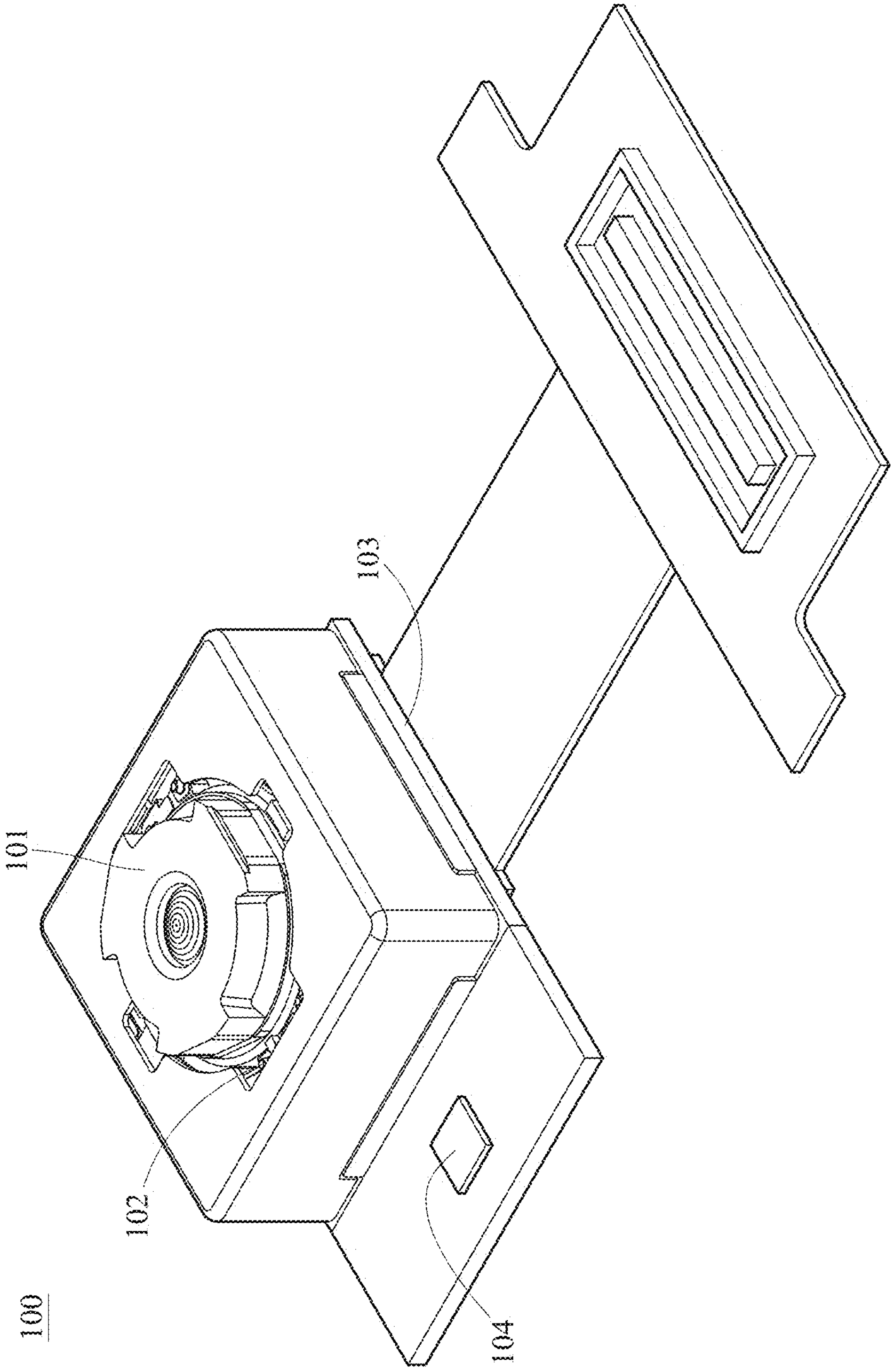
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 100 is a camera module including a lens unit 101, a driving device 102, an image sensor 103 and an image stabilizer 104. The lens unit 101 includes the photographing optical lens assembly as disclosed in the 1st embodiment, a barrel and a holder member (their reference numerals are omitted) for holding the photographing optical lens assembly. However, the lens unit 101 may alternatively be provided with the photographing optical lens assembly as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the photographing optical lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

14th Embodiment

Figure 26:
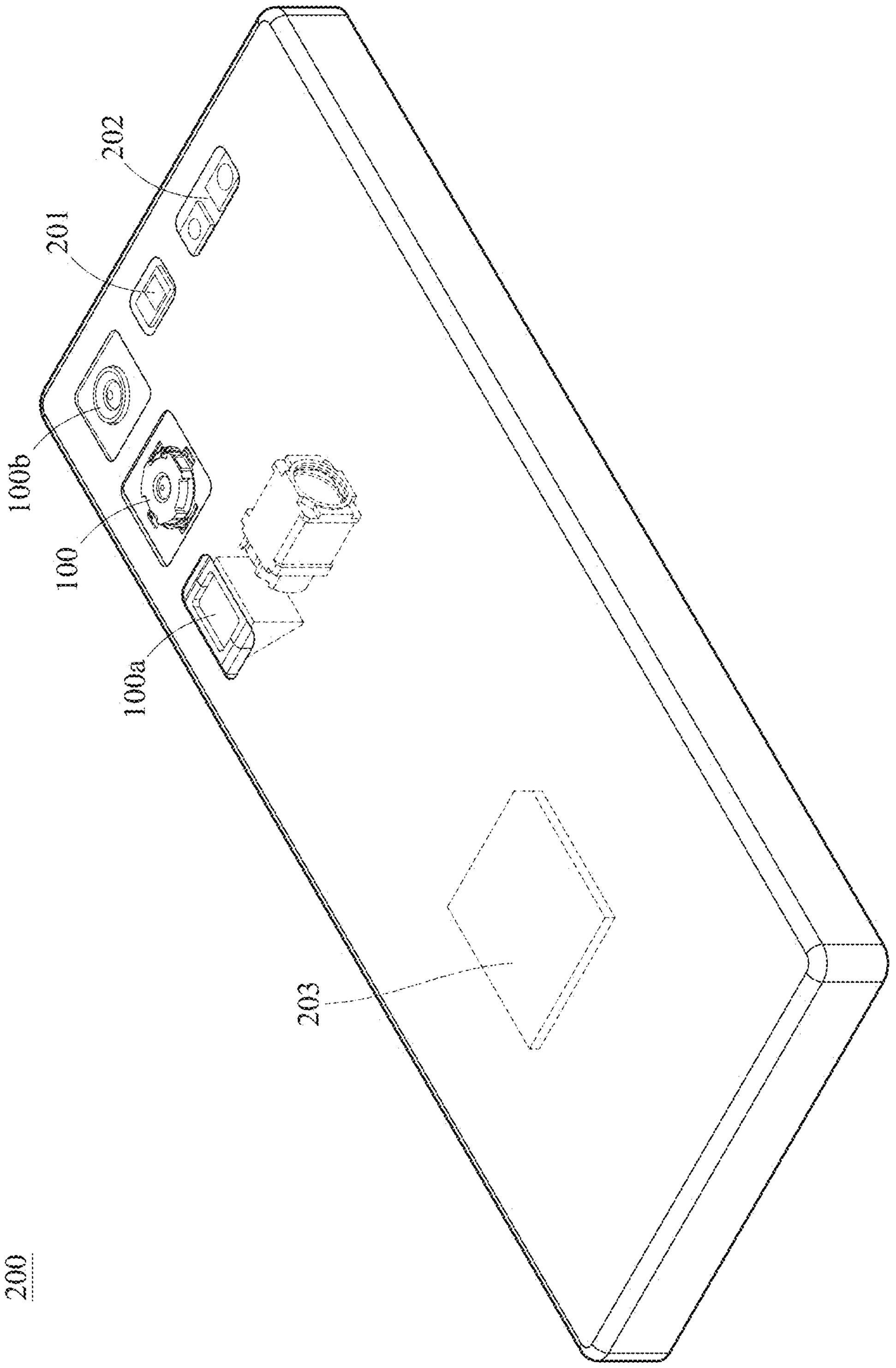
FIG. 26 is one perspective view of an electronic device according to the 14th embodiment of the present disclosure.
Figure 27:
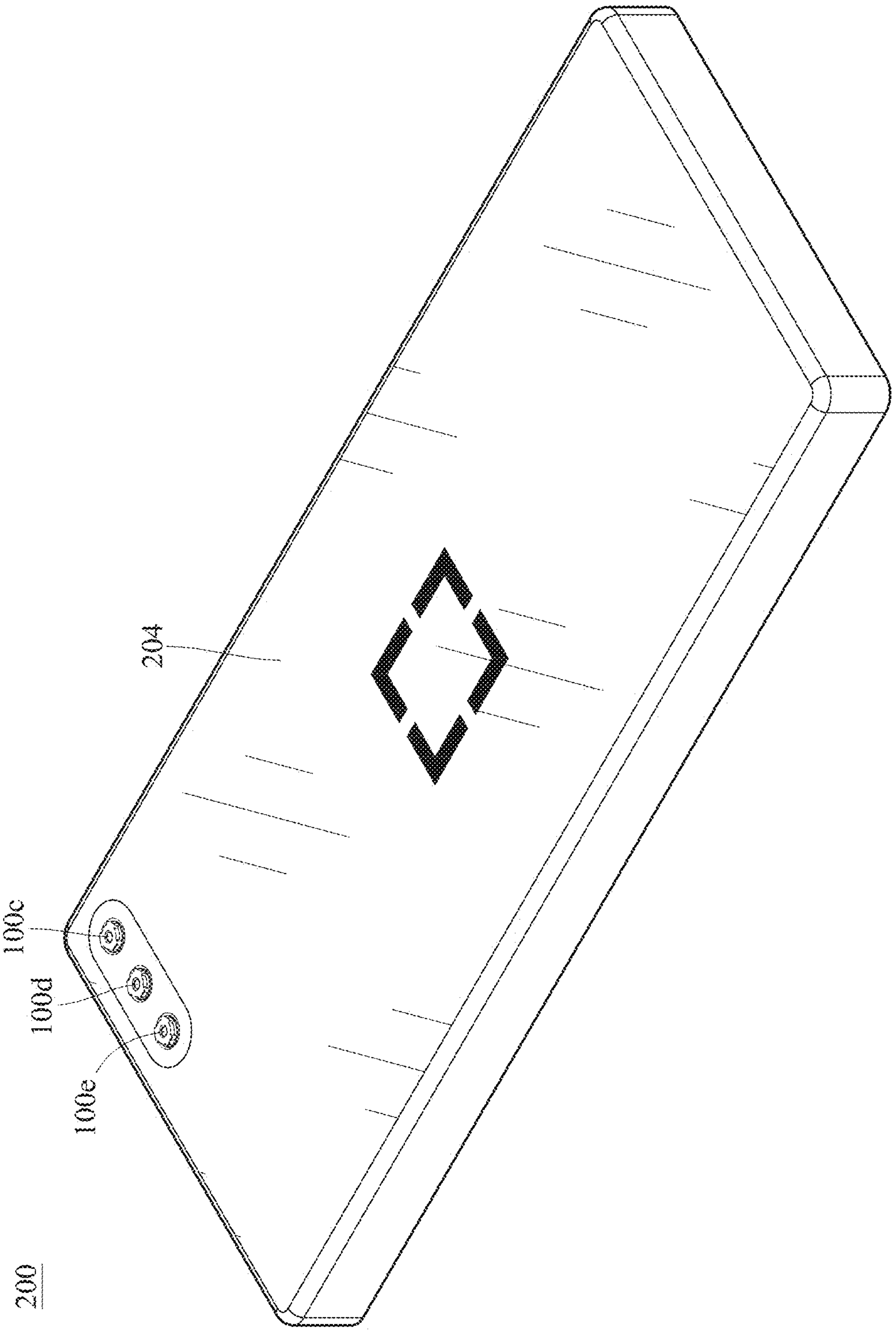
FIG. 27 is another perspective view of the electronic device in FIG. 26.
Figure 28:
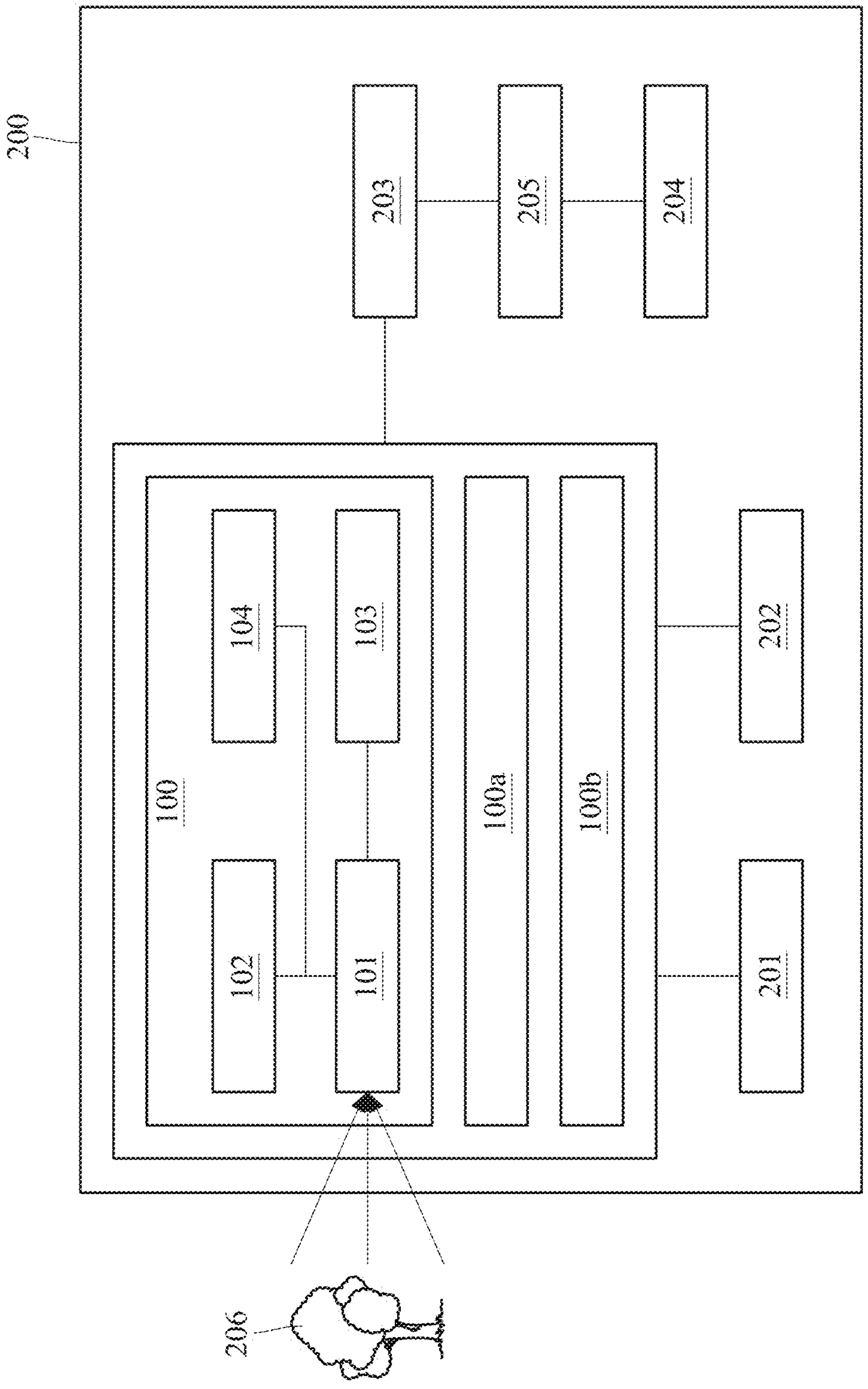
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 200 is a smartphone including the image capturing unit 100 as disclosed in the 13th embodiment, an image capturing unit 100*a*, an image capturing unit 100*b*, an image capturing unit 100*c*, an image capturing unit 100*d*, an image capturing unit 100*e*, a flash module 201, a focus assist module 202, an image signal processor 203, a display module 204 and an image software processor 205. The image capturing unit 100, the image capturing unit 100*a* and the image capturing unit 100*b* are disposed on the same side of the electronic device 200, and each of the image capturing units 100, 100*a* and 100*b* has a single focal point. The focus assist module 202 can be a laser rangefinder or a ToF (time of flight) module, but the present disclosure is not limited thereto. The image capturing unit 100*c*, the image capturing unit 100*d*, the image capturing unit 100*e* and the display module 204 are disposed on the opposite side of the electronic device 200, and the display module 204 can be a user interface, such that the image capturing units 100*c*, 100*d* and 100*e* can be front-facing cameras of the electronic device 200 for taking selfies, but the present disclosure is not limited thereto. Furthermore, each of the image capturing units 100*a*, 100*b*, 100*c*, 100*d* and 100*e* can include the photographing optical lens assembly of the present disclosure and can have a configuration similar to that of the image capturing unit 100. In detail, each of the image capturing units 100*a*, 100*b*, 100*c*, 100*d* and 100*e* can include a lens unit, a driving device, an image sensor and an image stabilizer, and can also include a light-folding element for folding optical path. In addition, each lens unit of the image capturing units 100*a*, 100*b*, 100*c*, 100*d* and 100*e* can include the photographing optical lens assembly of the present disclosure, a barrel and a holder member for holding the photographing optical lens assembly.

The image capturing unit 100 is a wide-angle image capturing unit, the image capturing unit 100*a* is a telephoto image capturing unit with optical path folding function, the image capturing unit 100*b* is an ultra-wide-angle image capturing unit, the image capturing unit 100*c* is a wide-angle image capturing unit, the image capturing unit 100*d* is an ultra-wide-angle image capturing unit, and the image capturing unit 100*e* is a ToF image capturing unit. In this embodiment, the image capturing units 100, 100*a* and 100*b* have different fields of view, such that the electronic device 200 can have various magnification ratios so as to meet the requirement of optical zoom functionality. In addition, the image capturing unit 100*e* can determine depth information of the imaged object. Moreover, the light-folding configuration of the image capturing unit 100*a* can be similar to, for example, one of the configurations as shown in FIG. 34 to FIG. 36, which can be referred to foregoing descriptions corresponding to FIG. 34 to FIG. 36, and the details in this regard will not be provided again. Moreover, each of the image capturing units 100, 100*b*, 100*c*, 100*d* and 100*e* can have a light-folding configuration similar to, for example, one of the configurations as shown in FIG. 34 to FIG. 36, which can be referred to foregoing descriptions corresponding to FIG. 34 to FIG. 36. In this embodiment, the electronic device 200 includes multiple image capturing units 100, 100*a*, 100*b*, 100*c*, 100*d* and 100*e*, but the present disclosure is not limited to the number and arrangement of image capturing units.

When a user captures images of an object 206, the light rays converge in the image capturing unit 100, the image capturing unit 100*a* or the image capturing unit 100*b* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*c*, 100*d* or 100*e* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

15th Embodiment

Figure 29:
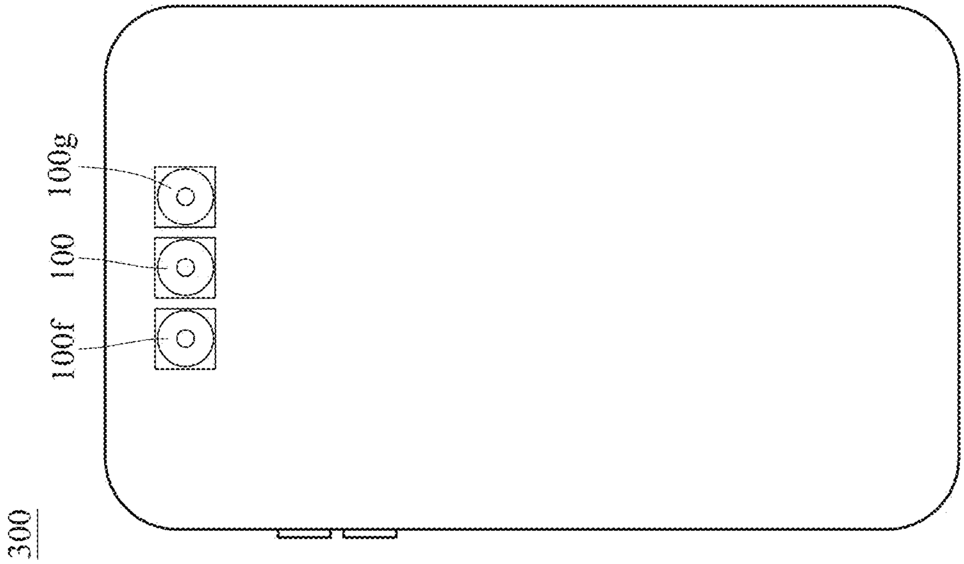
FIG. 29 is one schematic view of an electronic device according to the 15th embodiment of the present disclosure.
Figure 30:
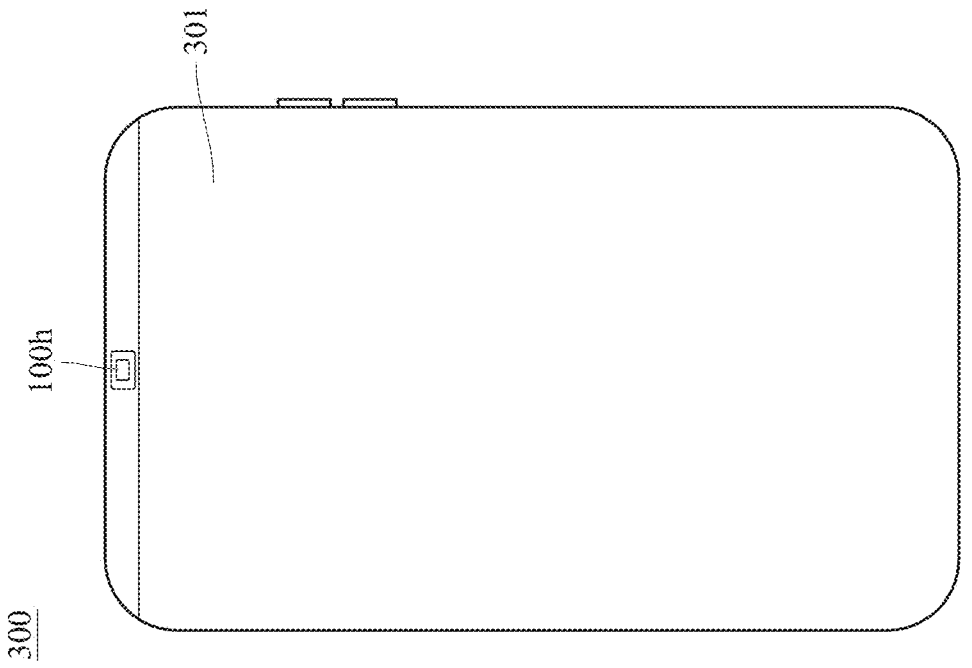
FIG. 30 is another schematic view of the electronic device in FIG. 29.

FIG. 29 is one schematic view of an electronic device according to the 15th embodiment of the present disclosure. FIG. 30 is another schematic view of the electronic device in FIG. 29.

In this embodiment, an electronic device 300 is a smartphone including the image capturing unit 100 as disclosed in the 13th embodiment, an image capturing unit 100*f*, an image capturing unit 100*g*, an image capturing unit 100*h* and a display module 301. As shown in FIG. 29, the image capturing unit 100, the image capturing unit 100*f* and the image capturing unit 100*g* are disposed on the same side of the electronic device 300, and each of the image capturing units 100, 100*f* and 100*g* has a single focal point. As shown in FIG. 30, the image capturing unit 100*h* and the display module 301 are disposed on the opposite side of the electronic device 300, such that the image capturing unit 100*h* can be a front-facing camera of the electronic device 300 for taking selfies, but the present disclosure is not limited thereto. Furthermore, each of the image capturing units 100*f*, 100*g* and 100*h* can include the photographing optical lens assembly of the present disclosure and can have a configuration similar to that of the image capturing unit 100. In detail, each of the image capturing units 100*f*, 100*g* and 100*h* can include a lens unit, a driving device, an image sensor and an image stabilizer. In addition, each lens unit of the image capturing units 100*f*, 100*g* and 100*h* can include the photographing optical lens assembly of the present disclosure, a barrel and a holder member for holding the photographing optical lens assembly.

The image capturing unit 100 is a wide-angle image capturing unit, the image capturing unit 100*f* is a telephoto image capturing unit, the image capturing unit 100*g* is an ultra-wide-angle image capturing unit, and the image capturing unit 100*h* is a wide-angle image capturing unit. In this embodiment, the image capturing units 100, 100*f* and 100*g* have different fields of view, such that the electronic device 300 can have various magnification ratios so as to meet the requirement of optical zoom functionality. In this embodiment, the electronic device 300 includes multiple image capturing units 100, 100*f*, 100*g* and 100*h*, but the present disclosure is not limited to the number and arrangement of image capturing units.

16th Embodiment

Figure 31:
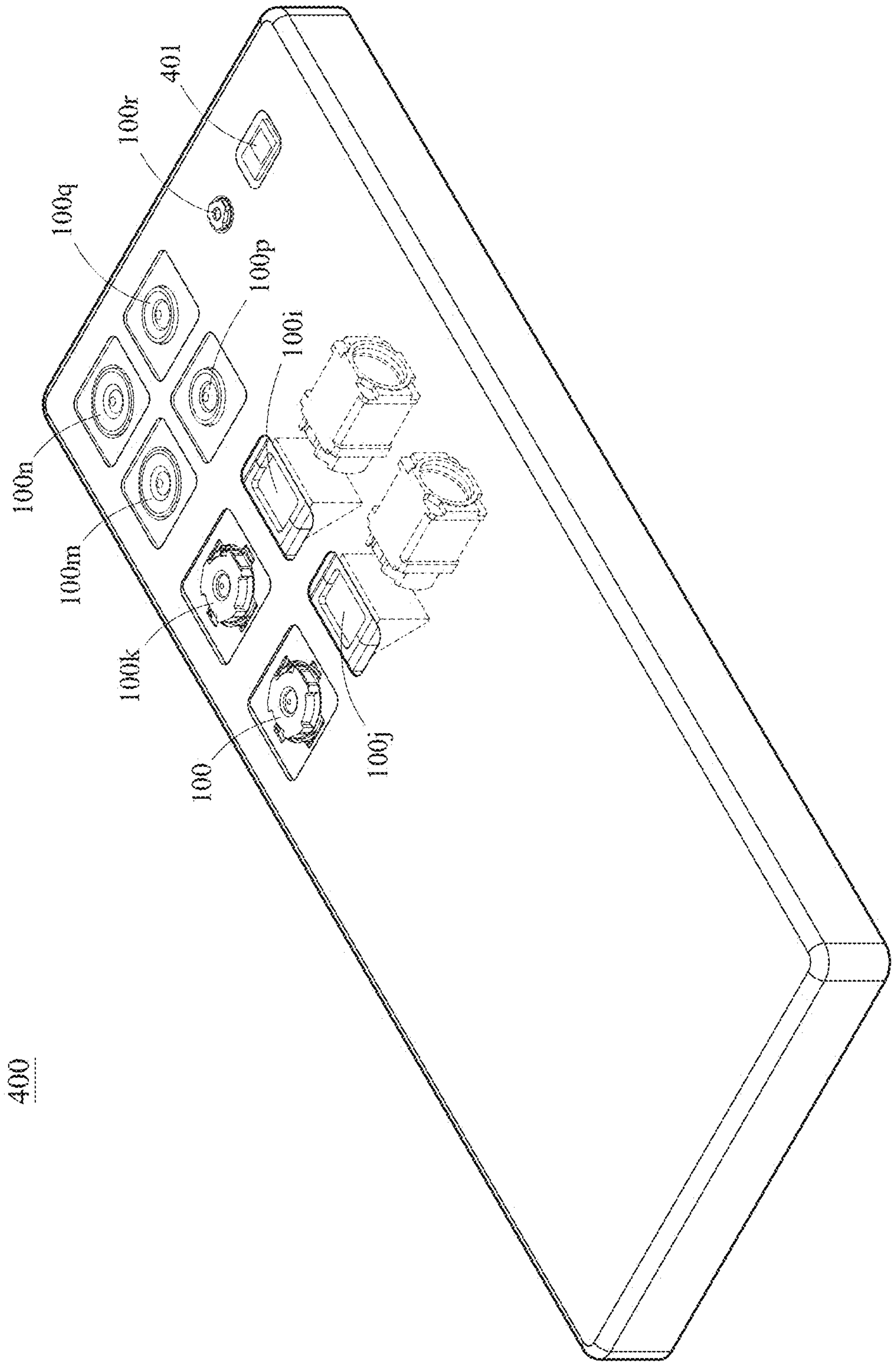
FIG. 31 is one perspective view of an electronic device according to the 16th embodiment of the present disclosure.

FIG. 31 is one perspective view of an electronic device according to the 16th embodiment of the present disclosure.

In this embodiment, an electronic device 400 is a smartphone including the image capturing unit 100 as disclosed in the 13th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the photographing optical lens assembly of the present disclosure and can have a configuration similar to that of the image capturing unit 100, and the details in this regard will not be provided again.

The image capturing unit 100 is a wide-angle image capturing unit, the image capturing unit 100*i* is a telephoto image capturing unit with optical path folding function, the image capturing unit 100*j* is a telephoto image capturing unit with optical path folding function, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p* and 100*q* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100*i* and 100*j* can be similar to, for example, one of the structures shown in FIG. 34 to FIG. 36, which can be referred to foregoing descriptions corresponding to FIG. 34 to FIG. 36, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in the embodiments is only exemplary for showing the image capturing unit of the present disclosure installed in an electronic device, and the present disclosure is not limited thereto. The image capturing unit can be optionally applied to optical systems with a movable focus. Furthermore, the photographing optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, unmanned aerial vehicles, wearable devices, portable video recorders and other electronic imaging devices.

The foregoing description, for the purpose of explanation, has been described with reference to specific embodiments. It is to be noted that TABLES 1A-12C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side along an optical path, a first lens element, a second lens element, a third lens element, a fourth lens element, a fifth lens element, and a sixth lens element, and each of the six lens elements having an object-side surface facing toward the object side and an image-side surface facing toward the image side;

wherein the first lens element has negative refractive power, the object-side surface of the second lens element is concave in a paraxial region thereof, and the image-side surface of the third lens element is concave in a paraxial region thereof; and wherein an axial distance between the object-side surface of the first lens element and the image-side surface of the sixth lens element is TD, a focal length of the photographing optical lens assembly is f, a focal length of the fifth lens element is f5, an axial distance between the fifth lens element and the sixth lens element is T56, an axial distance between the object-side surface of the first lens element and an image surface is TL, a maximum image height of the photographing optical lens assembly is ImgH, and the following conditions are satisfied:

$$2.20 < TD/f < 4.50;$$

$$-0.80 < f/f5 < 0.20;$$

$$1.00 < TD/T56 < 35.00; \text{ and}$$

$$0.50 < TL/ImgH < 4.00.$$

2. The photographing optical lens assembly of claim 1, wherein the third lens element has negative refractive power, the object-side surface and the image-side surface of the sixth lens element are both aspheric, and at least one of the object-side surface and the image-side surface of the sixth lens element has at least one inflection point.

3. The photographing optical lens assembly of claim 1, wherein the image-side surface of the first lens element is concave in a paraxial region thereof, and the image-side surface of the fifth lens element is concave in a paraxial region thereof.

4. The photographing optical lens assembly of claim 1, wherein a maximum field of view of the photographing optical lens assembly is FOV, an f-number of the photographing optical lens assembly is Fno, and the following conditions are satisfied:

$$125.0 \text{ degrees} < FOV; \text{ and}$$

$$1.50 < Fno < 4.00.$$

5. The photographing optical lens assembly of claim 1, wherein the following condition is satisfied:

$$0.90 < TL/ImgH < 3.50.$$

6. The photographing optical lens assembly of claim 1, wherein a minimum value among Abbe numbers of all lens elements of the photographing optical lens assembly is Vmin, and the following condition is satisfied:

$$5.0 < Vmin < 21.0.$$

7. The photographing optical lens assembly of claim 1, wherein a composite focal length of the fourth lens element and the fifth lens element is f45, and the following condition is satisfied:

$$0.45 < f/f45 < 1.20.$$

8. The photographing optical lens assembly of claim 1, wherein a curvature radius of the object-side surface of the sixth lens element is R11, a curvature radius of the image-side surface of the sixth lens element is R12, and the following condition is satisfied:

$$f/|R11| + f/|R12| < 4.00.$$

9. The photographing optical lens assembly of claim 1, wherein a maximum effective radius of the object-side surface of the first lens element is Y1R1, a maximum effective radius of the image-side surface of the sixth lens element is Y6R2, and the following condition is satisfied:

$$0.60 < Y1R1/Y6R2 < 8.00.$$

10. An image capturing unit comprising:

the photographing optical lens assembly of claim 1; and an image sensor disposed on the image surface of the photographing optical lens assembly.

11. An electronic device comprising:

the image capturing unit of claim 10.

12. A photographing optical lens assembly comprising six lens elements, the six lens elements being, in order from an object side to an image side along an optical path, a first lens element, a second lens element, a third lens element, a fourth lens element, a fifth lens element, and a sixth lens element, and each of the six lens elements having an object-side surface facing toward the object side and an image-side surface facing toward the image side;

wherein the first lens element has negative refractive power, the object-side surface of the second lens element is concave in a paraxial region thereof, the image-side surface of the third lens element is concave in a paraxial region thereof, the fifth lens element has negative refractive power, the image-side surface of the sixth lens element is concave in a paraxial region thereof, and the image-side surface of the sixth lens element has at least one inflection point; and wherein a focal length of the photographing optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a composite focal length of the fourth lens element and the fifth lens element is f45, a focal length of the j-th lens element is fj, a maximum absolute value of f/fj is |f/fj|max, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a curvature radius of the object-side surface of the second lens element is R3, a curvature radius of the image-side surface of the second lens element is R4, and the following conditions are satisfied:

$$0.45 < f/f45 < 1.00;$$

$$0.70 < T56/T34 < 20.00;$$

$$T23 < T12;$$

$$-5.00 < (R3 + R4)/(R3 - R4);$$

and $$|f/fj|max < 1.50, \text{ wherein } j = 1, 2, 3, 4, 5, \text{ or } 6.$$

13. The photographing optical lens assembly of claim 12, wherein the third lens element has negative refractive power, the fourth lens element has positive refractive power, the image-side surface of the first lens element is concave in a paraxial region thereof, and the image-side surface of the fourth lens element is convex in a paraxial region thereof.

14. The photographing optical lens assembly of claim 12, wherein the second lens element has positive refractive power.

15. The photographing optical lens assembly of claim 12, wherein the object-side surface and the image-side surface of the sixth lens element are both aspheric, and the image-side surface of the sixth lens element has at least one critical point in an off-axis region thereof; and wherein the following condition is satisfied.

$$1.00 < (R3 + R4)/(R3 - R4) < 80.00.$$

16. The photographing optical lens assembly of claim 12, further comprising an aperture stop, wherein an axial distance between the image-side surface of the sixth lens element and an image surface is BL, an axial distance between the object-side surface of the first lens element and the image surface is TL, an axial distance between the aperture stop and the image surface is SL, and the following conditions are satisfied:

$$BL/TL < 0.22;$$

and $$0.30 < SL/TL < 0.80.$$

17. The photographing optical lens assembly of claim 12, wherein a maximum field of view of the photographing optical lens assembly is FOV, an axial distance between the object-side surface of the first lens element and an image surface is TL, a maximum image height of the photographing optical lens assembly is ImgH, and the following conditions are satisfied:

$$110.0 \text{ degrees} < FOV;$$

and $$0.50 < TL/ImgH < 4.00.$$

18. The photographing optical lens assembly of claim 12, wherein a composite focal length of the first lens element and the second lens element is f12, and the following condition is satisfied:

$$f/f12 < 0.75.$$

19. The photographing optical lens assembly of claim 12, wherein an axial distance between the object-side surface of the first lens element and the image-side surface of the sixth lens element is TD, and the following conditions are satisfied:

$$1.40 < TD/f < 6.00;$$

and $$T23/T12 < 0.80.$$

20. The photographing optical lens assembly of claim 12, wherein an Abbe number of the third lens element is V3, an Abbe number of the fifth lens element is V5, a maximum value among refractive indexes of all lens elements of the photographing optical lens assembly is Nmax, and the following conditions are satisfied:

$$10.0 < V3 + V5 < 80.0;$$

and $$1.660 < Nmax.$$

21. The photographing optical lens assembly of claim 12, wherein a minimum value among maximum effective radii of all lens surfaces of the photographing optical lens assembly is Ymin, and a maximum effective radius of one of the object-side surface of the third lens element, the image-side surface of the third lens element, the object-side surface of the fourth lens element, and the image-side surface of the fourth lens element is equal to Ymin.

22. A photographing optical lens assembly comprising six lens elements, the six lens elements being, in order from an object side to an image side along an optical path, a first lens element, a second lens element, a third lens element, a fourth lens element, a fifth lens element, and a sixth lens element, and each of the six lens elements having an object-side surface facing toward the object side and an image-side surface facing toward the image side;

wherein the first lens element has negative refractive power, the object-side surface of the second lens element is concave in a paraxial region thereof, the image-side surface of the third lens element is concave in a paraxial region thereof, and the fifth lens element has negative refractive power; and wherein an axial distance between the object-side surface of the first lens element and the image-side surface of the sixth lens element is TD, a focal length of the photographing optical lens assembly is f, a focal length of the third lens element is f3, an axial distance between the fifth lens element and the sixth lens element is T56, an axial distance between the object-side surface of the first lens element and an image surface is TL, a maximum image height of the photographing optical lens assembly is ImgH, and the following conditions are satisfied:

$$2.20 < TD/f < 4.50;$$

$$-1.50 < f/f3 < 0.30;$$

$$1.00 < TD/T56 < 19.00;$$

and $$0.50 < TL/ImgH < 4.00.$$

23. The photographing optical lens assembly of claim 22, wherein the image-side surface of the first lens element is concave in a paraxial region thereof, the image-side surface of the second lens element is convex in a paraxial region thereof, and the image-side surface of the fifth lens element is concave in a paraxial region thereof.

24. The photographing optical lens assembly of claim 22, wherein a central thickness of the second lens element is CT2, an axial distance between the second lens element and the third lens element is T23, an axial distance between the third lens element and the fourth lens element is T34, and the following conditions are satisfied:

$$T34 < CT2;$$

and $$T23 < T56.$$

25. The photographing optical lens assembly of claim 22, wherein a maximum field of view of the photographing optical lens assembly is FOV, a maximum value among refractive indexes of all lens elements of the photographing optical lens assembly is Nmax, and the following conditions are satisfied:

$$-1.80 < \tan(FOV) < 0;$$

and $$1.660 < Nmax.$$

26. The photographing optical lens assembly of claim 22, wherein the following conditions are satisfied:

$$2.50 < TD/f < 3.90;$$

and $$0.90 < TL/ImgH < 3.50.$$

27. The photographing optical lens assembly of claim 22, wherein an entrance pupil diameter of the photographing optical lens assembly is EPD, and the following condition is satisfied:

$$5.00 < TD/EPD < 8.50.$$

28. The photographing optical lens assembly of claim 22, wherein a maximum value among axial distances between each of all adjacent lens elements of the photographing optical lens assembly is ATmax, and the following condition is satisfied:

$$0 < ATmax/f < 2.50.$$

29. The photographing optical lens assembly of claim 22, wherein a maximum effective radius of the object-side surface of the second lens element is Y2R1, a maximum effective radius of the image-side surface of the fifth lens element is Y5R2, and the following condition is satisfied:

$$0.70 < Y2R1/Y5R2 < 8.00.$$

30. The photographing optical lens assembly of claim 22, wherein a focal length of the fifth lens element is f5, a composite focal length of the fourth lens element and the fifth lens element is f45, an axial distance between the third lens element and the fourth lens element is T34, a curvature radius of the object-side surface of the second lens element is R3, a curvature radius of the image-side surface of the second lens element is R4, and the following conditions are satisfied:

$$2.51 \leq TD/f \leq 3.47;$$

$$-0.65 \leq f/f5 \leq -0.16;$$

$$6.48 \leq TD/T56 \leq 10.05;$$

$$-0.36 \leq f/f3 \leq 0.04;$$

$$3.21 \leq T56/T34 \leq 7.08;$$

$$0.71 \leq f/f45 \leq 0.92;$$

$$2.58 \leq (R3+R4)/(R3-R4) \leq 15.98;$$

and $$2.33 \leq TL/ImgH \leq 3.20.$$

* * * * *